US012507290B2

United States Patent
Xu et al.

(10) Patent No.: US 12,507,290 B2
(45) Date of Patent: Dec. 23, 2025

(54) AUTHORIZATION METHOD, APPARATUS AND SYSTEM FOR AUTHORIZING RELAY SERVICE RELATIONSHIPS BETWEEN REMOTE AND RELAY TERMINALS USING POLICY CONTROL FUNCTION DEVICES

(71) Applicant: HUAWEI TECHNOLOGIES CO., LTD., Shenzhen (CN)

(72) Inventors: Shengfeng Xu, Beijing (CN); Yanmei Yang, Beijing (CN); Meng Li, Beijing (CN); Jiangwei Ying, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 549 days.

(21) Appl. No.: 17/965,018

(22) Filed: Oct. 13, 2022

(65) Prior Publication Data
US 2023/0029714 A1    Feb. 2, 2023

Related U.S. Application Data

(63) Continuation of application No. PCT/CN2021/086647, filed on Apr. 12, 2021.

(30) Foreign Application Priority Data

Apr. 13, 2020    (CN) .......................... 202010286465.3

(51) Int. Cl.
*H04W 76/14*    (2018.01)
*H04M 15/00*    (2006.01)
*H04W 12/06*    (2021.01)

(52) U.S. Cl.
CPC .......... *H04W 76/14* (2018.02); *H04M 15/66* (2013.01); *H04W 12/06* (2013.01)

(58) Field of Classification Search
CPC ....... H04W 4/46; H04W 12/06; H04W 76/00; H04W 76/10; H04W 76/14; H04W 88/04; H04M 15/66
See application file for complete search history.

(56) References Cited

U.S. PATENT DOCUMENTS

2018/0324585 A1*  11/2018  Nair .................... H04L 63/0876
2019/0313222 A1   10/2019  Karampatsis et al.
(Continued)

FOREIGN PATENT DOCUMENTS

CN    101399699 A    4/2009
CN    107690165 A    2/2018
(Continued)

OTHER PUBLICATIONS

Nokia, Nokia Shanghai Bell, KI#3, solution #47 update. SA WG2 Meeting #143e, Feb. 24 Mar. 9, 2021 ; Elbonia, S2-2100253, 5 pages.
(Continued)

*Primary Examiner* — Jeong S Park
(74) *Attorney, Agent, or Firm* — HAUPTMAN HAM, LLP

(57) ABSTRACT

An authorization method includes receiving, by a policy control function device of a relay terminal, a request message from an access and mobility management function device of the relay terminal. The request message includes an identifier of a remote terminal and an identifier of the relay terminal. The method also includes determining, by the policy control function device, an authorization result based on the identifier of the remote terminal and the identifier of the relay terminal. The authorization result indicates whether the relay terminal and the remote terminal are authorized to establish a relay service relationship. The method further includes sending, by the policy control function device, the authorization result to the access and mobility management function device.

13 Claims, 19 Drawing Sheets

(56) References Cited

U.S. PATENT DOCUMENTS

| | | | | |
|---|---|---|---|---|
| 2019/0335332 A1* | 10/2019 | Ying | .................... | H04W 40/22 |
| 2020/0053802 A1* | 2/2020 | Li | .................... | H04W 12/06 |
| 2020/0100111 A1* | 3/2020 | Yang | .................... | H04W 12/08 |
| 2020/0178343 A1* | 6/2020 | Kim | .................... | H04W 76/27 |
| 2021/0112409 A1* | 4/2021 | Rune | .................... | H04W 12/06 |
| 2021/0127343 A1* | 4/2021 | Mladin | .................... | H04W 76/14 |
| 2021/0360742 A1* | 11/2021 | Liao | .................... | H04W 60/00 |
| 2022/0174655 A1* | 6/2022 | Tsai | .................... | H04W 48/16 |

FOREIGN PATENT DOCUMENTS

| | | |
|---|---|---|
| CN | 109246688 A | 1/2019 |
| CN | 109286567 A | 1/2019 |
| CN | 109716810 A | 5/2019 |
| CN | 109997334 A | 7/2019 |
| CN | 110366216 A | 10/2019 |
| CN | 110881184 A | 3/2020 |
| CN | 110933711 A | 3/2020 |
| EP | 3557898 A1 | 10/2019 |
| WO | 2015035784 A1 | 3/2015 |
| WO | 2019137142 A1 | 7/2019 |
| WO | 2020057179 A1 | 3/2020 |

OTHER PUBLICATIONS

SA WG2, New SID: Study on System enhancement for Proximity based Services in 5GS. TSG SA Meeting #SP-83, Mar. 20-22, 2019, Shenzhen, China, SP-190186, 4 pages.

3GPP TR 23.752 V17.0.0 (Mar. 2021), 3rd Generation Partnership Project; Technical Specification Group Services and System Aspects; Study on system enhancement for Proximity based Services(ProSe) in the 5G System (5GS) (Release 17), 183 pages.

3GPP TR 23.733 V15.1.0 (Dec. 2017), 3rd Generation Partnership Project; Technical Specification Group Services and System Aspects; Study on Architecture Enhancements to ProSe UE-to-Network Relay(Release 15), 81 pages.

Huawei, HiSilicon, Resolution of Solution#7"s Ens. SA WG2 Meeting #136AH, Incheon, South Korea, Jan. 13, 17, 2020, S2-2000494, 11 pages.

Huawei, HiSilicon, Lenovo, Motorola Mobility, Mediatek, TNO, KPN, Philips, Intel, Vivo, Solution for Key Issue #3: Indirect Communication via UE-to-Network Relay UE. SA WG2 Meeting #136, Reno, NV, USA, Nov. 18 22, 2019, S2-1912746, 8 pages.

InterDigital Inc., New Solution on Service Authorization, Provisioning for UE-to-NW relay. SA WG2 Meeting #136AH, Jan. 13-17, 2020, Incheon, KR, S2-2001665, 3 pages.

3GPP TR 23.752 V0.3.0 (Jan. 2020), 3rd Generation Partnership Project; Technical Specification Group Services and System Aspects; Study on system enhancement for Proximity based Services (ProSe) in the 5G System (5GS) (Release 17), 73 pages.

International Search Report issued in corresponding International Application No. PCT/CN2021/086647, dated Jul. 8, 2021, pp. 1-10.

Chinese Office Action issued in corresponding Chinese Application No. 202010286465.3, dated Dec. 9, 2022, pp. 1-10.

Extended European Search Report issued in corresponding European Application No. 21788601.9, dated Feb. 21, 2023, pp. 1-8.

* cited by examiner

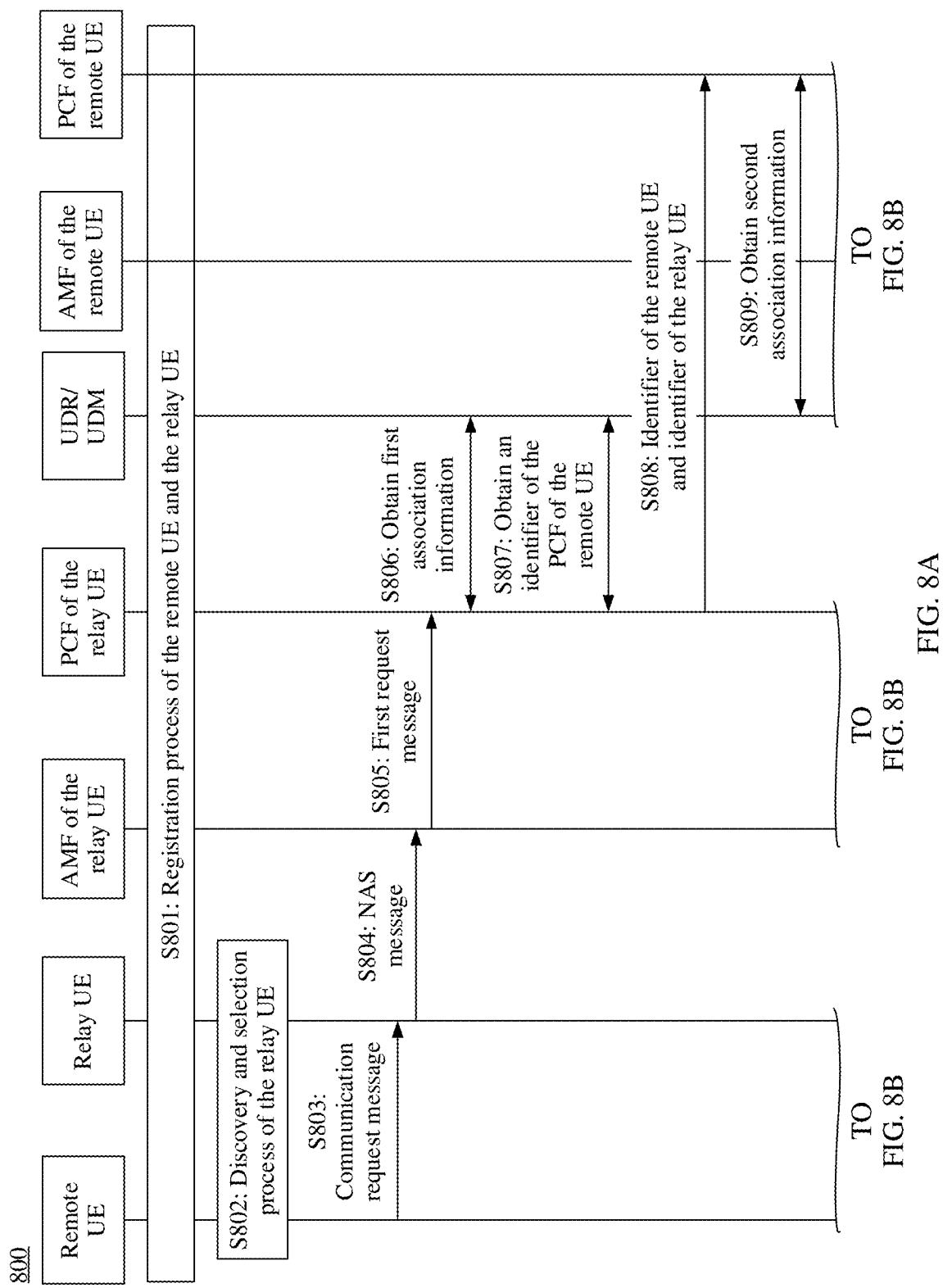

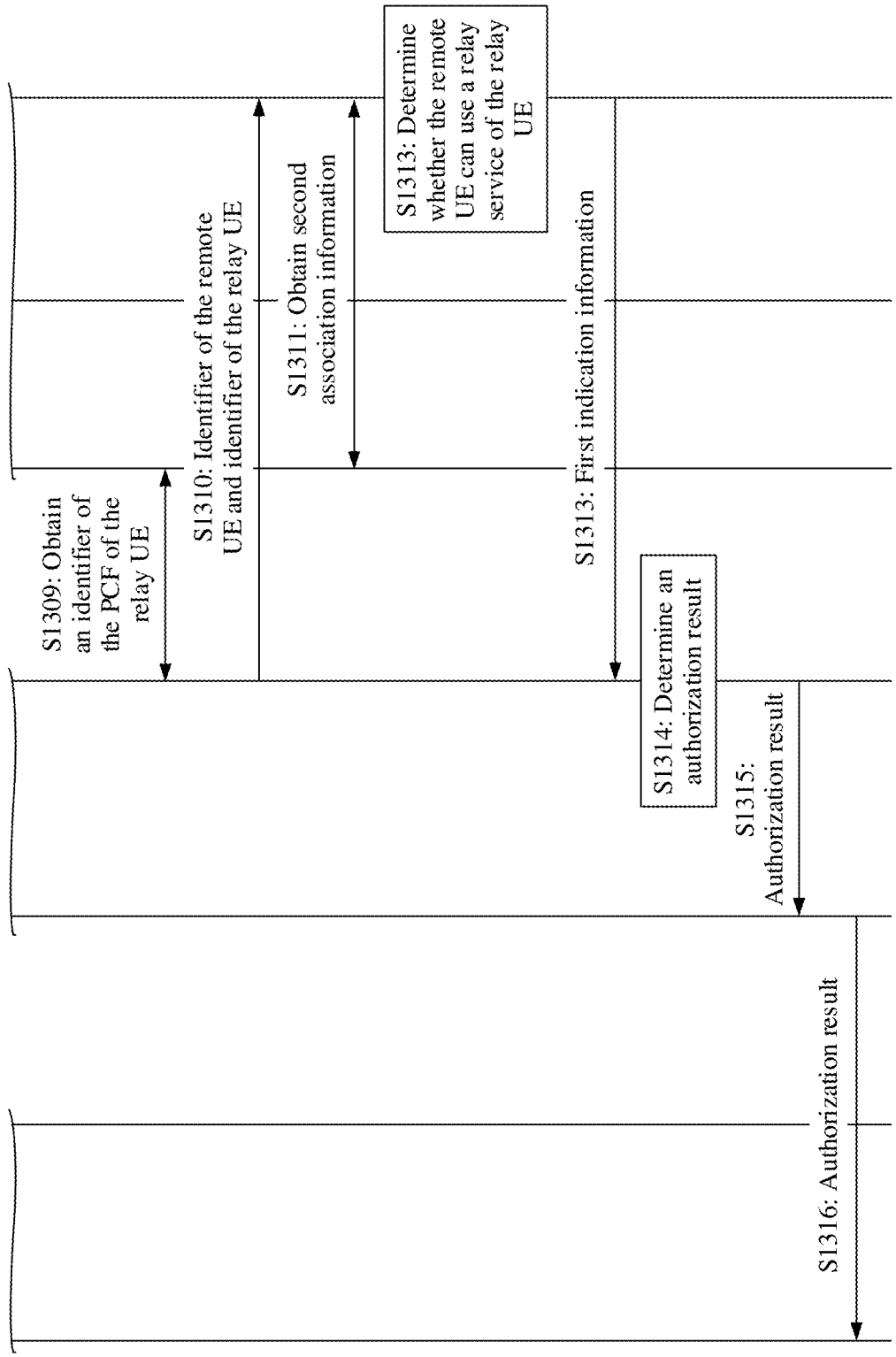

AUTHORIZATION METHOD, APPARATUS AND SYSTEM FOR AUTHORIZING RELAY SERVICE RELATIONSHIPS BETWEEN REMOTE AND RELAY TERMINALS USING POLICY CONTROL FUNCTION DEVICES

CROSS-REFERENCE TO RELATED APPLICATIONS

This application is a continuation of International Application No. PCT/CN2021/086647, filed on Apr. 12, 2021, which claims priority to Chinese Patent Application No. 202010286465.3, filed on Apr. 13, 2020. The disclosures of the aforementioned applications are hereby incorporated by reference in their entireties.

TECHNICAL FIELD

This application relates to the communications field, and more specifically, to an authorization method, a policy control function device, and an access and mobility management function device.

BACKGROUND

Usually, a terminal may directly access a network by using an access network device. In some special scenarios, for example, when the terminal is located outside network coverage, or a communication signal between the terminal and the access network device is poor, the terminal may access the network by using a relay service provided by a relay terminal. In this case, the terminal is referred to as a remote terminal relative to the relay terminal.

In an actual operation scenario, in consideration of security performance or other factors, one remote terminal may access the network by using any relay terminal, or may access the network by using only some relay terminals. For example, a remote terminal of a commercial type may not be allowed to access the network by using a relay terminal of a public security type. Therefore, the relay terminal and/or the remote terminal learns whether a relay service relationship may be established, in other words, whether the remote terminal may access the network by using the relay terminal.

SUMMARY

This application provides an authorization method, a policy control function device, and an access and mobility management function device. A policy control function device may determine whether to authorize a remote terminal and a relay terminal to establish a relay service relationship, and notify the relay terminal or the remote terminal of a determined authorization result, so that the relay terminal may determine, based on the authorization result, a request whether to allow the remote terminal to access a network by using the relay terminal, or the remote terminal may determine, based on the authorization result, whether to access a network by using the relay terminal.

According to a first aspect, an authorization method is provided, including: A first policy control function device receives a first request message from a first access and mobility management function device, where the first request message includes an identifier of a remote terminal and an identifier of a relay terminal, the first policy control function device is a policy control function device of the relay terminal, and the first access and mobility management function device is an access and mobility management function device of the relay terminal. The first policy control function device determines an authorization result based on the identifier of the remote terminal and the identifier of the relay terminal, where the authorization result indicates whether the relay terminal and the remote terminal are authorized to establish a relay service relationship. The first policy control function device sends the authorization result to the first access and mobility management function device.

According to the authorization method provided in this application, the policy control function device of the relay terminal may determine, based on the identifier of the relay terminal and the identifier of the remote terminal, whether to authorize the relay terminal and the remote terminal to establish the relay service relationship. Then, the policy control function device of the relay terminal may send the determined authorization result to the access and mobility management function device of the relay terminal, and the access and mobility management function device may forward the authorization result to the relay terminal. Further, the relay terminal may determine, based on the authorization result, whether to allow the relay terminal to access a network by using the relay terminal.

In addition, whether a terminal may be used as the relay terminal may alternatively be authorized by a policy control function device of the terminal. In this way, a policy control function device may determine whether to authorize a terminal as the relay terminal, and may also determine, when the terminal is authorized as the relay terminal, whether to authorize to establish a relay service relationship between the terminal and the remote terminal, so that centralization of authorization functions is implemented.

With reference to the first aspect, in some implementations of the first aspect, that the first policy control function device determines an authorization result based on the identifier of the remote terminal and the identifier of the relay terminal includes: The first policy control function device obtains first association information based on the identifier of the relay terminal, where the first association information indicates at least one remote terminal for which the relay terminal can provide a relay service. The first policy control function device determines the authorization result based on the identifier of the remote terminal and the first association information.

Optionally, the first association information may be an identifier of the at least one remote terminal for which the relay terminal can provide the relay service, or may indicate that the relay terminal can provide the relay service for all remote terminals.

Based on this solution, the first policy control function device may determine, by determining whether the at least one remote terminal for which the relay terminal can provide the relay service includes the remote terminal, whether to authorize the relay terminal and the remote terminal to establish the relay service relationship. For example, provided that the at least one remote terminal for which the relay terminal can provide the relay service includes the remote terminal, the relay terminal and the remote terminal may be authorized to establish the relay service relationship; otherwise, the relay terminal and the remote terminal may not be authorized to establish the relay service relationship.

With reference to the first aspect, in some implementations of the first aspect, that the first policy control function device determines an authorization result based on the identifier of the remote terminal and the identifier of the relay terminal includes: The first policy control function device obtains first association information based on the identifier of the relay terminal, where the first association information indicates a remote terminal for which the relay terminal can provide a relay service. The first policy control function device sends the identifier of the relay terminal and the identifier of the remote terminal to a second policy control function device, where the second policy control function device is a policy control function device of the remote terminal. The first policy control function device receives first indication information from the second policy control function device, where the first indication information indicates whether the remote terminal can use the relay service of the relay terminal. The first policy control function device determines the authorization result based on the identifier of the remote terminal, the first association information, and the first indication information.

Optionally, the first association information may be an identifier of the at least one remote terminal for which the relay terminal can provide the relay service, or may indicate that the relay terminal can provide the relay service for all remote terminals.

Based on this solution, the first policy control function device may determine whether the at least one remote terminal for which the relay terminal can provide the relay service includes the remote terminal, and may also determine, based on the first indication information sent by the second policy control function device, whether the remote terminal can use the relay service of the relay terminal. With reference to information in these two aspects, the first policy control function device may determine whether to authorize the relay terminal and the remote terminal to establish the relay service relationship. For example, if the at least one remote terminal for which the relay terminal can provide the relay service includes the remote terminal, and the remote terminal can use the relay service of the relay terminal, the relay terminal and the remote terminal are authorized to establish the relay service relationship; or if the at least one remote terminal for which the relay terminal can provide the relay service does not include the remote terminal, or the remote terminal cannot use the relay service of the relay terminal, the relay terminal and the remote terminal are not authorized to establish the relay service relationship.

With reference to the first aspect, in some implementations of the first aspect, that the first policy control function device sends the identifier of the relay terminal and the identifier of the remote terminal to a second policy control function device includes: The first policy control function device sends the identifier of the relay terminal and the identifier of the remote terminal to the second policy control function device based on an identifier of the second policy control function device, where the identifier of the second policy control function device is carried in the first request message.

Based on this solution, the first policy control function device may determine the second policy control function device based on the identifier of the second policy control function device in the first request message, and may further send the identifier of the relay terminal and the identifier of the remote terminal to the second policy control function device, to request the second policy control function device to determine whether the remote terminal can use the relay service of the relay terminal.

With reference to the first aspect, in some implementations of the first aspect, that the first policy control function device sends the identifier of the relay terminal and the identifier of the remote terminal to a second policy control function device includes: The first policy control function device sends the identifier of the relay terminal and the identifier of the remote terminal to the second policy control function device based on an identifier of the second policy control function device, where the identifier of the second policy control function device is obtained by the first policy control function device from a unified database or a unified data management device based on the identifier of the remote terminal.

Based on this solution, the first policy control function device may first obtain the identifier of the second policy control function device from the unified database or the unified data management device based on the identifier of the remote terminal, and may then send the identifier of the relay terminal and the identifier of the remote terminal to the second policy control function device, to request the second policy control function device to determine whether the remote terminal can use the relay service of the relay terminal.

With reference to the first aspect, in some implementations of the first aspect, that the first policy control function device obtains first association information based on the identifier of the relay terminal includes: The first policy control function device obtains the first association information from the unified database based on the identifier of the relay terminal.

Based on this solution, the information about the remote terminal associated with the relay terminal, namely, the information about the at least one remote terminal for which the relay terminal can provide the relay service, may be stored in the unified database as subscription information. When the remote terminal requests to access the network by using the relay terminal, the first policy control function device may obtain the subscription information from the unified database, to determine, based on the subscription information, whether to authorize the relay terminal and the remote terminal to establish the relay service relationship.

With reference to the first aspect, in some implementations of the first aspect, the identifier of the remote terminal is an international mobile subscriber identity (IMSI) or a universal public subscriber identity (GPSI), the identifier of the relay terminal is an IMSI or a GPSI, and the identifier of the remote terminal is different from the identifier of the relay terminal.

According to a second aspect, an authorization method is provided, including: A first access and mobility management function device sends a first request message to a first policy control function device, where the first access and mobility management function device is an access and mobility management function device of a relay terminal, the first policy control function device is a policy control function device of the relay terminal, and the first request message includes an identifier of the relay terminal and an identifier of a remote terminal. The first access and mobility management function device receives an authorization result from the first policy control function device, where the authorization result indicates whether the relay terminal and the remote terminal are authorized to establish a relay service relationship. The first access and mobility management function device sends the authorization result to the relay terminal.

According to the authorization method provided in this application, when the remote terminal requests to access a network by using the relay terminal, the access and mobility management function device of the relay terminal may request the policy control function device of the relay terminal to determine whether to authorize the relay terminal and the remote terminal to establish the relay service relationship, and after receiving the authorization result returned by the policy control function device of the relay terminal, the access and mobility management function device of the relay terminal may further return the authorization result to the relay terminal, so that the relay terminal may determine, based on the authorization result, whether to allow the remote terminal to access the network by using the relay terminal.

With reference to the second aspect, before that a first access and mobility management function device sends a first request message to a first policy control function device, the method may further include: The first access and mobility management function device receives the identifier of the relay terminal and the identifier of the remote terminal from the relay terminal.

With reference to the second aspect, in some implementations of the second aspect, the first request message may further include an identifier of a second policy control function device; and before that a first access and mobility management function device sends a first request message to a first policy control function device, the method may further include: The first access and mobility management function device obtains the identifier of the second policy control function device from a second access and mobility management function device, a unified data management device, or a unified database based on the identifier of the remote terminal, where the second access and mobility management function device is an access and mobility management function device of the remote terminal, and the second policy control function device is a policy control function device of the remote terminal.

Based on this solution, after obtaining the identifier of the second policy control function device, the first access and mobility management function device may send the identifier of the second policy control function device to the first policy control function device, and the first policy control function device may request, based on the identifier of the second policy control function device, the second policy control function device to determine whether the remote terminal can use the relay service of the relay terminal, and may further determine, based on a result returned by the second policy control function device, whether to authorize the relay terminal and the remote terminal to establish the relay service relationship.

With reference to the second aspect, in some implementations of the second aspect, the identifier of the remote terminal is an IMSI or a GPSI, the identifier of the relay terminal is an IMSI or a GPSI, and the identifier of the remote terminal is different from the identifier of the relay terminal.

According to a third aspect, an authorization method is provided, including: A second policy control function device receives an identifier of a relay terminal and an identifier of a remote terminal from a first policy control function device, where the second policy control function device is a policy control function device of the remote terminal, and the first policy control function device is a policy control function device of the relay terminal. The second policy control function device determines, based on the identifier of the relay terminal and the identifier of the remote terminal, whether the remote terminal can use a relay service of the relay terminal. The second policy control function device sends first indication information to the first policy control function device, where the first indication information indicates whether the remote terminal can use the relay service of the relay terminal.

According to the authorization method provided in this application, the policy control function device of the relay terminal may request the policy control function device of the remote terminal to determine whether the remote terminal can use the relay service of the relay terminal, so that the policy control function device of the relay terminal may determine, with reference to a determining result of the remote terminal, whether to authorize the relay terminal and the remote terminal to establish a relay service relationship.

With reference to the third aspect, in some implementations of the third aspect, that the second policy control function device determines, based on the identifier of the relay terminal and the identifier of the remote terminal, whether the remote terminal can use a relay service of the relay terminal includes: The second policy control function device obtains second association information based on the identifier of the remote terminal, where the second association information indicates at least one relay terminal that can provide the relay service for the remote terminal. The second policy control function device determines, based on the identifier of the relay terminal and the second association information, whether the relay terminal can provide the relay service for the remote terminal.

Optionally, the second association information may be an identifier of the at least one relay terminal that can provide the relay service for the remote terminal, or may indicate that all relay terminals can provide the relay service for the remote terminal.

Based on this solution, the second policy control function device determines, by determining whether the at least one relay terminal that can provide the relay service for the remote terminal includes the relay terminal, whether the relay terminal can provide the relay service for the remote terminal.

With reference to the third aspect, in some implementations of the third aspect, that the second policy control function device obtains second authorization information based on the identifier of the remote terminal includes: The second policy control function device obtains the second authorization information from a unified database based on the identifier of the remote terminal.

Based on this solution, the information about the relay terminal associated with the remote terminal, namely, the information about the at least one relay terminal that can provide the relay service for the remote terminal, may be stored in the unified database as subscription information. In this way, the second policy control function device may obtain the subscription information from the unified database, to determine whether the relay terminal can provide the relay service for the remote terminal.

With reference to the third aspect, in some implementations of the third aspect, before that a second policy control function device receives an identifier of a relay terminal and an identifier of a remote terminal from a first policy control function device, the method may further include: The second policy control function device stores a correspondence between an identifier of the second policy control function device and the identifier of the remote terminal in a unified database or a unified data management device.

Based on this solution, the first policy control function device or the first access and mobility management function device may obtain the identifier of the second policy control function device from the unified database or the unified data management device based on the identifier of the remote terminal.

With reference to the third aspect, in some implementations of the third aspect, the identifier of the remote terminal is an IMSI or a GPSI, the identifier of the relay terminal is an IMSI or a GPSI, and the identifier of the remote terminal is different from the identifier of the relay terminal.

According to a fourth aspect, an authorization method is provided, including: A first policy control function device receives a first request message from a first access and mobility management function device, where the first request message includes an identifier of a remote terminal and an identifier of a relay terminal, the first policy control function device is a policy control function device of the remote terminal, and the first access and mobility management function device is an access and mobility management function device of the remote terminal. The first policy control function device determines an authorization result based on the identifier of the remote terminal and the identifier of the relay terminal, where the authorization result indicates whether the relay terminal and the remote terminal are authorized to establish a relay service relationship. The first policy control function device sends the authorization result to the first access and mobility management function device.

According to the authorization method provided in this application, the policy control function device of the remote terminal may determine, based on the identifier of the relay terminal and the identifier of the remote terminal, whether to authorize the relay terminal and the remote terminal to establish the relay service relationship. Then, the policy control function device of the remote terminal may notify the remote terminal of the determined authorization result by using the access and mobility management function device of the remote terminal, and the remote terminal may further determine, based on the authorization result, whether the remote terminal may access a network by using the relay terminal.

In addition, whether a terminal may be used as the remote terminal may alternatively be authorized by a policy control function device of the terminal. In this way, a policy control function device may determine whether to authorize a terminal as the remote terminal, and may also determine, when the terminal is authorized as the remote terminal, whether to authorize to establish a relay service relationship between the terminal and the relay terminal, so that centralization of authorization functions is implemented.

With reference to the fourth aspect, in some implementations of the fourth aspect, that the first policy control function device determines an authorization result based on the identifier of the remote terminal and the identifier of the relay terminal includes: The first policy control function device obtains first association information based on the identifier of the remote terminal, where the first association information indicates at least one relay terminal that can provide a relay service for the remote terminal. The first policy control function device determines the authorization result based on the identifier of the relay terminal and the first association information.

Optionally, the first association information may be an identifier of the at least one relay terminal that can provide the relay service for the remote terminal, or may indicate that all relay terminals can provide the relay service for the remote terminal.

Based on this solution, the first policy control function device may determine, by determining whether the at least one relay terminal that can provide the relay service for the remote terminal includes the relay terminal, whether to authorize the relay terminal and the remote terminal to establish the relay service relationship. For example, provided that the at least one relay terminal that can provide the relay service for the remote terminal includes the relay terminal, the relay terminal and the remote terminal may be authorized to establish the relay service relationship; otherwise, the relay terminal and the remote terminal may not be authorized to establish the relay service relationship.

With reference to the fourth aspect, in some implementations of the fourth aspect, that the first policy control function device determines an authorization result based on the identifier of the remote terminal and the identifier of the relay terminal includes: The first policy control function device obtains first association information based on the identifier of the remote terminal, where the first association information indicates a relay terminal that can provide a relay service for the remote terminal. The first policy control function device sends the identifier of the relay terminal and the identifier of the remote terminal to a second policy control function device, where the second policy control function device is a policy control function device of the relay terminal. The first policy control function device receives first indication information from the second policy control function device, where the first indication information indicates whether the relay terminal can provide a relay service for the remote terminal. The first policy control function device determines the authorization result based on the identifier of the relay terminal, the first association information, and the first indication information.

Optionally, the first association information may be an identifier of the relay terminal that can provide the relay service for the remote terminal, or may indicate that all relay terminals can provide the relay service for the remote terminal.

Based on this solution, the first policy control function device may determine whether the at least one relay terminal that can provide the relay service for the remote terminal includes the relay terminal, and may also determine, based on the first indication information sent by the second policy control function device, whether the relay terminal can provide the relay service for the remote terminal. With reference to information in these two aspects, the first policy control function device may determine whether to authorize the relay terminal and the remote terminal to establish the relay service relationship. For example, if the at least one relay terminal that can provide the relay service for the remote terminal includes the relay terminal, and the relay terminal can provide the relay service for the remote terminal, the relay terminal and the remote terminal are authorized to establish the relay service relationship; or if the relay terminal that can provide the relay service for the remote terminal does not include the relay terminal, or the relay terminal cannot provide the relay service for the remote terminal, the relay terminal and the remote terminal are not authorized to establish the relay service relationship.

With reference to the fourth aspect, in some implementations of the fourth aspect, that the first policy control function device sends the identifier of the relay terminal and the identifier of the remote terminal to a second policy control function device includes: The first policy control function device sends the identifier of the relay terminal and the identifier of the remote terminal to the second policy control function device based on an identifier of the second policy control function device, where the identifier of the second policy control function device is carried in the first request message.

Based on this solution, the first policy control function device may determine the second policy control function device based on the identifier of the second policy control function device in the first request message, and may further send the identifier of the relay terminal and the identifier of the remote terminal to the second policy control function device, to request the second policy control function device to determine whether the relay terminal can provide the relay service for the remote terminal.

With reference to the fourth aspect, in some implementations of the fourth aspect, that the first policy control function device sends the identifier of the relay terminal and the identifier of the remote terminal to a second policy control function device includes: The first policy control function device sends the identifier of the relay terminal and the identifier of the remote terminal to the second policy control function device based on an identifier of the second policy control function device, where the identifier of the second policy control function device is obtained by the first policy control function device from a unified database or a unified data management device based on the identifier of the relay terminal.

Based on this solution, the first policy control function device may first obtain the identifier of the second policy control function device from the unified database or the unified data management device based on the identifier of the relay terminal, and may then send the identifier of the relay terminal and the identifier of the remote terminal to the second policy control function device, to request the second policy control function device to determine whether the relay terminal can provide the relay service for the remote terminal.

With reference to the fourth aspect, in some implementations of the fourth aspect, that the first policy control function device obtains first association information based on the identifier of the remote terminal includes: The first policy control function device obtains the first association information from the unified database based on the identifier of the remote terminal.

Based on this solution, the information about the relay terminal associated with the remote terminal, namely, the information about the relay terminal that can provide the relay service for the remote terminal, may be stored in the unified database as subscription information. When the remote terminal requests to access the network by using the relay terminal, the first policy control function device may obtain the subscription information from the unified database, to determine, based on the subscription information, whether to authorize the relay terminal and the remote terminal to establish the relay service relationship.

With reference to the fourth aspect, in some implementations of the fourth aspect, the identifier of the remote terminal is an IMSI or a general GPSI, the identifier of the relay terminal is an IMSI or a GPSI, and the identifier of the remote terminal is different from the identifier of the relay terminal.

According to a fifth aspect, an authorization method is provided, including: A first access and mobility management function device sends a first request message to a first policy control function device, where the first access and mobility management function device is an access and mobility management function device of a remote terminal, the first policy control function device is a policy control function device of the remote terminal, and the first request message includes an identifier of a relay terminal and an identifier of the remote terminal. The first access and mobility management function device receives an authorization result from the first policy control function device, where the authorization result indicates whether the relay terminal and the remote terminal are authorized to establish a relay service relationship. The first access and mobility management function device sends the authorization result to the remote terminal.

According to the authorization method provided in this application, when the remote terminal accesses a network by using the relay terminal, the access and mobility management function device of the remote terminal may request the policy control function device of the remote terminal to determine whether to authorize the relay terminal and the remote terminal to establish the relay service relationship, and after receiving the authorization result returned by the policy control function device of the remote terminal, the access and mobility management function device of the remote terminal may further return the authorization result to the remote terminal, so that the remote terminal may determine, based on the authorization result, whether the remote terminal may access the network by using the relay terminal.

With reference to the fifth aspect, in some implementations of the fifth aspect, before that a first access and mobility management function device sends a first request message to a first policy control function device, the method may further include: The first access and mobility management function device receives the identifier of the remote terminal and the identifier of the relay terminal from the remote terminal. The first access and mobility management function device generates the first request message based on the identifier of the relay terminal and the identifier of the remote terminal.

With reference to the fifth aspect, in some implementations of the fifth aspect, the first request message may further include an identifier of a second policy control function device; and before that a first access and mobility management function device sends a first request message to a first policy control function device, the method may further include: The first access and mobility management function device obtains the identifier of the second policy control function device from a second access and mobility management function device, a unified data management device, or a unified database based on the identifier of the remote terminal, where the second access and mobility management function device is an access and mobility management function device of the first relay terminal, and the second policy control function device is a policy control function device of the relay terminal.

Based on this solution, after obtaining the identifier of the second policy control function device, the first access and mobility management function device may send the identifier of the second policy control function device to the first policy control function device, and the first policy control function device may request, based on the identifier of the second policy control function device, the second policy control function device to determine whether the relay terminal can provide the relay service for the remote terminal, and may further determine, based on the result returned by the second policy control function device, whether to authorize the relay terminal and the remote terminal to establish the relay service relationship.

With reference to the fifth aspect, in some implementations of the fifth aspect, the identifier of the remote terminal is an IMSI or a GPSI, the identifier of the relay terminal is an IMSI or a GPSI, and the identifier of the remote terminal is different from the identifier of the relay terminal.

According to a sixth aspect, an authorization method is provided, including: A second policy control function device receives an identifier of a relay terminal and an identifier of a remote terminal from a first policy control function device, where the second policy control function device is a policy control function device of the relay terminal, and the first policy control function device is a policy control function device of the remote terminal. The second policy control function device determines, based on the identifier of the relay terminal and the identifier of the remote terminal, whether the relay terminal can provide a relay service for the remote terminal. The second policy control function device sends first indication information to the first policy control function device, where the first indication information indicates whether the relay terminal can provide the relay service for the remote terminal.

According to the authorization method provided in this application, the policy control function device of the remote terminal may request the policy control function device of the relay terminal to determine whether the relay terminal can provide the relay service for the remote terminal, so that the policy control function device of the remote terminal may determine, with reference to a determining result of the relay terminal, whether to authorize the relay terminal and the remote terminal to establish a relay service relationship.

With reference to the sixth aspect, in some implementations of the sixth aspect, that the second policy control function device determines, based on the identifier of the relay terminal and the identifier of the remote terminal, whether the relay terminal can provide a relay service for the remote terminal includes: The second policy control function device obtains second association information based on the identifier of the relay terminal, where the second association information indicates at least one remote terminal for which the relay terminal can provide the relay service. The second policy control function device determines, based on the identifier of the relay terminal and the second association information, whether the relay terminal can provide the relay service for the remote terminal.

Optionally, the second association information may be an identifier of the at least one remote terminal for which the relay terminal can provide the relay service, or may indicate that the relay terminal can provide the relay service for all remote terminals.

Based on this solution, the second policy control function device determines, by determining whether the at least one remote terminal to which the relay terminal can provide the relay service includes the remote terminal, whether the relay terminal can provide the relay service for the remote terminal.

With reference to the sixth aspect, in some implementations of the sixth aspect, that the second policy control function device obtains second authorization information based on the identifier of the relay terminal includes: The second policy control function device obtains the second authorization information from a unified database based on the identifier of the relay terminal.

Based on this solution, the information about the remote terminal associated with the relay terminal, namely, the information about the remote terminal for which the relay terminal can provide the relay service, may be stored in the unified database as subscription information. In this way, the second policy control function device may obtain the subscription information from the unified database, to determine whether the relay terminal can provide the relay service for the remote terminal.

With reference to the sixth aspect, in some implementations of the sixth aspect, before that a second policy control function device receives an identifier of a relay terminal and an identifier of a remote terminal from a first policy control function device, the method may further include: The second policy control function device stores a correspondence between an identifier of the second policy control function device and the identifier of the relay terminal in a unified database or a unified data management device.

Based on this solution, the first policy control function device or the first access and mobility management function device may obtain the identifier of the second policy control function device from the unified database or the unified data management device based on the identifier of the relay terminal.

With reference to the sixth aspect, in some implementations of the sixth aspect, the identifier of the remote terminal is an IMSI or a GPSI, the identifier of the relay terminal is an IMSI or a GPSI, and the identifier of the remote terminal is different from the identifier of the relay terminal.

According to a seventh aspect, a communication apparatus is provided, including: modules or units configured to perform the method in any one of the first aspect or the possible implementations of the first aspect, modules or units configured to perform the method in any one of the third aspect or the possible implementations of the third aspect, modules or units configured to perform the method in any one of the fourth aspect or the possible implementations of the fourth aspect, or modules or units configured to perform the method in any one of the sixth aspect or the possible implementations of the sixth aspect. Optionally, the communication apparatus may be a policy control function device or a policy control function network element.

According to an eighth aspect, a communication apparatus is provided, including a processor. The processor is coupled to a memory, and may be configured to execute instructions in the memory, so that the apparatus performs the method in any one of the first aspect or the possible implementations of the first aspect, the method in any one of the third aspect or the possible implementations of the third aspect, the method in any one of the fourth aspect or the possible implementations of the fourth aspect, or the method in any one of the sixth aspect or the possible implementations of the sixth aspect. Optionally, the apparatus may be a policy control function device or a policy control function network element.

Optionally, the apparatus further includes the memory. Optionally, the apparatus further includes an interface circuit, and the processor is coupled to the interface circuit.

According to a ninth aspect, a communication apparatus is provided, including: modules or units configured to perform the method in any one of the second aspect or the possible implementations of the second aspect, or modules or units configured to perform the method in any one of the fifth aspect or the possible implementations of the fifth aspect. Optionally, the communication apparatus may be an access and mobility management function device or an access and mobility management function network element.

According to a tenth aspect, a communication apparatus is provided, including a processor. The processor is coupled to a memory, and may be configured to execute instructions in the memory, so that the apparatus performs the method in any one of the second aspect or the possible implementations of the second aspect, or the method in any one of the fifth aspect or the possible implementations of the fifth aspect. Optionally, the apparatus may be an access and mobility management function device or an access and mobility management function network element.

Optionally, the apparatus further includes the memory. Optionally, the apparatus further includes an interface circuit, and the processor is coupled to the interface circuit.

According to an eleventh aspect, a processor is provided, including: an input circuit, an output circuit, and a processing circuit. The processing circuit is configured to: receive a signal by using the input circuit, and transmit a signal by using the output circuit, so that the processor performs the method in any one of the first aspect or the possible implementations of the first aspect, the method in any one of the second aspect or the possible implementations of the second aspect, the method in any one of the third aspect or the possible implementations of the third aspect, the method in any one of the fourth aspect or the possible implementations of the fourth aspect, the method in any one of the fifth aspect or the possible implementations of the fifth aspect, or the method in any one of the sixth aspect or the possible implementations of the sixth aspect. Optionally, the processor may be a processor disposed in a policy control function device or a policy control function network element. Alternatively, the processor may be a processor disposed in an access and mobility management function device or an access and mobility management function network element.

During specific implementation, the processor may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in this embodiment of this application.

According to a twelfth aspect, a processing apparatus is provided, including a processor and a memory. The processor is configured to: read instructions stored in the memory, receive a signal by using a receiver, and transmit a signal by using a transmitter, to perform the method in any one of the first aspect or the possible implementations of the first aspect, the method in any one of the second aspect or the possible implementations of the second aspect, the method in any one of the third aspect or the possible implementations of the third aspect, the method in any one of the fourth aspect or the possible implementations of the fourth aspect, the method in any one of the fifth aspect or the possible implementations of the fifth aspect, or the method in any one of the sixth aspect or the possible implementations of the sixth aspect. Optionally, the processing apparatus may be a processing apparatus disposed in a policy control function device or a policy control function network element. Alternatively, the processing apparatus may be a processing apparatus disposed in an access and mobility management function device or an access and mobility management function network element.

Optionally, there are one or more processors, and there are one or more memories.

Optionally, the memory may be integrated with the processor, or the memory and the processor are separately disposed.

During specific implementation, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

It should be understood that a related signal exchange process may be a process of receiving or sending a signal from the processor. A signal output by the processor may be output to the transmitter, and an input signal received by the processor may be from the receiver. The transmitter and the receiver may be collectively referred to as a transceiver.

The processing apparatus according to the twelfth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated in the processor, or may be located outside the processor and exist independently.

According to a thirteenth aspect, a computer program product is provided. The computer program product includes a computer program (which may also be referred to as code or instructions), and when the computer program is executed, the method in any one of the first aspect or the possible implementations of the first aspect, the method in any one of the second aspect or the possible implementations of the second aspect, the method in any one of the third aspect or the possible implementations of the third aspect, the method in any one of the fourth aspect or the possible implementations of the fourth aspect, the method in any one of the fifth aspect or the possible implementations of the fifth aspect, or the method in any one of the sixth aspect or the possible implementations of the sixth aspect is enabled to be performed.

According to a fourteenth aspect, a readable storage medium is provided. The readable storage medium stores a computer program (which may also be referred to as code or instructions), and when the computer program or the instructions are executed, the method in any one of the first aspect or the possible implementations of the first aspect, the method in any one of the second aspect or the possible implementations of the second aspect, the method in any one of the third aspect or the possible implementations of the third aspect, the method in any one of the fourth aspect or the possible implementations of the fourth aspect, the method in any one of the fifth aspect or the possible implementations of the fifth aspect, or the method in any one of the sixth aspect or the possible implementations of the sixth aspect is enabled to be performed.

According to a fifteenth aspect, a communication system is provided, including the first policy control function device and the first access and mobility management function device in any one of the foregoing aspects or the possible implementations of the foregoing aspects. Optionally, the communication system may further include one or more of the following: a relay terminal, a remote terminal, a second policy control function device, or a second access and mobility management function device.

According to a sixteenth aspect, an authorization method is provided, including: receiving a first request message from a first access and mobility management function device, where the first request message includes an identifier of a remote terminal and an identifier of a relay terminal, and the first access and mobility management function device is an access and mobility management function device of the relay terminal; determining an authorization result based on the identifier of the remote terminal and the identifier of the relay terminal, where the authorization result indicates whether the relay terminal and the remote terminal are authorized to establish a relay service relationship; and sending the authorization result to the first access and mobility management function device.

According to the authorization method provided in this application, whether the relay terminal and the remote terminal are authorized to establish the relay service relationship may be determined based on the identifier of the relay terminal and the identifier of the remote terminal, the determined authorization result is sent to the access and mobility management function device of the relay terminal, and the access and mobility management function device may forward the authorization result to the relay terminal. Further, the relay terminal may determine, based on the authorization result, whether to allow the relay terminal to access a network by using the relay terminal.

With reference to the sixteenth aspect, in some implementations of the sixteenth aspect, the determining an authorization result based on the identifier of the remote terminal and the identifier of the relay terminal includes: obtaining first association information based on the identifier of the relay terminal, where the first association information indicates at least one remote terminal for which the relay terminal can provide a relay service; and determining the authorization result based on the identifier of the remote terminal and the first association information.

Optionally, the first association information may be an identifier of the at least one remote terminal for which the relay terminal can provide the relay service, or may indicate that the relay terminal can provide the relay service for all remote terminals.

Based on this solution, by determining whether the at least one remote terminal for which the relay terminal can provide the relay service includes the remote terminal, whether the relay terminal and the remote terminal are authorized to establish the relay service relationship may be determined. For example, provided that the at least one remote terminal for which the relay terminal can provide the relay service includes the remote terminal, the relay terminal and the remote terminal may be authorized to establish the relay service relationship; otherwise, the relay terminal and the remote terminal may not be authorized to establish the relay service relationship.

With reference to the sixteenth aspect, in some implementations of the sixteenth aspect, the determining an authorization result based on the identifier of the remote terminal and the identifier of the relay terminal includes: obtaining first association information based on the identifier of the relay terminal, where the first association information indicates at least one remote terminal for which the relay terminal can provide a relay service; sending the identifier of the relay terminal and the identifier of the remote terminal to a second policy control function device, where the second policy control function device is a policy control function device of the remote terminal; receiving first indication information from the second policy control function device, where the first indication information indicates whether the remote terminal can use the relay service of the relay terminal; and determining the authorization result based on the identifier of the remote terminal, the first association information, and the first indication information.

Optionally, the first association information may be an identifier of the at least one remote terminal for which the relay terminal can provide the relay service, or may indicate that the relay terminal can provide the relay service for all remote terminals.

Based on this solution, whether the at least one remote terminal for which the relay terminal can provide the relay service includes the remote terminal may be determined, and whether the remote terminal can use the relay service of the relay terminal may also be determined based on the first indication information sent by the second policy control function device. With reference to information in these two aspects, whether the relay terminal and the remote terminal are authorized to establish the relay service relationship may be determined. For example, if the at least one remote terminal for which the relay terminal can provide the relay service includes the remote terminal, and the remote terminal can use the relay service of the relay terminal, the relay terminal and the remote terminal are authorized to establish the relay service relationship; or if the at least one remote terminal for which the relay terminal can provide the relay service does not include the remote terminal, or the remote terminal cannot use the relay service of the relay terminal, the relay terminal and the remote terminal are not authorized to establish the relay service relationship.

With reference to the sixteenth aspect, in some implementations of the sixteenth aspect, the sending the identifier of the relay terminal and the identifier of the remote terminal to a second policy control function device includes: sending the identifier of the relay terminal and the identifier of the remote terminal to the second policy control function device based on an identifier of the second policy control function device, where the identifier of the second policy control function device is carried in the first request message.

Based on this solution, the second policy control function device may be determined based on the identifier of the second policy control function device in the first request message, and the identifier of the relay terminal and the identifier of the remote terminal may be further sent to the second policy control function device, to request the second policy control function device to determine whether the remote terminal can use the relay service of the relay terminal.

With reference to the sixteenth aspect, in some implementations of the sixteenth aspect, the sending the identifier of the relay terminal and the identifier of the remote terminal to a second policy control function device includes: sending the identifier of the relay terminal and the identifier of the remote terminal to the second policy control function device based on an identifier of the second policy control function device, where the identifier of the second policy control function device is obtained from a unified database or a unified data management device based on the identifier of the remote terminal.

Based on this solution, the identifier of the second policy control function device may be first obtained from the unified database or the unified data management device based on the identifier of the remote terminal, and the identifier of the relay terminal and the identifier of the remote terminal may be then sent to the second policy control function device, to request the second policy control function device to determine whether the remote terminal can use the relay service of the relay terminal.

With reference to the sixteenth aspect, in some implementations of the sixteenth aspect, the obtaining first association information based on the identifier of the relay terminal includes: obtaining the first association information from the unified database based on the identifier of the relay terminal.

Based on this solution, the information about the remote terminal associated with the relay terminal, namely, the information about the at least one remote terminal for which the relay terminal can provide the relay service, may be stored in the unified database as subscription information. When the remote terminal requests to access the network by using the relay terminal, the subscription information may be obtained from the unified database, to determine, based on the subscription information, whether the relay terminal and the remote terminal are authorized to establish the relay service relationship.

With reference to the sixteenth aspect, in some implementations of the sixteenth aspect, the identifier of the remote terminal is an international mobile subscriber identity IMSI or a universal public subscriber identity GPSI, the identifier of the relay terminal is an IMSI or a GPSI, and the identifier of the remote terminal is different from the identifier of the relay terminal.

According to a seventeenth aspect, an authorization method is provided, including: sending a first request message to a first policy control function device, where the first policy control function device is a policy control function device of a relay terminal, and the first request message includes an identifier of the relay terminal and an identifier of a remote terminal; receiving an authorization result from the first policy control function device, where the authorization result indicates whether the relay terminal and the remote terminal are authorized to establish a relay service relationship; and sending the authorization result to the relay terminal.

According to the authorization method provided in this application, when the remote terminal requests to access a network by using the relay terminal, the policy control function device of the relay terminal may be requested to determine whether to authorize the relay terminal and the remote terminal to establish the relay service relationship, and after the authorization result returned by the policy control function device of the relay terminal is received, the authorization result may be further returned to the relay terminal, so that the relay terminal may determine, based on the authorization result, whether to allow the remote terminal to access the network by using the relay terminal.

With reference to the seventeenth aspect, in some implementations of the seventeenth aspect, before the sending a first request message to a first policy control function device, the method further includes: receiving the identifier of the relay terminal and the identifier of the remote terminal from the relay terminal.

With reference to the seventeenth aspect, in some implementations of the seventeenth aspect, the first request message further includes an identifier of a second policy control function device; and before the sending a first request message to a first policy control function device, the method further includes: obtaining the identifier of the second policy control function device from a second access and mobility management function device, a unified data management device, or a unified database based on the identifier of the remote terminal, where the second access and mobility management function device is an access and mobility management function device of the remote terminal, and the second policy control function device is a policy control function device of the remote terminal.

Based on this solution, after the identifier of the second policy control function device is obtained, the identifier of the second policy control function device may be sent to the first policy control function device, and the first policy control function device may request, based on the identifier of the second policy control function device, the second policy control function device to determine whether the remote terminal can use the relay service of the relay terminal, and may further determine, based on the result returned by the second policy control function device, whether to authorize the relay terminal and the remote terminal to establish the relay service relationship.

With reference to the seventeenth aspect, in some implementations of the seventeenth aspect, the identifier of the remote terminal is an IMSI or a GPSI, the identifier of the relay terminal is an IMSI or a GPSI, and the identifier of the remote terminal is different from the identifier of the relay terminal.

According to an eighteenth aspect, an authorization method is provided, including: receiving an identifier of a relay terminal and an identifier of a remote terminal from a first policy control function device, where the first policy control function device is a policy control function device of the relay terminal; determining, based on the identifier of the relay terminal and the identifier of the remote terminal, whether the remote terminal can use a relay service of the relay terminal; and sending first indication information to the first policy control function device, where the first indication information indicates whether the remote terminal can use the relay service of the relay terminal.

According to the authorization method provided in this application, the policy control function device of the remote terminal may be requested to determine whether the remote terminal can use the relay service of the relay terminal, so that whether the relay terminal and the remote terminal are authorized to establish a relay service relationship may be determined with reference to a determining result of the remote terminal.

With reference to the eighteenth aspect, in some implementations of the eighteenth aspect, the determining, based on the identifier of the relay terminal and the identifier of the remote terminal, whether the remote terminal can use a relay service of the relay terminal includes: obtaining second association information based on the identifier of the remote terminal, where the second association information indicates at least one relay terminal that can provide the relay service for the remote terminal; and determining, based on the identifier of the relay terminal and the second association information, whether the relay terminal can provide the relay service for the remote terminal.

Optionally, the second association information may be an identifier of the at least one relay terminal that can provide the relay service for the remote terminal, or may indicate that all relay terminals can provide the relay service for the remote terminal.

Based on this solution, by determining whether the at least one relay terminal that can provide the relay service for the remote terminal includes the relay terminal, whether the relay terminal can provide the relay service for the remote terminal is determined.

With reference to the eighteenth aspect, in some implementations of the eighteenth aspect, the obtaining second authorization information based on the identifier of the remote terminal includes: obtaining the second authorization information from a unified database based on the identifier of the remote terminal.

Based on this solution, the information about the relay terminal associated with the remote terminal, namely, the information about the at least one relay terminal that can provide the relay service for the remote terminal, may be stored in the unified database as subscription information. In this way, the subscription information may be obtained from the unified database, to determine whether the relay terminal can provide the relay service for the remote terminal.

According to a nineteenth aspect, a communication apparatus is provided, including modules or units configured to perform the method in any one of the sixteenth aspect to the eighteenth aspect or the possible implementations of the sixteenth aspect to the eighteenth aspect.

According to a twentieth aspect, a communication apparatus is provided, including a processor. The processor is coupled to a memory, and may be configured to execute instructions in the memory, so that the apparatus performs the method in any one of the sixteenth aspect to the eighteenth aspect or the possible implementations of the sixteenth aspect to the eighteenth aspect.

Optionally, the apparatus further includes the memory. Optionally, the apparatus further includes an interface circuit, and the processor is coupled to the interface circuit.

According to a twenty-first aspect, a processor is provided, including: an input circuit, an output circuit, and a processing circuit. The processing circuit is configured to: receive a signal by using the input circuit, and transmit a signal by using the output circuit, so that the processor performs the method in any one of the sixteenth aspect to the eighteenth aspect or the possible implementations of the sixteenth aspect to the eighteenth aspect.

During specific implementation, the processor may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in this embodiment of this application.

According to a twenty-second aspect, a processing apparatus is provided, including a processor and a memory. The processor is configured to: read instructions stored in the memory, receive a signal by using a receiver, and transmit a signal by using a transmitter, to perform the method in any one of the sixteenth aspect to the eighteenth aspect or the possible implementations of the sixteenth aspect to the eighteenth aspect. Optionally, there are one or more processors, and there are one or more memories.

Optionally, the memory may be integrated with the processor, or the memory and the processor are separately disposed.

During specific implementation, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

It should be understood that a related signal exchange process may be a process of receiving or sending a signal from the processor. A signal output by the processor may be output to the transmitter, and an input signal received by the processor may be from the receiver. The transmitter and the receiver may be collectively referred to as a transceiver.

The processing apparatus according to the twenty-second aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated in the processor, or may be located outside the processor and exist independently.

According to a twenty-third aspect, a computer program product is provided. The computer program product includes a computer program (which may also be referred to as code or instructions), and when the computer program is executed, the method in any one of the sixteenth aspect to the eighteenth aspect or the possible implementations of the sixteenth aspect to the eighteenth aspect is enabled to be performed.

According to a twenty-fourth aspect, a readable storage medium is provided. The readable storage medium stores a computer program (which may also be referred to as code or instructions), and when the computer program or the instructions are executed, the method in any one of the sixteenth aspect to the eighteenth aspect or the possible implementations of the sixteenth aspect to the eighteenth aspect is enabled to be performed.

BRIEF DESCRIPTION OF DRAWINGS

FIG. 5 to FIG. 8A and FIG. 8B are respectively specific examples of the authorization method shown in FIG. 4;

FIG. 10 to FIG. 13A and FIG. 13B are respectively specific examples of the authorization method shown in FIG. 9;

DESCRIPTION OF EMBODIMENTS

The following describes technical solutions of this application with reference to the accompanying drawings.

The technical solutions in embodiments of this application are applicable to various communication systems, such as a long term evolution (LTE) system, an LTE frequency division duplex (FDD) system, an LTE time division duplex (TDD) system, a 5th generation (5G) system, a new radio (NR) system, or another communication system that may appear in the future.

With the rapid development of mobile communication, widespread use of new service types, for example, data services such as video chat and virtual reality (VR)/augmented reality (AR), increases a bandwidth requirement of a user. Device-to-device (D2D) communication allows direct communication between terminals, and a D2D terminal may share spectrum resources with cell users under control of a cell network, so that utilization of the spectrum resources is effectively improved.

Figure 1:
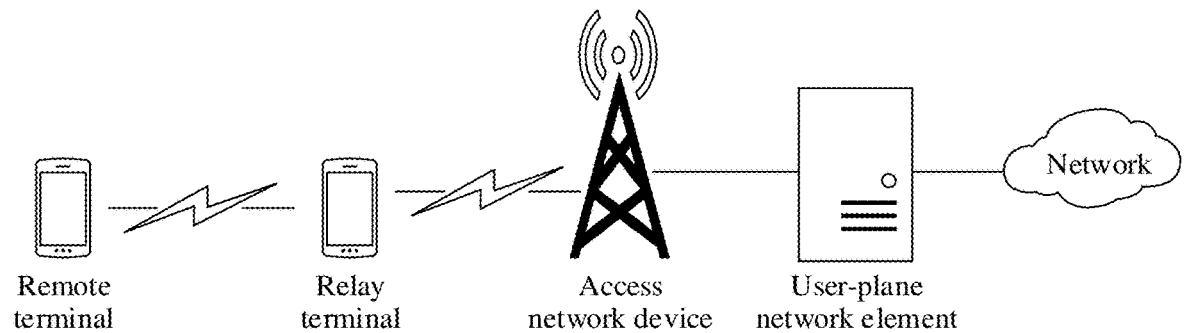
FIG. 1 is a diagram of an architecture of a communication system in an indirect communication manner.

The D2D communication includes one-to-many communication and one-to-one communication. The one-to-many communication corresponds to multicast and broadcast communication, and the one-to-one communication corresponds to unicast communication. In the one-to-one communication, if being within a short distance range, a sender terminal and a receiver terminal may perform PC5 (ProSe Communication 5) communication after mutual discovery. Refer to FIG. 1. When a terminal is located outside network coverage or has a poor communication signal with an access network device, the terminal, as a remote terminal, may perform PC5 communication with a relay terminal, and is connected to the access network device by using a relay service provided by the relay terminal, to access a network. This indirect communication manner, namely, a communication manner in which the remote terminal accesses the network by using the relay terminal, may be extended to support terminal-to-network communication outside the network coverage.

In an actual operation scenario, one remote terminal may access the network by using any relay terminal, or may access the network by using only some relay terminals. For example, a remote terminal of a commercial type may not be allowed to access the network by using a relay terminal of a public security type. Therefore, the relay terminal and/or the remote terminal learns whether a relay service relationship may be established, in other words, whether the remote terminal may access the network by using the relay terminal.

In view of this, this application provides two authorization methods. In a first method, a first core network device may determine an authorization result. For example, the first core network device may determine whether to authorize the relay terminal and the remote terminal to establish the relay service relationship. The first core network device is a core network device that determines whether to authorize the terminal as the relay terminal. After determining the authorization result, the first core network device may notify the relay terminal of the determined authorization result, so that the relay terminal may determine whether to allow the remote terminal to access the network by using the relay terminal. By using the method, authorization centralization can be implemented while whether the relay terminal and the remote terminal are authorized to establish the relay service relationship is determined, to avoid signaling interaction between two devices, where the two devices are a device that determines whether to authorize the relay terminal and the remote terminal to establish the relay service relationship and a device that determines whether the terminal is the relay terminal, and are not a same device.

In a second method, a second core network device may determine an authorization result. For example, the second core network device may determine whether to authorize the relay terminal and the remote terminal to establish the relay service relationship. The second core network device is a core network device that determines whether to authorize the terminal as the remote terminal. After determining the authorization result, the second core network device may notify the remote terminal of the determined authorization result, so that the remote terminal may determine whether the remote terminal may access the network by using the relay terminal. By using the method, authorization centralization can be implemented while whether the relay terminal and the remote terminal are authorized to establish the relay service relationship is determined, to avoid signaling interaction between two devices, where the two devices are a device that determines whether to authorize the relay terminal and the remote terminal to establish the relay service relationship and a device that determines whether the terminal is the remote terminal, and are not a same device.

This application mainly uses an example in which the first core network device and the second core network device are policy control function devices, to describe the authorization methods provided in this application. It should be understood that a process of implementing the authorization methods in this application when the first core network device and the second core network device are other devices in a core network is similar to a process of implementing the authorization methods in this application when the first core network device and the second core network device are the policy control function devices. Details are not described again in this specification.

For example, the first core network device may alternatively be a unified data management device. For example, a first policy control function device in a method 400, a PCF of relay UE in methods 500 to 800, a first policy control function device in a method 900, and a PCF of remote UE in methods 1000 to 1300 that are to be described below may be replaced with the unified data management device (for example, a UDM).

In addition, a second policy control function device in embodiments described below may alternatively be replaced with the unified data management device. For example, a second policy control function device in the method 400 may be replaced with the unified data management device, and a PCF of remote UE in the methods 600 to 800 may be replaced with the UDM. A second policy control function device in the method 900 may be replaced with the unified data management device, and a PCF of relay UE in the methods 1100 to 1300 may be replaced with the UDM.

For ease of understanding embodiments of this application, devices in embodiments of this application are first described with reference to FIG. 2 and FIG. 3.

Figure 2:
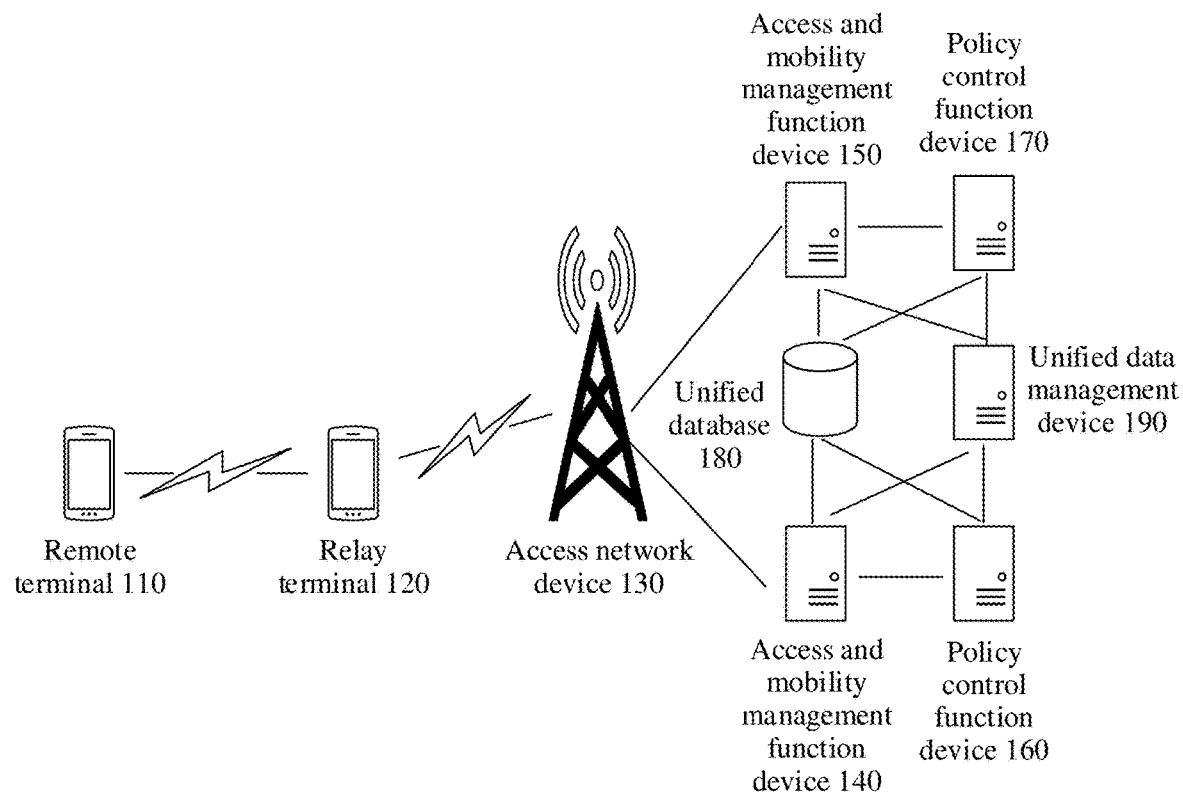
FIG. 2 is a schematic diagram of a communication system to which this application is applicable.

FIG. 2 is a schematic diagram of a communication system according to this application. As shown in FIG. 2, the system includes one or more of the following devices: a remote terminal 110, a relay terminal 120, an access network device 130, access and mobility management function devices 140 and 150, and policy control function devices 160 and 170. Optionally, the system may further include a unified database 180 and/or a unified data management device 190.

The remote terminal 110 or the relay terminal 120 may be user equipment (UE), an access terminal, a subscriber unit, a subscriber station, a mobile station, a remote station, a remote terminal, a mobile device, a user terminal, a terminal, a wireless communication device, a user agent, or a user apparatus. For example, the remote terminal or the relay terminal may be a mobile phone, a tablet computer (pad), a computer having a wireless transceiver function, a virtual reality (VR) terminal device, an augmented reality (AR) terminal device, a wireless terminal in industrial control, a wireless terminal in self-driving, a wireless terminal in remote medical (remote medical), a wireless terminal in a smart grid, a wireless terminal in transportation safety, a wireless terminal in a smart city, a wireless terminal in a smart home, or the like. The remote terminal 110 or the relay terminal 120 may alternatively be an apparatus or a circuit structure disposed in the foregoing various devices, for example, a chip or a chip system.

The access network device 130 may manage a radio resource, and provide an access service for the terminal, to complete forwarding of a control signal and user data between the terminal and a core network.

The access network device 130 may be a transmission reception point (TRP), may be an evolved NodeB (eNB or eNodeB) in an LTE system, may be a home base station (for example, a home evolved NodeB or a home NodeB, HNB) or a baseband unit (BBU), or may be a radio controller in a cloud radio access network (CRAN) scenario. Alternatively, the access network device may be a relay station, an access point, a vehicle-mounted device, a wearable device, an access network device in a 5G network, an access network device in a future evolved public land mobile communication network (public land mobile network, PLMN), or the like, may be an access point (AP) in a WLAN, or may be a gNB in a new radio (NR) system. This is not limited in this embodiment of this application. In a network structure, the access network device may include a centralized unit (CU) node, a distributed unit (DU) node, an access network device including a CU node and a DU node, or an access network device including a control plane-CU node (CU-CP node), a user plane-CU node (CU-UP node), and a DU node.

The access and mobility management function devices 140 and 150 are mainly configured to perform mobility management, access management, and the like, for example, may be configured to implement other functions than session management in functions of a mobility management entity (MME), for example, functions such as lawful interception or access authorization (or authentication). The access and mobility management function device 140 or 150 in this application may be a functional module, a network element, or an apparatus disposed in another network device. A specific implementation form of the access and mobility management function device is not limited in this application.

The access and mobility management function device 140 is an access and mobility management function device of the remote terminal 110. Herein, it means that the access and mobility management function device 140 is responsible for access and mobility management of the remote terminal 110.

The access and mobility management function device 150 is an access and mobility management function device of the relay terminal 120. Herein, it means that the access and mobility management function device 150 is responsible for access and mobility management of the relay terminal 120.

It should be noted that the access and mobility management function devices 140 and 150 may be two devices, or may be a same device.

It should be understood that the access and mobility management function device may also be referred to as an access and mobility management function network element.

The policy control function devices 160 and 170 are configured to: provide guidance about a unified policy framework of network behavior, and provide policy rule information for a control plane function network element, and the like. The policy control function device 160 or 170 in this application may be a functional module, a network element, or an apparatus disposed in another network device. A specific implementation form of the policy control function device is not limited in this application.

The policy control function device 160 is a policy control function device of the remote terminal 110. Herein, it means that the policy control function device 160 is configured to: generate a terminal policy (UE policy) and an access management policy that are related to the remote terminal 110, and send the terminal policy and the access management policy to the remote terminal 110 and the access and mobility management function device 140 respectively. The terminal policy is sent by the policy control function device 160 to the remote terminal 110 by using the access and mobility management function device 140, and is used for route selection and access network selection of the remote terminal 110. The access management policy is sent by the policy control function device 160 to the access and mobility management function device 140, and is used for access management of the access and mobility management function device 140 on the remote terminal 110.

The policy control function device 170 is a policy control function device of the relay terminal 120. Herein, it means that the policy control function device 170 is configured to: generate a terminal policy (UE policy) and an access management policy that are related to the relay terminal 120, and send the terminal policy and the access management policy to the relay terminal 120 and the access and mobility management function device 150 respectively. The terminal policy is sent by the policy control function device 170 to the relay terminal 120 by using the access and mobility management function device 150, and is used for route selection and access network selection of the relay terminal 120. The access management policy is sent by the policy control function device 170 to the access and mobility management function device 150, and is used for access management of the access and mobility management function device 150 on the relay terminal 120.

It should be noted that the policy control function devices 160 and 170 may be two devices, or may be a same device.

It should be understood that the policy control function device may also be referred to as a policy control function network element.

The unified database 180 mainly includes a function of accessing types of data such as subscription data, policy data, and application data.

The unified data management device 190 is responsible for user identifier processing, access authentication, registration, mobility management, or the like.

It should be understood that the unified data management device may also be referred to as a unified data management network element.

It should be understood that the foregoing devices may be entity apparatuses, or may be chips having corresponding functions.

Figure 3:
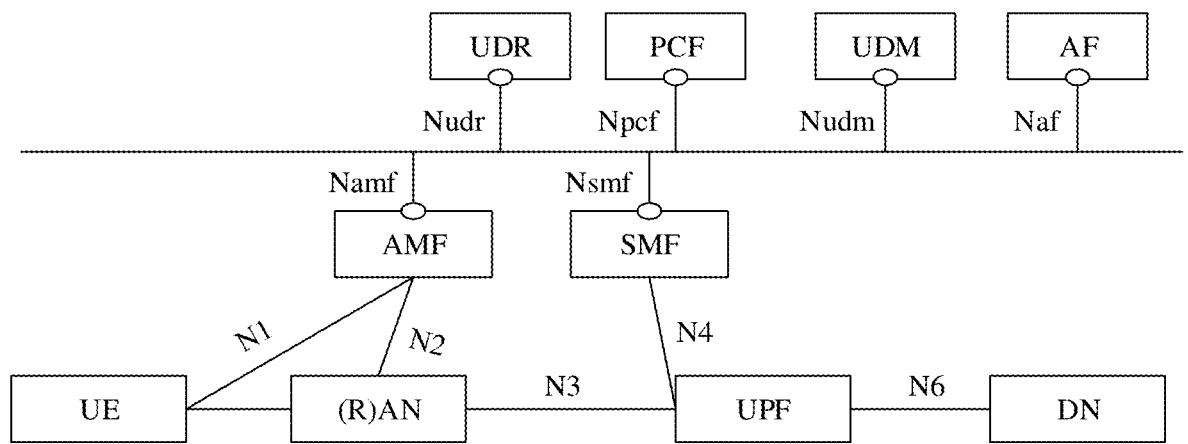
FIG. 3 is a diagram of an architecture of a 5G system.

FIG. 3 is a diagram of an architecture of a 5G system to which this application is applicable. The architecture of the system may include the following devices.

1. User equipment UE: It may be the terminal in this application. FIG. 3 shows only one UE, but this application may include at least remote UE and relay UE.
2. (Radio) access network ((R)AN): It may be the access network device in this application.
3. Access and mobility management function (AMF): It may be the access and mobility management function device in this application.
4. Policy control function (PCF): It may be the policy control function device in this application.
5. Unified data management (UDM): It may be the unified data management device in this application.
6. Unified database (unified data repository, UDR): It may be the unified database in this application.

Optionally, the 5G system may further include the following devices.

7. Session management function (SMF): It is mainly used for session management, internet protocol (IP) address assignment and management of a terminal, manageable user plane function selection, a termination point of a policy control or charging function interface, a downlink data notification, and the like.
8. User plane function (UPF): It is used for packet routing and forwarding, quality of service (QoS) processing of user plane data, and the like.
9. Data network (DN): It is a network used to provide data transmission, for example, an internet network.
10. Application function (AF): It mainly supports interaction with a 3rd generation partnership project (3GPP) core network to provide a service, for example, affects a data routing decision-making or a policy control function, or provides some third-party services for a network side.

It should be understood that a name of each network element shown in FIG. 2 is merely a name, and the name constitutes no limitation on a function of the network element. In a 5G network and another future network, the foregoing network elements may alternatively have other names. This is not specifically limited in embodiments of this application. For example, in a 6G network, some or all of the foregoing network elements may still use terms in 5G, or may have other names. A general description is provided herein. Details are not described again below. Similarly, an interface or a service-based interface between the network elements shown in FIG. 3 is merely an example. In the 5G network and another future network, the interface or the service-based interface between the network elements may alternatively not be the interface shown in the figure. This is not limited in this application.

It should be further understood that embodiments of this application are not limited to the system architecture shown in FIG. 3. For example, the communication system to which this application is applicable may include more or fewer network elements or devices. The devices or the network elements in FIG. 3 may be hardware, or may be software obtained through function division or a combination thereof. The devices or the network elements in FIG. 3 may communicate with each other by using another device or network element.

It should be further understood that any device or network element in this application may be implemented in a form of software or a combination of software and hardware. For example, the policy control function device may be an apparatus that has a function that can be implemented by the policy control function device, or a software/hardware module inside the apparatus. The following describes in detail the authorization methods provided in this application.

It should be noted that the access and mobility management function device in some method embodiments described below may be replaced with a session management function device (for example, an SMF). For example, a first access and mobility management function device in a method 400 may be replaced with a first session management function device. The first session management function device is a session management function device of a first relay terminal, and an AMF of relay UE in a method 500 may be replaced with an SMF of the relay UE.

Figure 4:
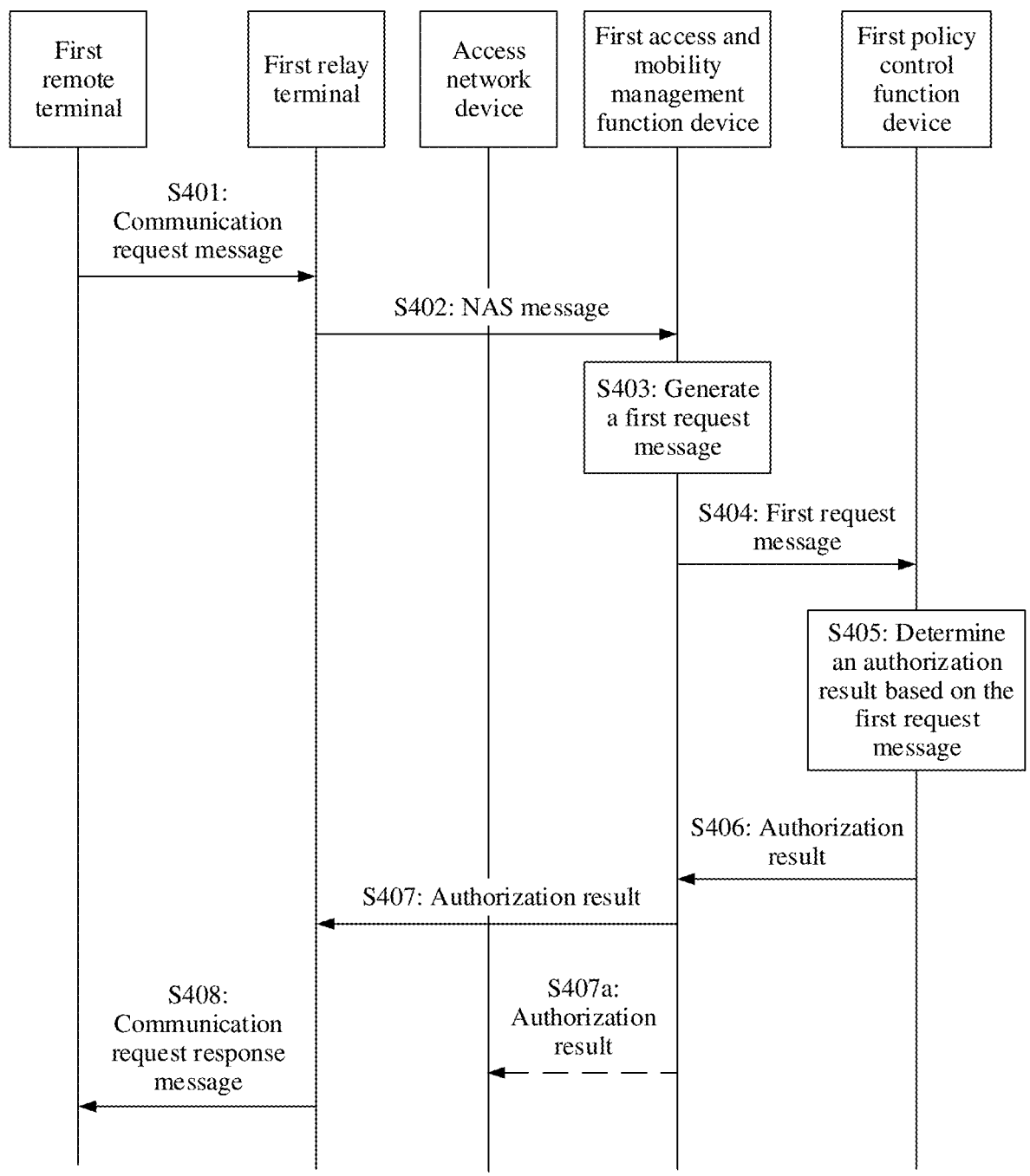
FIG. 4 is a schematic flowchart of an authorization method according to this application.

FIG. 4 is a schematic flowchart of an authorization method according to this application. The following describes steps in the method 400 shown in FIG. 4. It should be noted that the method 400 is applicable to a scenario in which any remote terminal sends a request to any relay terminal for accessing a network by using the relay terminal. For ease of understanding, the method 400 is described by using an example in which a first remote terminal requests to access the network by using a first relay terminal.

S401: The first remote terminal sends a communication request message to the first relay terminal.

The communication request message is used to request the first relay terminal to establish indirect communication, in other words, request the first relay terminal to provide a relay service for the first remote terminal. The communication request message includes a first identifier, where the first identifier is used to identify the first remote terminal. For example, the first identifier may be an IMSI, a 5G globally unique temporary identity (5G globally unique temporary identifier, 5G-GUTI), or a GPSI.

It should be understood that the communication request message may be sent through a PC5 (ProSe Communication 5) interface between the first remote terminal and the first relay terminal.

The communication request message may be an indirect communication request message or a direct communication request message. Optionally, if being the direct communication request message, the message may carry indirect communication indication information.

S402: The first relay terminal sends a non-access stratum (NAS) message to the first access and mobility management function device. The first access and mobility management function device is an access and mobility management function device of the first relay terminal.

After receiving the communication request message, the first relay terminal sends the NAS message to the first access and mobility management function device, where the NAS message is used to request the first policy control function device to determine whether to authorize the first relay terminal and the first remote terminal to establish a relay service relationship. The NAS message includes the first identifier and a second identifier, and the second identifier is used to identify the first relay terminal. For example, the second identifier may be an IMSI, a 5G-GUTI, or a GPSI.

Optionally, the NAS message is a registration request message.

Optionally, the first identifier and the second identifier are located in a container in the NAS message. For example, the first identifier and the second identifier may be located in a terminal policy container (UE policy container) in the NAS message.

Optionally, the container in which the first identifier and the second identifier are located may further include indication information, and the indication information is used to request a first policy control function device to determine whether to authorize the first relay terminal and the first remote terminal to establish a relay service relationship.

For example, the indication information may be a policy section identifier (PSI).

It should be understood that the first relay terminal first sends the NAS message to an access network device, and the access network device then forwards the NAS message to the first access and mobility management function device.

S403: The first access and mobility management function device generates a first request message.

The first request message includes an identifier of the first remote terminal and an identifier of the first relay terminal. For example, the identifier of the first remote terminal may be an IMSI or a GPSI of the first remote terminal; and the identifier of the first relay terminal may be an IMSI or a GPSI of the first relay terminal. The first request message is used to request to authorize whether the first relay terminal and the first remote terminal may establish the relay service relationship.

Optionally, in a manner, if the first identifier is the IMSI or the GPSI of the first remote terminal, the second identifier is the IMSI or the GPSI of the first relay terminal, and the first identifier and the second identifier are placed in the container in the NAS message in S402, the first access and mobility management function device generates the first request message based on the container.

In another manner, if the first identifier included in the NAS message in S402 is the 5G-GUTI, the first access and mobility management function device first obtains the identifier of the first remote terminal, for example, the IMSI or the GPSI, based on the first identifier. The 5G-GUTI of the remote terminal includes identifier information of a second access and mobility management function device, where the second access and mobility management function device is an access and mobility management function device of the first remote terminal. The first access and mobility management function device may determine the second access and mobility management function device based on the 5G-GUTI of the first remote terminal. Then, the first access and mobility management function device may send the 5G-GUTI of the first remote terminal to the second access and mobility management function device. Because the second access and mobility management function device stores a correspondence between the 5G-GUTI of the first remote terminal and the IMSI and/or the GPSI of the first remote terminal, the second access and mobility management function device may return the IMSI or the GPSI of the first remote terminal to the first access and mobility management function device based on the 5G-GUTI of the first remote terminal.

Similarly, the first access and mobility management function device stores a correspondence between the 5G-GUTI of the first relay terminal and the IMSI and/or the GPSI of the first relay terminal. If the second identifier included in the NAS message in S402 is the 5G-GUTI, the first access and mobility management function device determines the IMSI or the GPSI of the first relay terminal based on the correspondence between the second identifier and the IMSI or the GPSI of the first relay terminal.

After obtaining the IMSI or the GPSI of the first remote terminal and the IMSI or the GPSI of the first relay terminal, the first access and mobility management function device may generate the first request message.

S404: The first access and mobility management function device sends the first request message to the first policy control function device. The first policy control function device is a policy control function device of the first relay terminal.

S405: The first policy control function device determines an authorization result based on the first request message. For example, the first policy control function device determines whether to authorize the first relay terminal and the first remote terminal to establish a relay service relationship.

It should be understood that in this application, the authorization result may also be referred to as authorization information.

The authorization result may further be understood as whether the first remote terminal is authorized to access the network by using the first relay terminal.

Manner 1: Only the first policy control function device determines whether the first relay terminal can provide the relay service for the first remote terminal. If determining that the first relay terminal can provide the relay service for the first remote terminal, the first policy control function device determines to authorize the first relay terminal and the first remote terminal to establish the relay service relationship; otherwise, determines not to authorize the first relay terminal and the first remote terminal to establish the relay service relationship.

After receiving the first request message, the first policy control function device may obtain first association information based on the identifier of the first relay terminal, and may further determine the authorization result based on the identifier of the first remote terminal and the first association information. The first association information indicates at least one remote terminal for which the first relay terminal can provide the relay service, namely, a specific remote terminal for which the first relay terminal can provide the relay service. For example, the first association information may be an identifier of the at least one remote terminal for which the first relay terminal can provide the relay service. For another example, the first association information may indicate that the first relay terminal can provide the relay service for all remote terminals.

In this manner, if the at least one remote terminal for which the first relay terminal can provide the relay service includes the first remote terminal, in other words, the first relay terminal can provide the relay service for the first remote terminal, where for example, the first association information includes the identifier of the first remote terminal, the first policy control function device may determine to authorize the first relay terminal and the first remote terminal to establish the relay service relationship; otherwise, may determine not to authorize the first relay terminal and the first remote terminal to establish the relay service relationship.

Optionally, the first association information may be stored in a unified database, for example, stored in the unified database as subscription information.

Correspondingly, the first policy control function device may obtain the first association information from the unified database when the first relay terminal is registered, or may obtain the first association information from the unified database after receiving the first request message. In addition, the information about the at least one remote terminal for which the first relay terminal can provide the relay service may alternatively be dynamically updated. For example, the first relay terminal requests an update from an operator, and the operator then updates the subscription information of the first relay terminal stored in the unified database.

Optionally, the first association information may alternatively be autonomously determined by the first policy control function device. For example, the first policy control function device may determine the first association information based on preconfigured policy information. The preconfigured policy information may be generated and configured by the operator. For example, a common relay terminal can provide the relay service for all the remote terminals, but a special relay terminal can provide the relay service only for a specific remote terminal.

Manner 2: The first policy control function device determines whether the first relay terminal can provide the relay service for the first remote terminal, and a second policy control function device determines whether the first remote terminal can use the relay service of the first relay terminal. If both determining results are yes, the first policy control function device may determine to authorize the first relay terminal and the first remote terminal to establish the relay service relationship; otherwise, may determine not to authorize the first relay terminal and the first remote terminal to establish the relay service relationship.

After receiving the first request message, the first policy control function device may obtain the foregoing described first association information based on the identifier of the first relay terminal, and send the identifier of the first relay terminal and the identifier of the first remote terminal to the second policy control function device. The second policy control function device is a policy control function device of the first remote terminal. After receiving the identifier of the first relay terminal and the identifier of the first remote terminal, the second policy control function device may obtain second association information. The second association information indicates at least one relay terminal that can provide the relay service for the first remote terminal, namely, a specific relay terminal that can provide the relay service for the first remote terminal. For example, the second association information may be an identifier of the at least one relay terminal that can provide the relay service for the first remote terminal. For another example, the second association information may indicate that all relay terminals can provide the relay service for the first remote terminal. The second policy control device may determine, based on the identifier of the first relay terminal and the second association information, whether the first remote terminal can use the relay service of the first relay terminal. Then, the second policy control function device sends first indication information to the first policy control function device, where the first indication information indicates whether the first remote terminal can use the relay service of the first relay terminal. The first policy control function device may determine, based on the first indication information, the identifier of the first remote terminal, and the first association information, whether to authorize the first relay terminal and the first remote terminal to establish the relay service relationship.

In this manner, if the at least one remote terminal for which the first relay terminal can provide the relay service includes the first remote terminal, and the first indication information indicates that the first remote terminal can use the relay service of the first relay terminal, in other words, the at least one relay terminal that can provide the relay service for the first remote terminal includes the first relay terminal, the first policy control function device may determine to authorize the first relay terminal and the first remote terminal to establish the relay service relationship. If the at least one remote terminal for which the first relay terminal can provide the relay service does not include the first remote terminal, or the first indication information indicates that the first remote terminal cannot use the relay service of the first relay terminal, the first policy control function device may determine not to authorize the first relay terminal and the first remote terminal to establish the relay service relationship.

For example, if the first association information includes the identifier of the first remote terminal, and the second association information includes the identifier of the first relay terminal, the first policy control function device may determine to authorize the first relay terminal and the first remote terminal to establish the relay service relationship. For another example, if the first association information does not include the identifier of the first remote terminal, the first policy control function device may determine not to authorize the first relay terminal and the first remote terminal to establish the relay service relationship. Alternatively, if the second association information does not include the identifier of the first relay terminal, the first policy control function device may determine not to authorize the first relay terminal and the first remote terminal to establish the relay service relationship.

Optionally, the second association information may alternatively be stored in a unified database, for example, stored in the unified database as subscription information.

Similarly, in manner 2, the second policy control function device may obtain the second association information from the unified database when the first remote terminal is registered, or may obtain the second association information from the unified database after receiving the identifier of the first relay terminal and the identifier of the first remote terminal that are sent by the first policy control function device. In addition, the information about the at least one relay terminal that can provide the relay service for the first remote terminal may alternatively be dynamically updated. For example, the first remote terminal requests an update from an operator, and the operator then updates the subscription information of the first remote terminal stored in the unified database.

Optionally, the second association information may alternatively be autonomously determined by the second policy control function device. For example, the second policy control function device may determine the second association information based on preconfigured policy information. The preconfigured policy information may be generated and configured by the operator. For example, a remote terminal of a gold user can use relay services of all relay terminals, and a remote terminal of a non-gold user can use relay services of only some relay terminals.

In addition, in manner 2, before sending the identifier of the first relay terminal and the identifier of the first remote terminal to the second policy control function device, the first policy control function device first determines a specific second policy control function device, in other words, obtains an identifier of the second policy control function device.

Optionally, the first access and mobility management function device may obtain the identifier of the second policy control function device, and include the identifier of the second policy control function device in the first request message.

For example, the first access and mobility management function device may obtain the identifier of the second policy control function device from the second access and mobility management function device. In a registration process of the first remote terminal, the second access and mobility management function device may determine a corresponding policy control function device (namely, the second policy control function device) for the first remote terminal, and store a correspondence between the identifier of the first remote terminal (for example, the IMSI or the GPSI) and the identifier of the second policy control function device. When the first access and mobility management function device obtains the identifier of the first remote terminal from the second access and mobility management function device based on the 5G-GUTI of the first remote terminal, the second access and mobility management function device may return both the identifier of the first remote terminal and the identifier of the policy control function device corresponding to the identifier of the first remote terminal, namely, the identifier of the second policy control function device.

For another example, the first access and mobility management function device may obtain the identifier of the second policy control function device from the unified database or a unified data management device. After the first remote terminal is registered, the second policy control function device registers a correspondence between the identifier of the first remote terminal (the IMSI or the GPSI) and the identifier of the second policy control function device with the unified database or the unified data management device. The unified database or the unified data management device stores the correspondence. The first mobility and management device may obtain the identifier of the second policy control function device from the unified database or the unified data management device based on the identifier of the first remote terminal. Optionally, the first policy control function device may obtain the identifier of the second policy control function device.

For example, the first policy control function device may obtain the identifier of the second policy control function device from the unified database or the unified data management device. After the remote terminal is registered, the second policy control function device registers a correspondence between the identifier of the first remote terminal (the IMSI or the GPSI) and the identifier of the second policy control function device with the unified database or the unified data management device. The unified database or the unified data management device stores the correspondence. The first policy control function device may obtain the identifier of the second policy control function device from the unified database or the unified data management device based on the identifier of the first remote terminal.

It should be noted that in manner 2, the first policy control function device may alternatively first determine, based on the first association information, whether the remote terminal for which the first relay terminal can provide the relay service includes the first remote terminal. If the first remote terminal is included, the first policy control function device sends the identifier of the first relay terminal and the identifier of the first remote terminal to the second policy control function device; or if the remote terminal is not included, may not send the identifier of the first relay terminal and the identifier of the first remote terminal to the second policy control function device, but directly determine not to authorize the first relay terminal and the first remote terminal to establish the relay service relationship.

S406: The first policy control function device sends the authorization result to the first access and mobility management function device.

Optionally, the first policy control function device places the authorization result in a container, and sends the container to the first access and mobility management function device. The container may be an N1 container or a terminal policy container.

Optionally, the first policy control function device sends the authorization result by using an N1N2 message transfer message.

S407: The first access and mobility management function device sends the authorization result to the first relay terminal.

Optionally, the first access and mobility management function device receives the N1 container from the first policy control function device, and sends the N1 container or the terminal policy container to the first relay terminal by using the NAS message.

It should be understood that the first access and mobility management function device first sends the authorization result to the access network device, and the access network device then forwards the authorization result to the first relay terminal.

Optionally, in step S406, the authorization result further includes the identifier of the first relay terminal and the identifier of the first remote terminal.

Optionally, the method may further include: S407a: The first access and mobility management function device sends the authorization result to the access network device by using a next generation application protocol (NGAP) message, and the access network device stores the authorization result.

In this case, when the first remote terminal requests to access the network, the access network device may determine, based on the authorization result, that the first remote terminal may access the network by using the first relay terminal.

S408: After receiving the authorization result, the first relay terminal sends a communication request response message to the first remote terminal based on the authorization result.

The communication request response message may be an indirect communication response message or a direct communication response message.

If the authorization result indicates that the first relay terminal and the first remote terminal are authorized to establish the relay service relationship, the communication request response message indicates that the first remote terminal can use the relay service of the first relay terminal; otherwise, the first remote terminal cannot use the relay service of the first relay terminal. For an operation performed by the first remote terminal after the first remote terminal receives the communication request response message, refer to a conventional technology, for example, refer to solution 6 or solution 7 in 3GPP TR 23.752. Details are not described herein again.

According to the method provided in this application, the policy control function device of the relay terminal may determine whether to authorize the relay terminal and the remote terminal to establish the relay service relationship, and send the determined authorization result to the relay terminal, so that the relay terminal may determine, based on the authorization result, whether to allow the remote terminal to access the network by using the relay terminal. In addition, whether the relay terminal may be used as the relay terminal is also authorized by the policy control function device of the relay terminal. Therefore, centralization of authorization functions can be implemented, to avoid signaling interaction between core devices caused by non-centralization of the authorization functions.

For ease of understanding, the following uses a command for the devices in the 5G system as an example, to describe the method 400 in more detail with reference to FIG. 5 to FIG. 8A and FIG. 8B. It should be understood that relay UE, an AMF of the relay UE, a PCF of the relay UE, remote UE, an AMF of the remote UE, and a PCF of the remote UE in methods shown in FIG. 5 to FIG. 8A and FIG. 8B respectively correspond to the first relay terminal, the first access and mobility management function device, the first policy control function device, the first remote terminal, the second access and mobility management function device, and the second policy control function device in the method 400.

It should be further understood that in different network systems, names of the devices in FIG. 4 may be different, and names of the devices in the methods shown in FIG. 5 to FIG. 8A and FIG. 8B do not constitute any limitation on this application.

Figure 5:
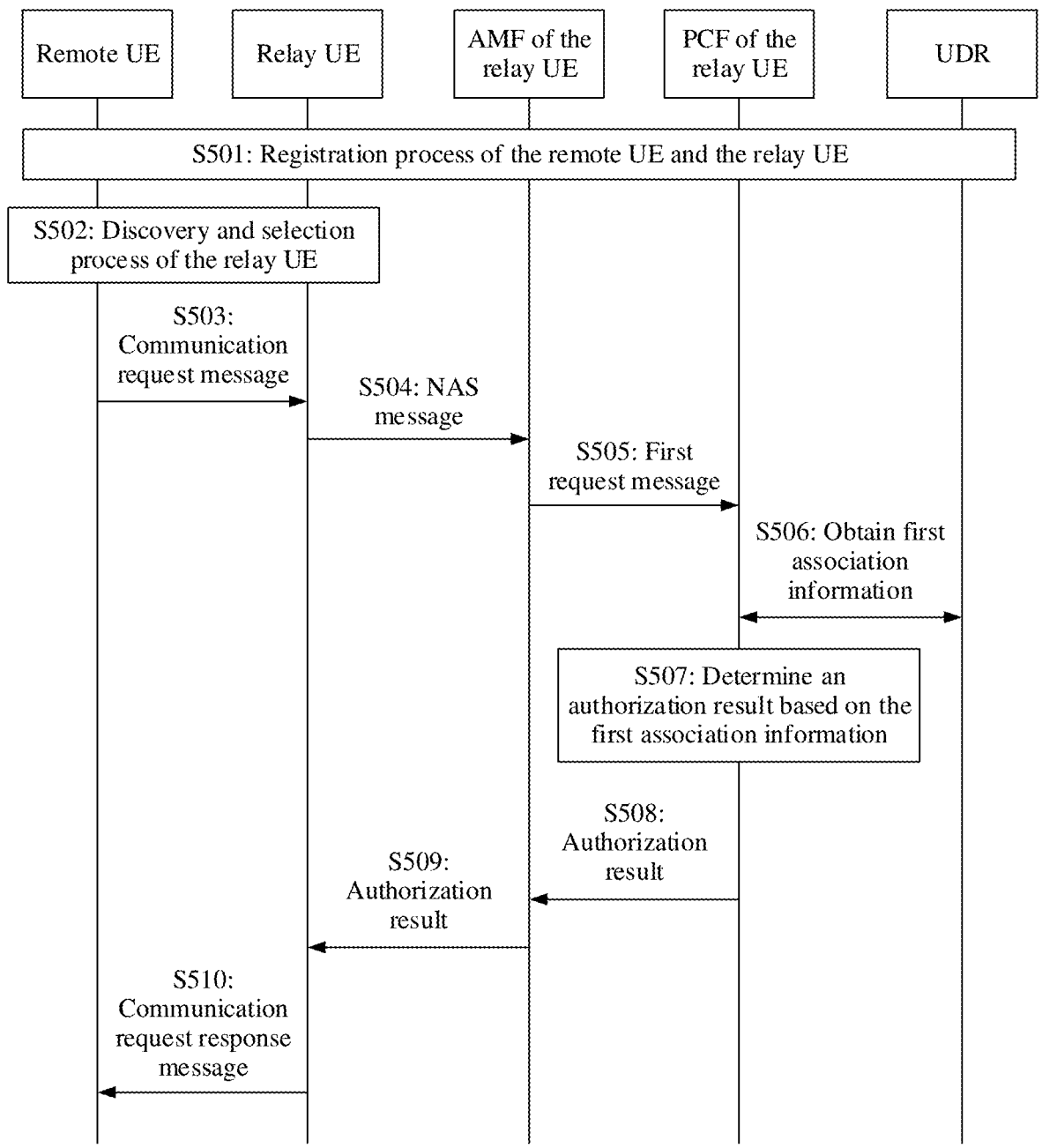

FIG. 5 shows an authorization method according to this application. The method 500 is a specific embodiment of the method 400. The method 500 is applicable to the remote UE in a registered state, a deregistered state (registration is canceled after the registration), and an unregistered state (not registered in the network so far), and the method 500 corresponds to manner 1 in step S405. The following describes steps in the method 500.

S501: A registration process of the UE.

Subsequently, one UE (for example, denoted as UE #1) used as the remote UE and one UE (for example, denoted as UE #2) used as the relay UE perform a registration procedure, to separately register with the network.

In the registration process, the UE #1 and the UE #2 may separately obtain authorization information from corresponding PCFs, and may determine, based on the authorization information, whether to be used as the remote UE or the relay UE.

It should be understood that if the UE #1 does not perform the registration procedure, the UE #1 may use preconfigured authorization information.

Optionally, in the registration process of the relay UE, first association information, namely, information about the remote UE for which the relay UE can provide the relay service, may be stored in a UDR. It should be understood that the UDR corresponds to the unified database in the method 400.

It should be noted that in this application, the UE #1 is authorized as the remote UE, and the UE #2 is authorized as the relay UE. Therefore, in FIG. 5 and the description of FIG. 5, the UE #1 is referred to as the remote UE, an AMF of the UE #1 is referred to as the AMF of the remote UE, a PCF of the UE #1 is referred to as the PCF of the remote UE, the UE #2 is referred to as the relay UE, an AMF of the UE #2 is referred to as the AMF of the relay UE, and a PCF of the UE #2 is referred to as the PCF of the relay UE.

S502: Relay discovery and selection.

In a relay discovery procedure, the remote UE initiates a relay discovery message. UE that receives the relay discovery message determines whether the UE may be used as the relay UE. If the UE may be used as the relay UE, the UE replies with a relay discovery response message, and becomes candidate relay UE. The remote UE may receive response messages of a plurality of candidate relay UE, and the remote UE performs relay selection based on signal quality between the remote UE and the candidate relay UE and capability information of the candidate relay UE.

It should be understood that for details of S502, refer to the conventional technology.

S503: The remote UE sends a communication request message to the relay UE.

A function of the communication request message is the same as a function of the communication request message in S401. Refer to S401.

A first identifier included in the communication request message may be an IMSI, a 5G-GUTI, or a GPSI of the remote UE.

S504: The relay UE sends a NAS message to the AMF of the relay UE.

The NAS message is the same as the NAS message in S402. A second identifier in the NAS message may be an IMSI, a 5G-GUTI, or a GPSI of the relay UE.

S505: The AMF of the relay UE sends a first request message to the PCF of the relay UE.

It should be understood that the AMF of the relay UE first generates the first request message. For this process, refer to S403. Details are not described herein again.

S506: The PCF of the relay UE obtains first association information from the UDR.

The first association information herein is the same as the first association information in S405. Refer to S405.

It should be noted that S506 may alternatively not be performed. Instead, the PCF of the relay UE autonomously determines the first association information.

S507: The PCF of the relay UE determines an authorization result based on the first association information.

For example, the PCF of the relay UE determines whether the remote UE for which the relay UE can provide the relay service and that is indicated by the first association information includes the remote UE. If the remote UE includes the remote UE, the PCF of the relay UE determines the authorization result indicating that the relay UE and the remote UE are authorized to establish a relay service relationship; otherwise, determines the authorization result indicating that the relay UE and the remote UE are not authorized to establish the relay service relationship.

S508: The PCF of the relay UE returns the authorization result to the AMF of the relay UE.

S509: The AMF of the relay UE returns the authorization result to the relay UE.

Optionally, the authorization result may further include an identifier of the remote UE and an identifier of the relay UE.

Optionally, the method may further include: a step similar to S407a. For example, the AMF sends the authorization result to a RAN by using the NGAP message, and the RAN stores the authorization result.

S510: The relay UE sends a communication request response message to the remote UE based on the authorization result.

This step is the same as S408. Refer to S408.

According to the authorization method provided in this application, the PCF (namely, the PCF of the relay UE in this specification) may determine whether one UE may be used as the relay UE. When the UE may be used as the relay UE, if one remote UE requests to access the network by using the relay UE, the relay UE may request the PCF of the relay UE to determine whether to authorize the relay UE and the remote UE to establish a relay service relationship. If determining that the relay UE can provide the relay service for the remote UE, the PCF of the relay UE may authorize the relay UE and the remote UE to establish the relay service relationship; otherwise, may not authorize the relay UE and the remote UE to establish the relay service relationship. By using this method, centralization of authorization functions can be implemented.

Figure 6A:
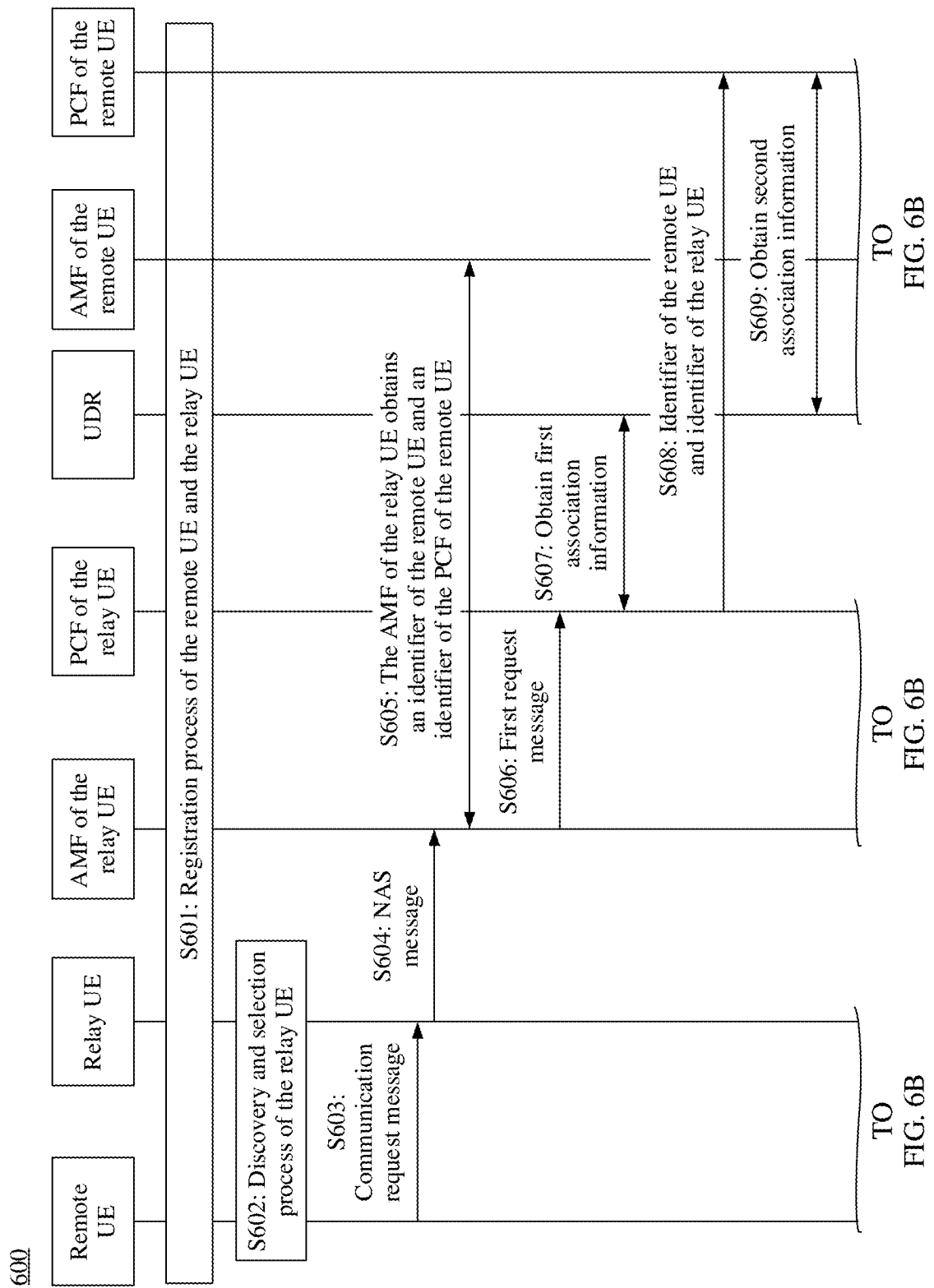
Figure 6B:
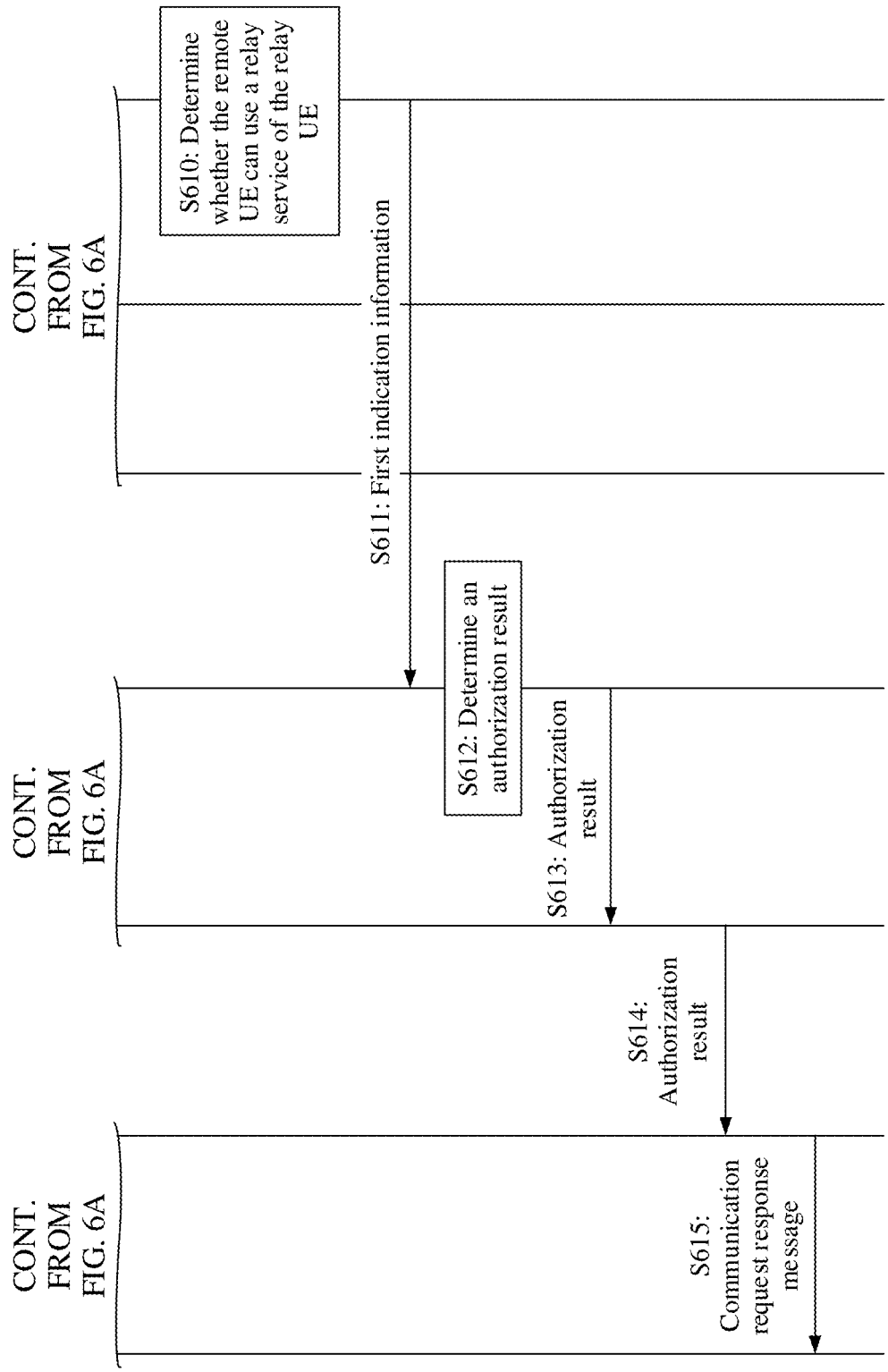

FIG. 6A and FIG. 6B show an authorization method according to this application. The method 600 is a specific embodiment of the method 400. The method 600 is applicable to the remote UE in a registered state, and the method 600 may correspond to manner 2 in step S405. The following describes steps in the method 600.

S601: A registration process of the UE.

Different from step S501, in step S501, the remote UE may not perform the registration process, but in S601, the remote UE performs the registration process.

Similar to S501, in the registration process, the UE #1 and the UE #2 may separately obtain authorization information from corresponding PCFs, and may determine, based on the authorization information, whether to be used as the remote UE or the relay UE. In the registration process of the remote UE, the AMF of the remote UE may further determine the corresponding PCF (namely, the PCF of the remote UE) for the remote UE, and store a correspondence between an identifier of the determined PCF and an identifier of the remote UE (which may be an IMSI or a GPSI of the remote UE herein).

In addition, in the registration process of the relay UE, first association information, namely, information about the remote UE for which the relay UE can provide the relay service, may be stored in a UDR. In the registration process of the remote UE, information about the relay UE that can provide the relay service for the remote UE, namely, second association information, may also be stored in the UDR. It should be understood that the UDR corresponds to the unified database in the method 400.

S602: Relay discovery and selection.

This step is the same as S502. Refer to S502.

S603: The remote UE sends a communication request message to the relay UE.

A function of the communication request message is the same as a function of the communication request message in S401. Refer to S401.

A first identifier included in the communication request message may be a 5G-GUTI of the remote UE.

S604: The relay UE sends a NAS message to the AMF of the relay UE.

The NAS message is the same as the NAS message in S402. A second identifier in the NAS message may be an IMSI, a 5G-GUTI, or a GPSI of the relay UE.

S605: The AMF of the relay UE obtains an IMSI or a GPSI of the remote UE and an identifier of the PCF of the remote UE from the AMF of the remote UE.

The AMF of the relay UE may determine the AMF of the remote UE based on the 5G-GUTI of the remote UE, and then send the 5G-GUTI of the remote UE to the AMF of the remote UE. The AMF of the remote UE stores a correspondence between the 5G-GUTI of the remote UE and the IMSI or the GPSI of the remote UE, and a correspondence between the IMSI or the GPSI of the remote UE and the identifier of the PCF of the remote UE. Therefore, the AMF of the remote UE may return the IMSI or the GPSI of the remote UE and the identifier of the PCF of the remote UE to the AMF of the relay UE based on the 5G-GUTI of the remote UE.

S606: The AMF of the relay UE sends a first request message to the PCF of the relay UE.

The first request message includes the IMSI or the GPSI of the relay UE, the IMSI or the GPSI of the remote UE, and the identifier of the PCF of the remote UE.

S607: The PCF of the relay UE obtains first association information from the UDR.

The first association information herein is the same as the first association information in S405. Refer to S405.

It should be noted that S607 may alternatively not be performed. Instead, the PCF of the relay UE autonomously determines the first association information.

Optionally, if the first association information indicates that the remote UE for which the relay UE can provide the relay service does not include the remote UE, S608 to S612 may not be performed. Instead, the PCF of the relay UE directly determines an authorization result indicating that the relay UE and the remote UE are not authorized to establish a relay service relationship.

S608: The PCF of the relay UE sends an identifier of the remote UE (an IMSI or a GPSI) and an identifier of the relay UE (an IMSI or a GPSI) to the PCF of the remote UE.

Optionally, the PCF of the relay UE sends a policy request message to the PCF of the remote UE. The message includes the identifier of the remote UE (the IMSI or the GPSI) and the identifier of the relay UE (the IMSI or the GPSI).

S609: The PCF of the remote UE obtains second association information from the UDR based on the information sent by the PCF of the relay UE.

The second association information herein is the same as the second association information in S405. Refer to S405.

It should be noted that S609 may alternatively not be performed. Instead, the PCF of the remote UE autonomously determines the second association information.

S610: The PCF of the remote UE determines, based on the second association information, whether the remote UE can use a relay service of the relay UE.

For details of this step, refer to the description of manner 2 in S405.

S611: The PCF of the remote UE sends first indication information to the PCF of the relay UE.

The first indication information indicates whether the remote UE can use the relay service of the relay UE.

S612: The PCF of the relay UE determines an authorization result based on the first indication information and the first association information.

For details of this step, refer to the description of manner 2 in S405.

S613 to S615: The PCF of the relay UE returns the authorization result to the relay UE. For details, refer to S508 to S510.

According to the authorization method provided in this application, the PCF (namely, the PCF of the relay UE in this specification) may determine whether one UE may be used as the relay UE. When the UE may be used as the relay UE, if one remote UE requests to access the network by using the relay UE, the relay UE may request the PCF of the relay UE to determine whether to authorize the relay UE and the remote UE to establish a relay service relationship. After receiving the request of the relay UE, the PCF of the relay UE determines whether the relay UE can provide the relay service for the remote UE, and requests the PCF of the remote UE to determine whether the remote UE can use the relay service of the relay UE. If both determining results are yes, the PCF of the relay UE determines to authorize the relay UE and the remote UE to establish the relay service relationship; or if at least one of these two determining results is no, determines not to authorize the relay UE and the remote UE to establish the relay service relationship. By using this method, centralization of authorization functions can be implemented.

Figure 7A:
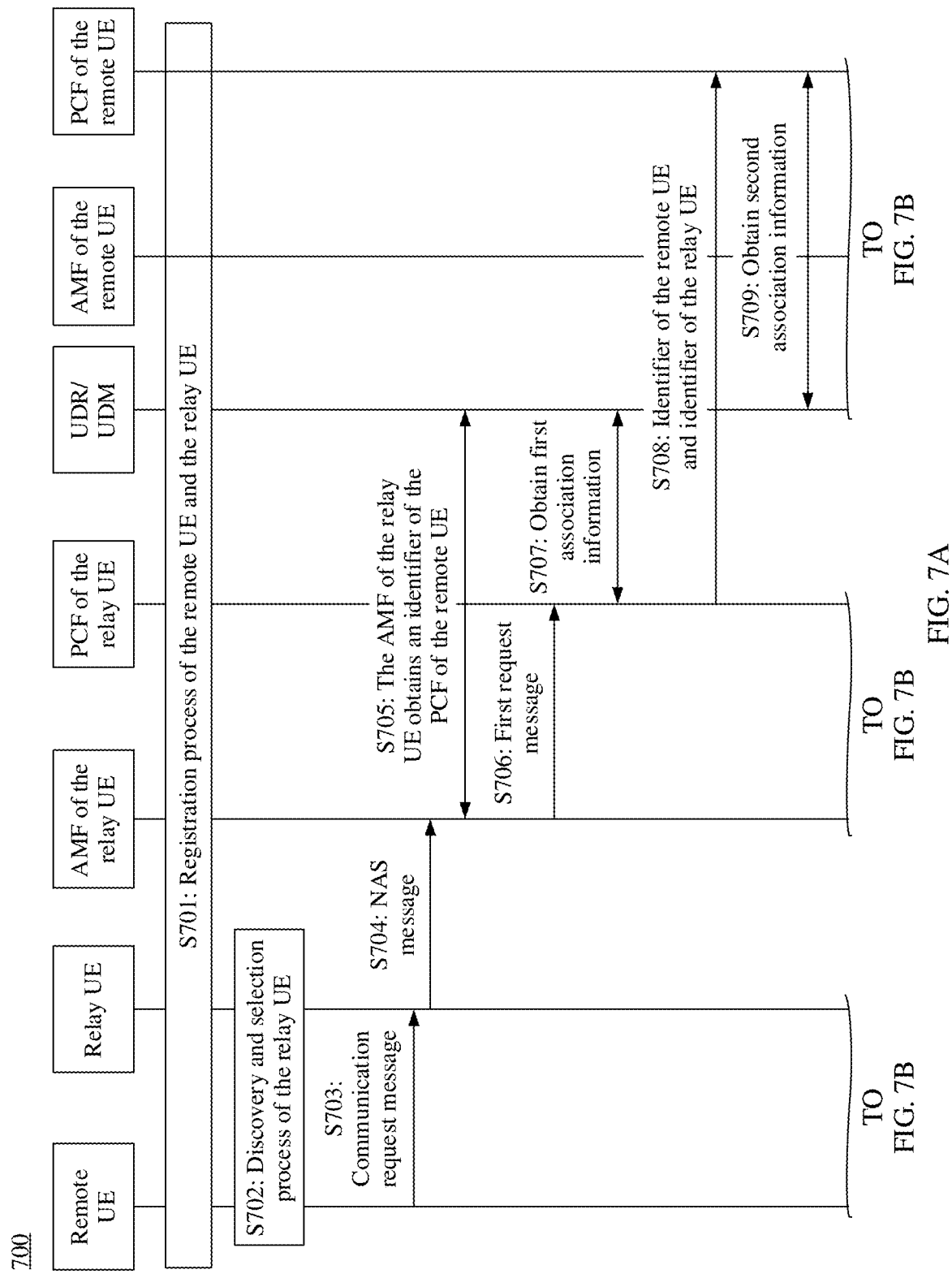
Figure 7B:
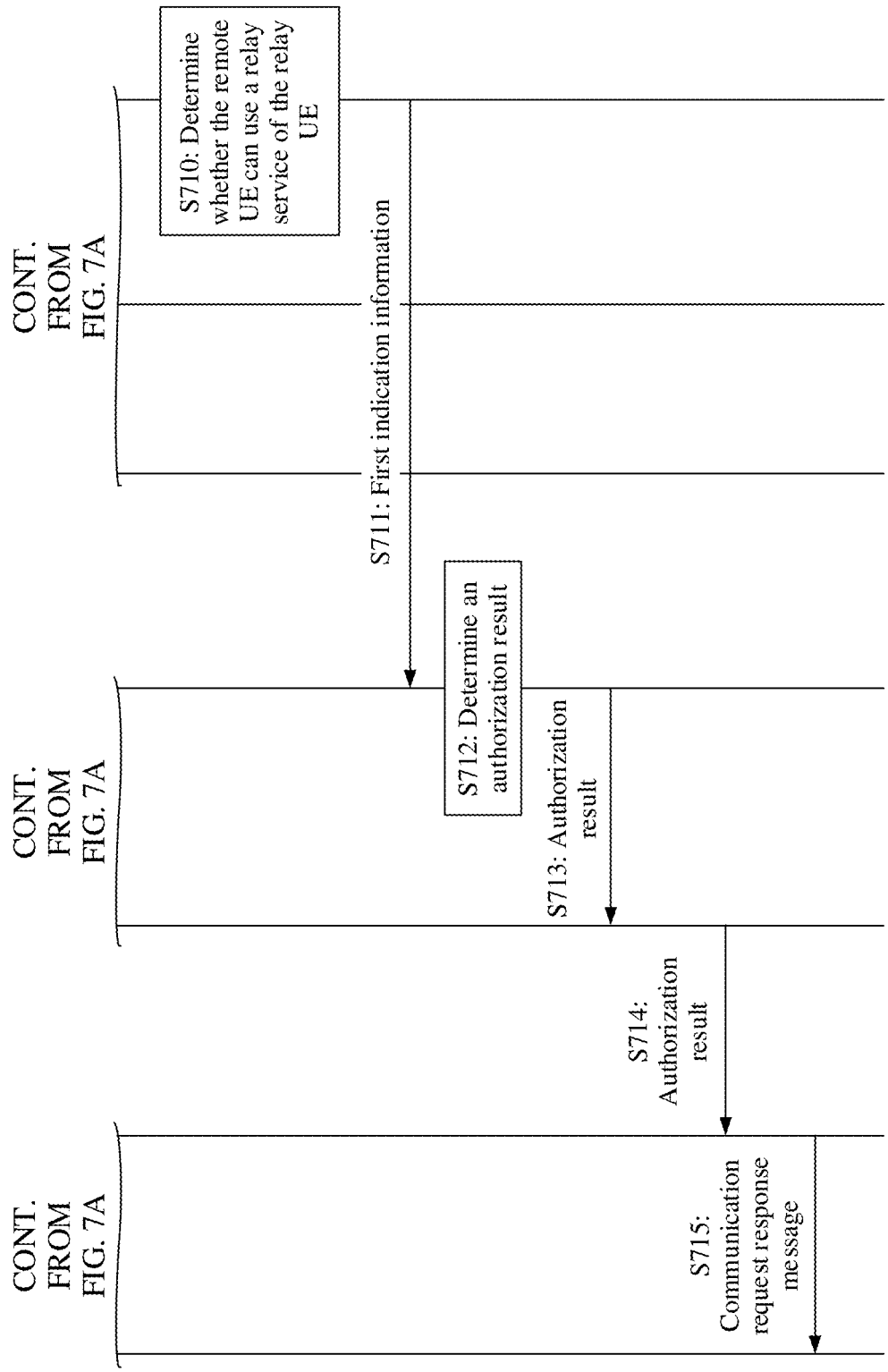

FIG. 7A and FIG. 7B show an authorization method according to this application. The method 700 is a specific embodiment of the method 400. The method 700 is applicable to the remote UE in a registered state, and the method 700 may correspond to manner 2 in step S405. Different from the method 600, in the method 600, the AMF of the relay UE obtains the identifier of the PCF of the remote UE from the AMF of the remote UE, but in the method 700, the AMF of the relay UE obtains the identifier of the PCF of the remote UE from a UDR or a UDM. The following describes steps in the method 700.

S701: A registration process of the UE.

This step is similar to S601. A difference lies in that in S601, the correspondence between the identifier of the PCF of the remote UE and the identifier of the remote UE (the IMSI or the GPSI of the remote UE) may be stored in the AMF of the remote UE. However, in S701, after the UE #1 is authorized as the remote UE, the PCF of the UE #1 may register a correspondence between an identifier of the UE #1 (an IMSI or a GPSI) and an identifier of the PCF of the UE #1 with the UDR or the UDM. It should be understood that the UDR corresponds to the unified database in the method 400, and the UDM corresponds to the unified data management device in the method 400.

S702: Relay discovery and selection.

This step is the same as S502. Refer to S502.

S703: The remote UE sends a communication request message to the relay UE.

A function of the communication request message is the same as a function of the communication request message in S401. Refer to S401.

A first identifier included in the communication request message may be an IMSI, a 5G-GUTI, or a GPSI of the remote UE.

S704: The relay UE sends a NAS message to the AMF of the relay UE.

The NAS message is the same as the NAS message in S402. A first identifier in the NAS message may be the IMSI, the 5G-GUTI, or the GPSI of the remote UE, and a second identifier may be an IMSI, a 5G-GUTI, or a GPSI of the relay UE.

S705: The AMF of the relay UE obtains an identifier of the PCF of the remote UE from the UDR or the UDM.

If the first identifier is the 5G-GUTI of the remote UE, the AMF of the relay UE first obtains the IMSI or the GPSI of the remote UE from the AMF of the remote UE. For a specific process, refer to the foregoing corresponding description. If the first identifier is the IMSI or the GPSI of the remote UE, a process of obtaining the IMSI or the GPSI of the remote UE from the AMF of the remote UE does not need to be performed. The AMF of the relay UE sends the IMSI or the GPSI of the remote UE to the UDR or the UDM, and the UDR or the UDM returns the identifier of the PCF of the remote UE to the AMF of the relay UE based on the stored correspondence between the IMSI or the GPSI of the remote UE and the identifier of the PCF of the remote UE.

S706 to S715: A process in which the PCF of the relay UE determines an authorization result and returns the authorization result. For details, refer to S606 to S615.

According to the authorization method provided in this application, the PCF (namely, the PCF of the relay UE in this specification) may determine whether one UE may be used as the relay UE. When the UE may be used as the relay UE, if one remote UE requests to access the network by using the relay UE, the relay UE may request the PCF of the relay UE to determine whether to authorize the relay UE and the remote UE to establish a relay service relationship. After receiving the request of the relay UE, the PCF of the relay UE determines whether the relay UE can provide the relay service for the remote UE, and requests the PCF of the remote UE to determine whether the remote UE can use the relay service of the relay UE. If both determining results are yes, the PCF of the relay UE determines to authorize the relay UE and the remote UE to establish the relay service relationship; or if at least one of these two determining results is no, determines not to authorize the relay UE and the remote UE to establish the relay service relationship. By using this method, centralization of authorization functions can be implemented.

Figure 8B:
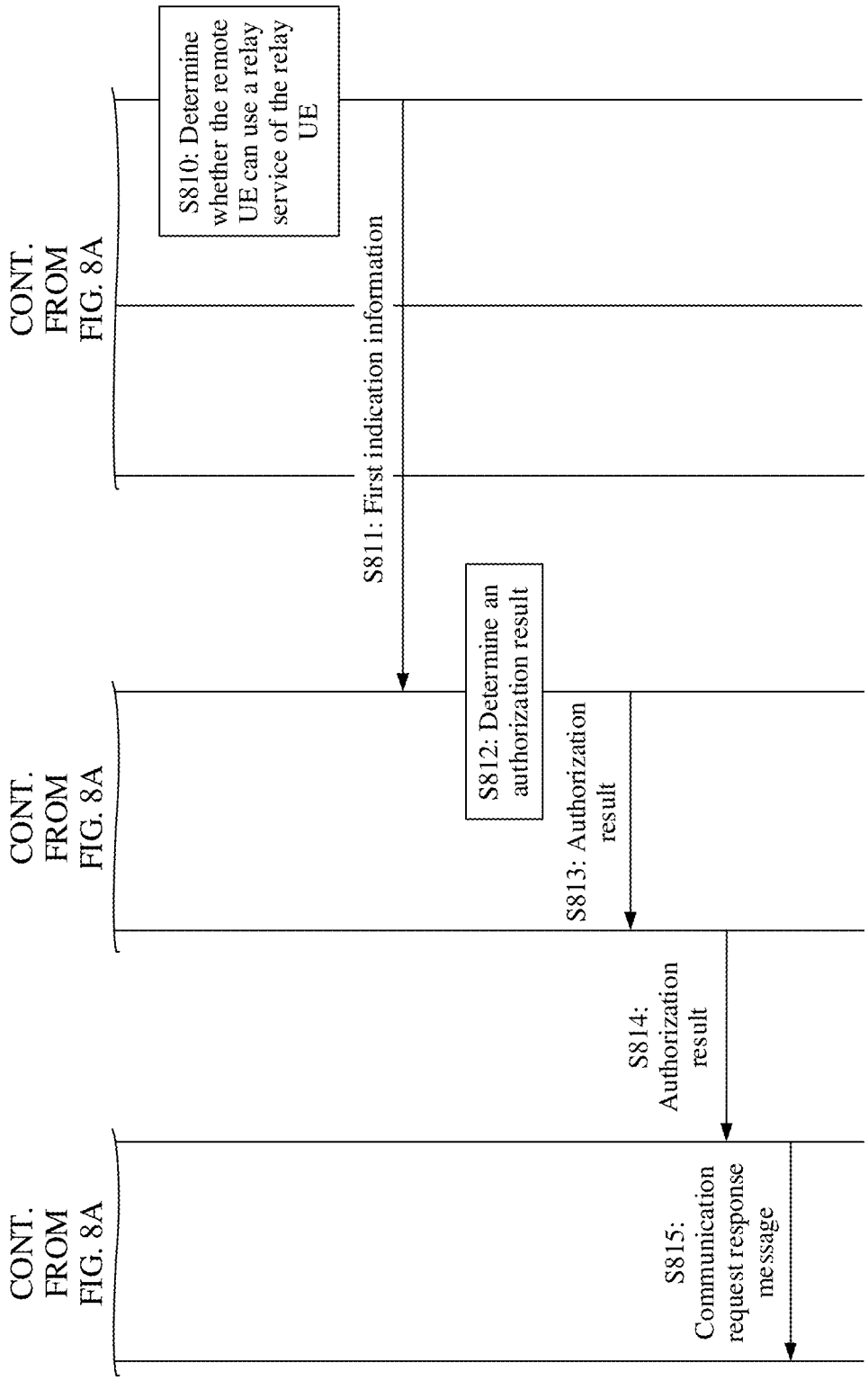

FIG. 8A and FIG. 8B show an authorization method according to this application. The method 800 is a specific embodiment of the method 400. The method 800 is applicable to the remote UE in a registered state, and the method 800 may correspond to manner 2 in step S405. Different from the method 800 and the methods 600 and 700, in the method 600, the AMF of the relay UE obtains the identifier of the PCF of the remote UE from the AMF of the remote UE, in the method 700, the AMF of the relay UE obtains the identifier of the PCF of the remote UE from the UDR or the UDM, but in the method 800, the PCF of the relay UE obtains the identifier of the PCF of the remote UE from the UDR or the UDM. The following describes steps in the method 800.

S801 to S804 are the same as S701 to S704. For details, refer to S701 to S704.

S805: The AMF of the relay UE sends a first request message to the PCF of the relay UE.

It should be understood that the AMF of the relay UE first generates the first request message. For this process, refer to S403. Details are not described herein again.

S806: The PCF of the relay UE obtains first association information from the UDR.

This step is the same as S607. For details, refer to S607.

Optionally, if the first association information indicates that the remote UE for which the relay UE can provide the relay service does not include the remote UE, S807 to S815 may alternatively not be performed. Instead, the PCF of the relay UE directly determines an authorization result indicating that the relay UE and the remote UE are not authorized to establish a relay service relationship.

S807: The PCF of the relay UE obtains an identifier of the PCF of the remote UE from the UDR or the UDM.

The PCF of the relay UE sends the IMSI or the GPSI of the remote UE to the UDR or the UDM, and the UDR or the UDM returns the identifier of the PCF of the remote UE to the PCF of the relay UE based on the stored correspondence between the IMSI or the GPSI of the remote UE and the identifier of the PCF of the remote UE.

S808 to S815: A process in which the PCF of the relay UE determines an authorization result and returns the authorization result. For details, refer to S608 to S615.

According to the authorization method provided in this application, the PCF (namely, the PCF of the relay UE in this specification) may determine whether one UE may be used as the relay UE. When the UE may be used as the relay UE, if one remote UE requests to access the network by using the relay UE, the relay UE may request the PCF of the relay UE to determine whether to authorize the relay UE and the remote UE to establish a relay service relationship. After receiving the request of the relay UE, the PCF of the relay UE determines whether the relay UE can provide the relay service for the remote UE, and requests the PCF of the remote UE to determine whether the remote UE can use the relay service of the relay UE. If both determining results are yes, the PCF of the relay UE determines to authorize the relay UE and the remote UE to establish the relay service relationship; or if at least one of these two determining results is no, determines not to authorize the relay UE and the remote UE to establish the relay service relationship. By using this method, centralization of authorization functions can be implemented.

Figure 9:
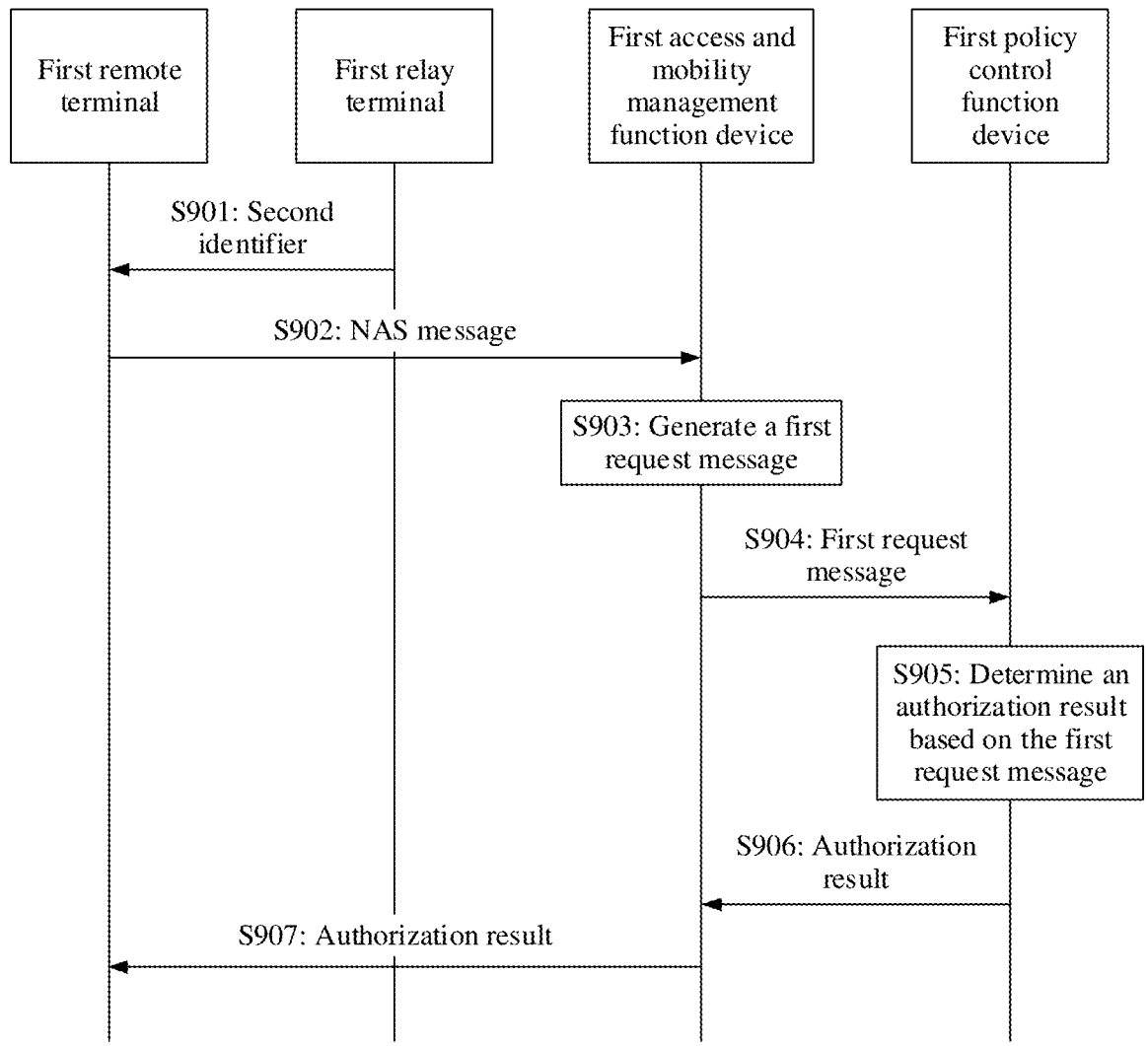
FIG. 9 is a schematic flowchart of another authorization method according to this application.

FIG. 9 is a schematic flowchart of another authorization method according to this application. A difference between the method 900 and the method 400 lies in that in the method 400, the relay terminal requests the authorization result, and the policy control function device of the relay terminal determines the authorization result, but in the method 900, the remote terminal requests the authorization result, and the policy control function device of the remote terminal determines the authorization result. The following describes steps in the method 900 shown in FIG. 9.

It should be noted that the method 900 is applicable to a scenario in which any remote terminal sends a request to one relay terminal for accessing a network. For ease of understanding, the method 900 is described by using an example in which the first remote terminal requests to access the network by using the first relay terminal.

S901: The first relay terminal sends a second identifier to the first remote terminal.

The first relay terminal may send the second identifier to the first remote terminal in a process of establishing a PC5 connection, where the second identifier is used to identify the first relay terminal. For example, the second identifier may be an IMSI, a 5G-GUTI, or a GPSI.

S902: The first remote terminal sends a NAS message to the first access and mobility management function device. The first access and mobility management function device is an access and mobility management function device of the first remote terminal.

The NAS message is used to request the first policy control function device to determine whether to authorize the first relay terminal and the first remote terminal to establish a relay service relationship. The NAS message may include a first identifier and the second identifier, and the first identifier is used to identify the first remote terminal. For example, the first identifier may be an IMSI, a 5G-GUTI, or a GPSI.

Optionally, the NAS message is a registration request message.

Optionally, the first identifier and the second identifier are located in a container in the NAS message. For example, the first identifier and the second identifier may be located in a terminal policy container (UE policy container) in the NAS message.

Optionally, the container in which the first identifier and the second identifier are located may further include indication information, and the indication information is used to request a first policy control function device to determine whether to authorize the first relay terminal and the first remote terminal to establish a relay service relationship.

For example, the indication information may be a policy section identifier (PSI).

It should be understood that the first remote terminal first sends the NAS message to an access network device, and the access network device then forwards the NAS message to the first access and mobility management function device. There are two ways in which the first remote terminal first sends the NAS message to the access network device: The first remote terminal directly sends the NAS message to the access network device, or the first remote terminal sends the NAS message to the access network device by using the first relay terminal.

S903: The first access and mobility management function device generates a first request message.

The first request message includes an identifier of the first remote terminal and an identifier of the first relay terminal. For example, the identifier of the first remote terminal may be an IMSI or a GPSI of the first remote terminal; and the identifier of the first relay terminal may be an IMSI or a GPSI of the first relay terminal.

Optionally, in a manner, if the first identifier is the IMSI or the GPSI of the first remote terminal, the second identifier is the IMSI or the GPSI of the first relay terminal, and the first identifier and the second identifier are placed in the container in the NAS message in S902, the first access and mobility management function device generates the first request message based on the container.

In another manner, if the second identifier included in the NAS message in S902 is the 5G-GUTI, the first access and mobility management function device first obtains the identifier of the first relay terminal, for example, the IMSI or the GPSI, based on the second identifier. A 5G-GUTI of the relay terminal includes identifier information of a second access and mobility management function device, where the second access and mobility management function device is an access and mobility management function device of the first relay terminal. The first access and mobility management function device may determine the second access and mobility management function device based on the 5G-GUTI of the first relay terminal. Then, the first access and mobility management function device may send the 5G-GUTI of the first relay terminal to the second access and mobility management function device. Because the second access and mobility management function device stores a correspondence between the 5G-GUTI of the first relay terminal and the IMSI and/or the GPSI of the first relay terminal, the second access and mobility management function device may return the IMSI or the GPSI of the first relay terminal to the first access and mobility management function device based on the 5G-GUTI of the first relay terminal.

Similarly, the first access and mobility management function device stores a correspondence between the 5G-GUTI of the first remote terminal and the IMSI and/or the GPSI of the first remote terminal. If the first identifier included in the NAS message in S902 is the 5G-GUTI, the first access and mobility management function device may determine the IMSI or the GPSI of the first remote terminal based on the correspondence between the first identifier and the IMSI or the GPSI of the first remote terminal.

After obtaining the IMSI or the GPSI of the first remote terminal and the IMSI or the GPSI of the first relay terminal, the first access and mobility management function device may generate the first request message.

S904: The first access and mobility management function device sends the first request message to the first policy control function device. The first policy control function device is a policy control function device of the first remote terminal.

S905: The first policy control function device determines an authorization result based on the first request message. For example, the first policy control function device determines whether to authorize the first relay terminal and the first remote terminal to establish a relay service relationship.

Manner 1: Only the first policy control function device determines whether the first remote terminal can use the relay service of the first relay terminal. If determining that the first remote terminal can use the relay service of the first relay terminal, the first policy control function device determines to authorize the first relay terminal and the first remote terminal to establish the relay service relationship; otherwise, determines not to authorize the first relay terminal and the first remote terminal to establish the relay service relationship.

After receiving the first request message, the first policy control function device may obtain first association information based on the identifier of the first remote terminal, and may further determine the authorization result based on the identifier of the first relay terminal and the first association information. The first association information indicates at least one relay terminal that can provide the relay service for the first remote terminal, namely, a specific relay terminal that can provide the relay service for the first remote terminal. For example, the first association information may be an identifier of the relay terminal that can provide the relay service for the first remote terminal. For another example, the first association information may indicate that all relay terminals can provide the relay service for the first remote terminal. In this manner, if the at least one relay terminal that can provide the relay service for the first remote terminal includes the first relay terminal, in other words, the first remote terminal can use the relay service of the first relay terminal, for example, the first association information includes the identifier of the first relay terminal, the first policy control function device may determine to authorize the first relay terminal and the first remote terminal to establish the relay service relationship; otherwise, may determine not to authorize the first relay terminal and the first remote terminal to establish the relay service relationship.

Optionally, the first association information may be stored in a unified database, for example, stored in the unified database as subscription information.

Correspondingly, the first policy control function device may obtain the first association information from the unified database when the first remote terminal is registered, or may obtain the first association information from the unified database after receiving the first request message. In addition, the information about the at least one relay terminal that can provide the relay service for the first remote terminal may alternatively be dynamically updated. For example, the first remote terminal requests an update from an operator, and the operator then updates the subscription information of the first remote terminal stored in the unified database.

Optionally, the first association information may alternatively be autonomously determined by the first policy control function device. For example, the first policy control function device may determine the first association information based on preconfigured policy information. The preconfigured policy information may be generated and configured by the operator. For example, a remote terminal of a gold user can use relay services of all relay terminals, and a remote terminal of a non-gold user can use relay services of only some relay terminals.

Manner 2: The first policy control function device determines whether the first remote terminal can use the relay service of the first relay terminal, and the second policy control function device determines whether the first relay terminal can provide the relay service for the first remote terminal. If both determining results are yes, the first relay terminal and the first remote terminal are determined to be authorized to establish the relay service relationship; otherwise, the first relay terminal and the first remote terminal are not authorized to establish the relay service relationship.

After receiving the first request message, the first policy control function device may obtain the foregoing described first association information based on the identifier of the first remote terminal, and send the identifier of the first relay terminal and the identifier of the first remote terminal to the second policy control function device. The second policy control function device is a policy control function device of the first relay terminal. After receiving the identifier of the first relay terminal and the identifier of the first remote terminal, the second policy control function device may obtain second association information. The second association information indicates at least one remote terminal for which the first relay terminal can provide the relay service. For example, the second association information may be an identifier of the at least one remote terminal for which the first relay terminal can provide the relay service. For another example, the second association information may indicate that the first relay terminal can provide the relay service for all remote terminals. The second policy control device may determine, based on the identifier of the first remote terminal and the second association information, whether the first relay terminal can provide the relay service for the first remote terminal. Then, the second policy control function device sends first indication information to the first policy control function device, where the first indication information indicates whether the first relay terminal can provide the relay service for the first remote terminal. The first policy control function device may determine, based on the first indication information, the identifier of the first relay terminal, and the first association information, whether to authorize the first relay terminal and the first remote terminal to establish the relay service relationship.

In this manner, if the at least one relay terminal that can provide the relay service for the first remote terminal includes the first relay terminal, and the first indication information indicates that the first relay terminal can provide the relay service for the first remote terminal, the first policy control function device may determine to authorize the first relay terminal and the first remote terminal to establish the relay service relationship. If the at least one relay terminal that can provide the relay service for the first remote terminal does not include the first relay terminal, or the first indication information indicates that the first relay terminal cannot provide the relay service for the first remote terminal, the first policy control function device may determine not to authorize the first relay terminal and the first remote terminal to establish the relay service relationship.

For example, if the first association information includes the identifier of the first relay terminal, and the second association information includes the identifier of the first remote terminal, the first policy control function device may determine to authorize the first relay terminal and the first remote terminal to establish the relay service relationship. For another example, if the first association information does not include the identifier of the first relay terminal, the first policy control function device may determine not to authorize the first relay terminal and the first remote terminal to establish the relay service relationship. Alternatively, if the second association information does not include the identifier of the first remote terminal, the first policy control function device may determine not to authorize the first relay terminal and the first remote terminal to establish the relay service relationship.

Optionally, the second association information may alternatively be stored in a unified database, for example, stored in the unified database as subscription information.

Similarly, in manner 2, the second policy control function device may obtain the second association information from the unified database when the first relay terminal is registered, or may obtain the second association information from the unified database after receiving the identifier of the first relay terminal and the identifier of the first remote terminal that are sent by the first policy control function device. In addition, the information about the remote terminal for which the first relay terminal can provide the relay service may alternatively be dynamically updated. For example, the first relay terminal requests an update from an operator, and the operator then updates the subscription information of the first relay terminal stored in the unified database.

Optionally, the second association information may alternatively be autonomously determined by the second policy control function device. For example, the second policy control function device may determine the first association information based on preconfigured policy information. The preconfigured policy information may be generated and configured by the operator. For example, a common relay terminal can provide the relay service for all the remote terminals, but a special relay terminal can provide the relay service only for a specific remote terminal. In addition, in manner 2, before sending the identifier of the first relay terminal and the identifier of the first remote terminal to the second policy control function device, the first policy control function device first determines a specific second policy control function device, in other words, obtains an identifier of the second policy control function device.

Optionally, the first access and mobility management function device may obtain the identifier of the second policy control function device, and include the identifier of the second policy control function device in the first request message.

For example, the first access and mobility management function device may obtain the identifier of the second policy control function device from the second access and mobility management function device. In a registration process of the first relay terminal, the second access and mobility management function device may determine a corresponding policy control function device (namely, the second policy control function device) for the first relay terminal, and store a correspondence between the identifier of the first relay terminal (for example, the IMSI or the GPSI) and the identifier of the second policy control function device. When the first access and mobility management function device obtains the IMSI or the GPSI of the first relay terminal from the second access and mobility management function device based on the 5G-GUTI of the first relay terminal, the second access and mobility management function device may return both the IMSI or the GPSI of the first relay terminal, and the identifier of the policy control function device corresponding to the IMSI or the GPSI of the first relay terminal, namely, the identifier of the second policy control function device.

For another example, the first access and mobility management function device may obtain the identifier of the second policy control function device from the unified database or a unified data management device. In the registration process of the first relay terminal, the second policy control function device may register the correspondence between the identifier of the first relay terminal and the identifier of the second policy control function device with the unified database or the unified data management device. In this way, the first access and mobility management function device may obtain the identifier of the second policy control function device from the unified database or the unified data management device based on the identifier of the first relay terminal.

Optionally, the first policy control function device may obtain the identifier of the second policy control function device.

For example, the first policy control function device may obtain the identifier of the second policy control function device from the unified database or the unified data management device. In the registration process of the first relay terminal, the second policy control function device may register the correspondence between the identifier of the first relay terminal and the identifier of the second policy control function device with the unified database or the unified data management device. In this way, the first policy control function device may obtain the identifier of the second policy control function device from the unified database or the unified data management device based on the identifier of the first relay terminal.

It should be noted that in manner 2, the first policy control function device may alternatively first determine, based on the first association information, whether the relay terminal that can provide the relay service for the first remote terminal includes the first relay terminal. If the first relay terminal is included, the first policy control function device sends the identifier of the first relay terminal and the identifier of the first remote terminal to the second policy control function device; or if the first relay terminal is not included, may not send the identifier of the first relay terminal and the identifier of the first remote terminal to the second policy control function device, but directly determine not to authorize the first relay terminal and the first remote terminal to establish the relay service relationship.

S906: The first policy control function device sends the authorization result to the first access and mobility management function device.

S907: The first access and mobility management function device sends the authorization result to the first remote terminal.

It should be understood that the first access and mobility management function device first sends the authorization result to the access network device, and the access network device then forwards the authorization result to the first remote terminal.

After receiving the authorization result, the first remote terminal determines, based on the authorization result, whether to access the network by using the first relay terminal. For a subsequent operation performed by the first remote terminal based on the authorization result, refer to a conventional technology, for example, refer to steps 7 to 9 in TR23.752. Details are not described herein again.

According to the method provided in this application, the policy control function device of the remote terminal may determine whether to authorize the relay terminal and the remote terminal to establish the relay service relationship, and send the determined authorization result to the remote terminal, so that the remote terminal may determine, based on the authorization result, whether the remote terminal may access the network by using the relay terminal. In addition, whether the remote terminal may be used as the remote terminal is also authorized by the policy control function device of the remote terminal. Therefore, centralization of authorization functions can be implemented, to avoid signaling interaction between core devices caused by non-centralization of the authorization functions.

For ease of understanding, the following uses a command for the devices in the 5G system as an example, to describe the method 900 in more detail with reference to FIG. 10 to FIG. 13A and FIG. 13B. It should be understood that remote UE, an AMF of the remote UE, a PCF of the remote UE, relay UE, an AMF of the relay UE, and a PCF of the relay UE in methods shown in FIG. 10 to FIG. 13A and FIG. 13B respectively correspond to the first remote terminal, the first access and mobility management function device, the first policy control function device, the first relay terminal, the second access and mobility management function device, and the second policy control function device in the method 900.

It should be further understood that in different network systems, names of the devices in FIG. 9 may be different, and names of the devices in the methods shown in FIG. 10 to FIG. 13A and FIG. 13B do not constitute any limitation on this application.

Figure 10:
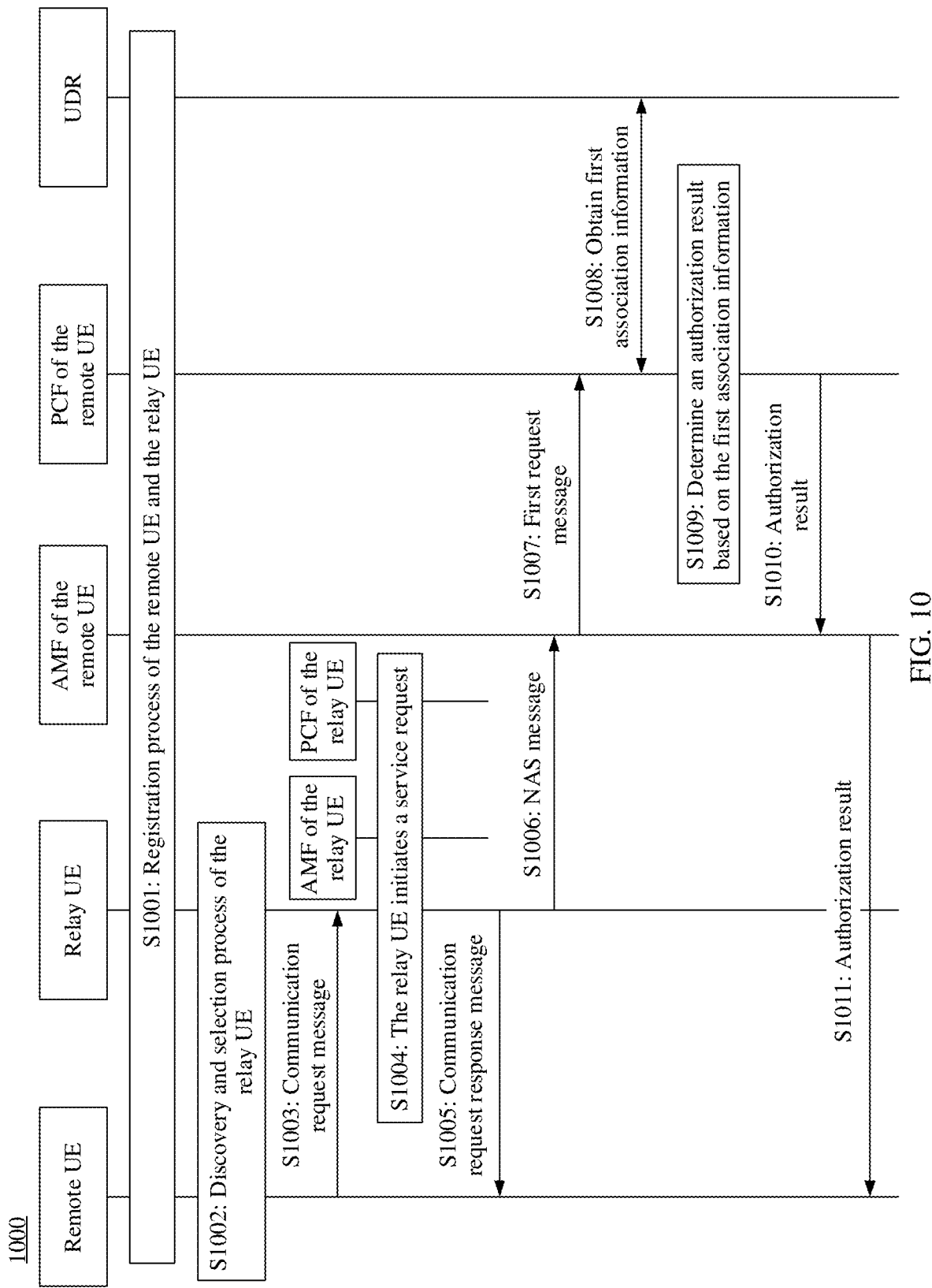

FIG. 10 shows an authorization method according to this application. The method 1000 is a specific embodiment of the method 900. The method 1000 corresponds to manner 1 in step S905. The following describes steps in the method 1000.

S1001: A registration process of the UE.

Subsequently, one UE (for example, denoted as UE #1) used as the remote UE and one UE (for example, denoted as UE #2) used as the relay UE perform a registration procedure, to separately register with the network.

In the registration process, the UE #1 and the UE #2 may separately obtain authorization information from corresponding PCFs, and may determine, based on the authorization information, whether to be used as the remote UE or the relay UE. It should be understood that if the UE #1 does not perform the registration procedure, the UE #1 may use preconfigured authorization information.

Optionally, in the registration process, information about the relay UE that can provide the relay service for the remote UE, namely, first association information, may be stored in a UDR. It should be understood that the UDR corresponds to the unified database in the method 900.

It should be noted that in this application, the UE #1 is authorized as the remote UE, and the UE #2 is authorized as the relay UE. Therefore, in FIG. 10 and the description of FIG. 10, the UE #1 is referred to as the remote UE, an AMF of the UE #1 is referred to as the AMF of the remote UE, a PCF of the UE #1 is referred to as the PCF of the remote UE, the UE #2 is referred to as the relay UE, an AMF of the UE #2 is referred to as the AMF of the relay UE, and a PCF of the UE #2 is referred to as the PCF of the relay UE.

S1002: A discovery and selection procedure of the relay UE.

After this step, the relay UE may establish a PC5 connection to the remote UE, and send the second identifier to the remote UE.

S1003: The remote UE sends a communication request message to the relay UE, where the communication request message requests the relay UE to establish indirect communication.

S1004: If the relay UE is not in a connected (RRC connected) state, the relay UE initiates a service request, so that the relay UE enters the connected state.

S1005: The relay UE returns a communication request response message.

S1006: The remote UE sends a NAS message to the AMF of the remote UE.

The NAS message is the same as the NAS message in S902. A second identifier in the NAS message may be an IMSI, a 5G-GUTI, or a GPSI, and a first identifier may be an IMSI, a 5G-GUTI, or a GPSI.

S1007: The AMF of the remote UE sends a first request message to the PCF of the remote UE.

It should be understood that the AMF of the remote UE first generates the first request message. For this process, refer to S1007. Details are not described herein again.

S1008: The PCF of the remote UE obtains first association information from the UDR.

The first association information herein is the same as the first association information in S905. Refer to S905.

It should be noted that S1005 may alternatively not be performed. Instead, the PCF of the remote UE autonomously determines the first association information.

S1009: The PCF of the remote UE determines an authorization result based on the first association information.

For a specific process of this step, refer to the description of manner 1 in S905. Details are not described herein again.

S1010: The PCF of the remote UE returns the authorization result to the AMF of the remote UE.

S1011: The AMF of the remote UE returns the authorization result to the remote UE.

Subsequently, for a subsequent operation performed by the remote UE based on the authorization result, refer to the conventional technology.

According to the authorization method provided in this application, the PCF (namely, the PCF of the remote UE in this specification) may determine whether one UE may be used as the remote UE. When the UE may be used as the remote UE, if the remote UE requests to access the network by using the relay UE, the remote UE may request the PCF of the remote UE to determine whether to authorize the relay UE and the remote UE to establish a relay service relationship. If determining that the remote UE can use the relay service of the relay UE, the PCF of the remote UE may authorize the relay UE and the remote UE to establish the relay service relationship; otherwise, may not authorize the relay UE and the remote UE to establish the relay service relationship. By using this method, centralization of authorization functions can be implemented.

Figure 11A:
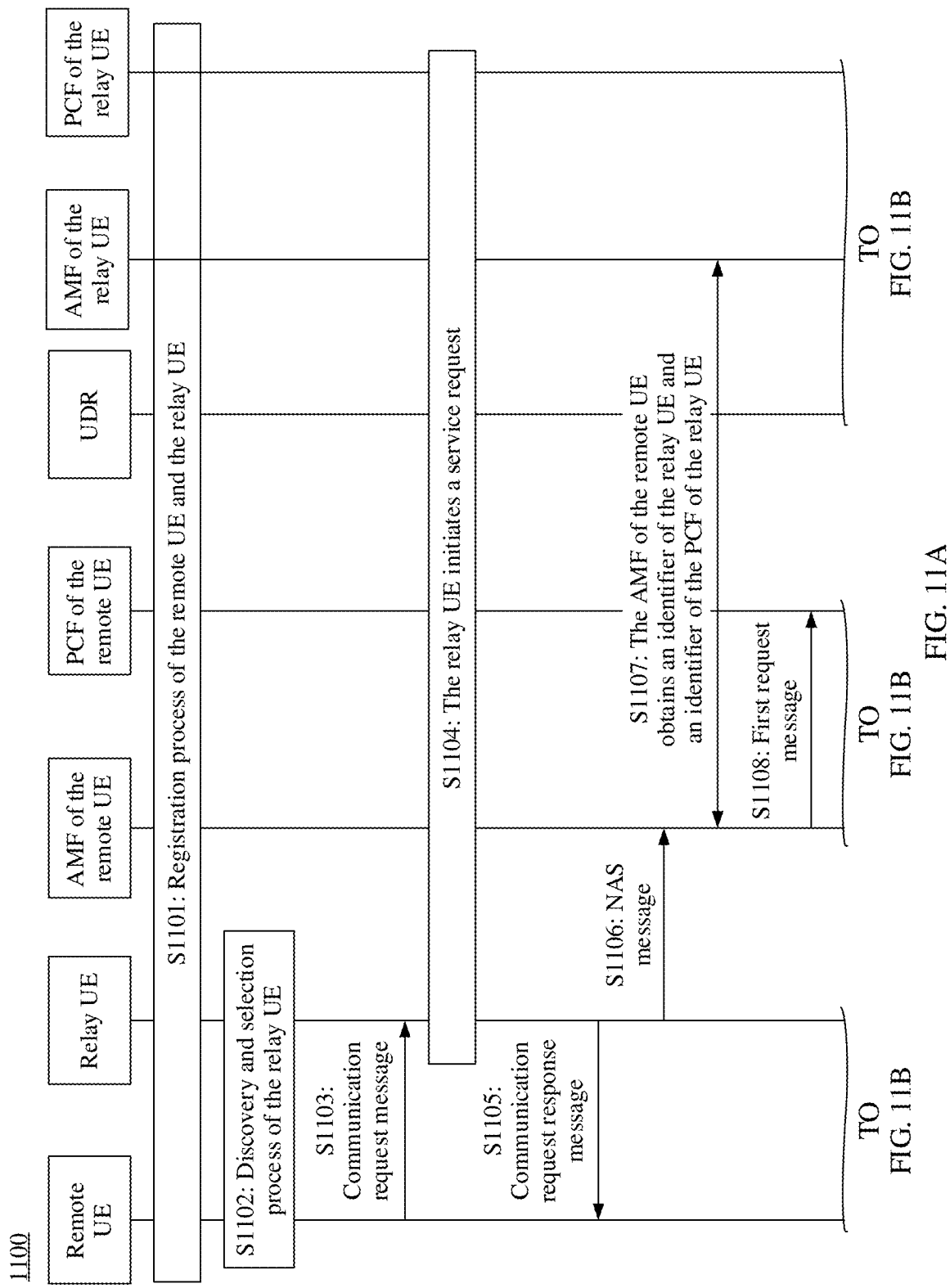
Figure 11B:
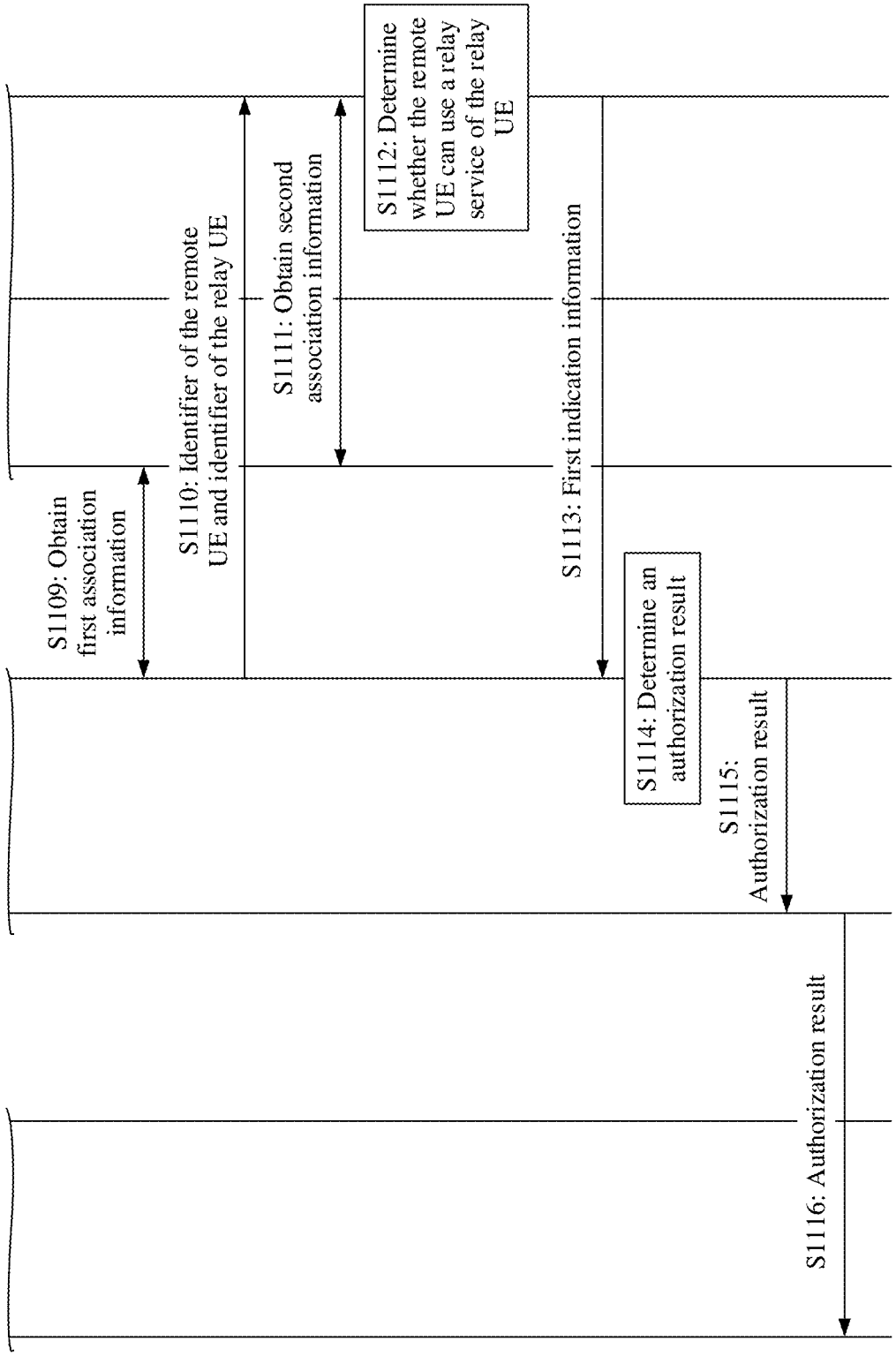

FIG. 11A and FIG. 11B show an authorization method according to this application. The method 1100 is a specific embodiment of the method 900. The method 1100 may correspond to manner 2 in step S905. The following describes steps in the method 1100.

S1101: A registration process of the UE.

This step is the same as S1001.

Optionally, first association information, namely, information about the relay UE that can provide the relay service for the remote UE, may be stored in a UDR; and second association information, namely, information about the remote UE for which the relay UE can provide the relay service, may also be stored in the UDR. It should be understood that the UDR corresponds to the unified database in the method 900.

S1102 to S1105 are the same as S1002 to S1005. Refer to S1002 to S1005.

S1106: The remote UE sends a NAS message to the AMF of the remote UE.

The NAS message is the same as the NAS message in S902.

A second identifier in the NAS message may be a 5G-GUTI, and a first identifier may be an IMSI, a 5G-GUTI, or a GPSI.

S1107: The AMF of the remote UE obtains an IMSI or a GPSI of the relay UE and an identifier of the PCF of the relay UE from the AMF of the relay UE.

The AMF of the remote UE may determine the AMF of the relay UE based on the 5G-GUTI of the relay UE, and then send the 5G-GUTI of the relay UE to the AMF of the relay UE. The AMF of the relay UE stores a correspondence between the 5G-GUTI of the relay UE and the IMSI or the GPSI of the relay UE, and a correspondence between the IMSI or the GPSI of the relay UE and the identifier of the PCF of the relay UE. Therefore, the AMF of the relay UE may return the IMSI or the GPSI of the relay UE and the identifier of the PCF of the relay UE to the AMF of the remote UE based on the 5G-GUTI of the relay UE.

S1108: The AMF of the remote UE sends a first request message to the PCF of the remote UE.

The first request message includes the IMSI or the GPSI of the relay UE, the IMSI or the GPSI of the remote UE, and the identifier of the PCF of the relay UE.

S1109: The PCF of the remote UE obtains first association information from the UDR.

The first association information herein is the same as the first association information in S905. Refer to S905.

It should be noted that S1109 may alternatively not be performed. Instead, the PCF of the remote UE autonomously determines the first association information.

Optionally, if the first association information indicates that the relay UE that can provide the relay service for the remote UE does not include the relay UE, S1109 to 1113 may alternatively not be performed. Instead, the PCF of the remote UE directly determines an authorization result indicating that the relay UE and the remote UE are not authorized to establish a relay service relationship.

S1110: The PCF of the remote UE sends an identifier of the relay UE (an IMSI or a GPSI) and an identifier of the remote UE (an IMSI or a GPSI) to the PCF of the relay UE.

S1111: The PCF of the relay UE obtains second association information from the UDR based on the information sent by the PCF of the remote UE.

The second association information herein is the same as the second association information in S905. Refer to S905.

It should be noted that S1111 may alternatively not be performed. Instead, the PCF of the relay UE autonomously determines the second association information.

S1112: The PCF of the relay UE determines, based on the second association information, whether the relay UE can provide a relay service for the remote UE.

For details of this step, refer to the description of manner 2 in S905.

S1113: The PCF of the relay UE sends first indication information to the PCF of the remote UE.

The first indication information indicates whether the relay UE can provide the relay service for the remote UE.

S1114: The PCF of the remote UE determines an authorization result based on the first indication information and the first association information.

For details of this step, refer to the description of manner 2 in S905.

S1115 and S1116: The PCF of the remote UE returns the authorization result to the remote UE. For details, refer to S1010 and S1011.

According to the authorization method provided in this application, the PCF (namely, the PCF of the remote UE in this specification) may determine whether one UE may be used as the remote UE. When the UE may be used as the remote UE, if the remote UE requests to access the network by using the relay UE, the remote UE may request the PCF of the remote UE to determine whether to authorize the relay UE and the remote UE to establish a relay service relationship. After receiving the request of the remote UE, the PCF of the remote UE determines whether the remote UE can use the relay service of the relay UE, and requests the PCF of the relay UE to determine whether the relay UE can provide the relay service for the remote UE. If both determining results are yes, the PCF of the remote UE determines to authorize the relay UE and the remote UE to establish the relay service relationship; or if at least one of these two determining results is no, determines not to authorize the relay UE and the remote UE to establish the relay service relationship. By using this method, centralization of authorization functions can be implemented.

Figure 12A:
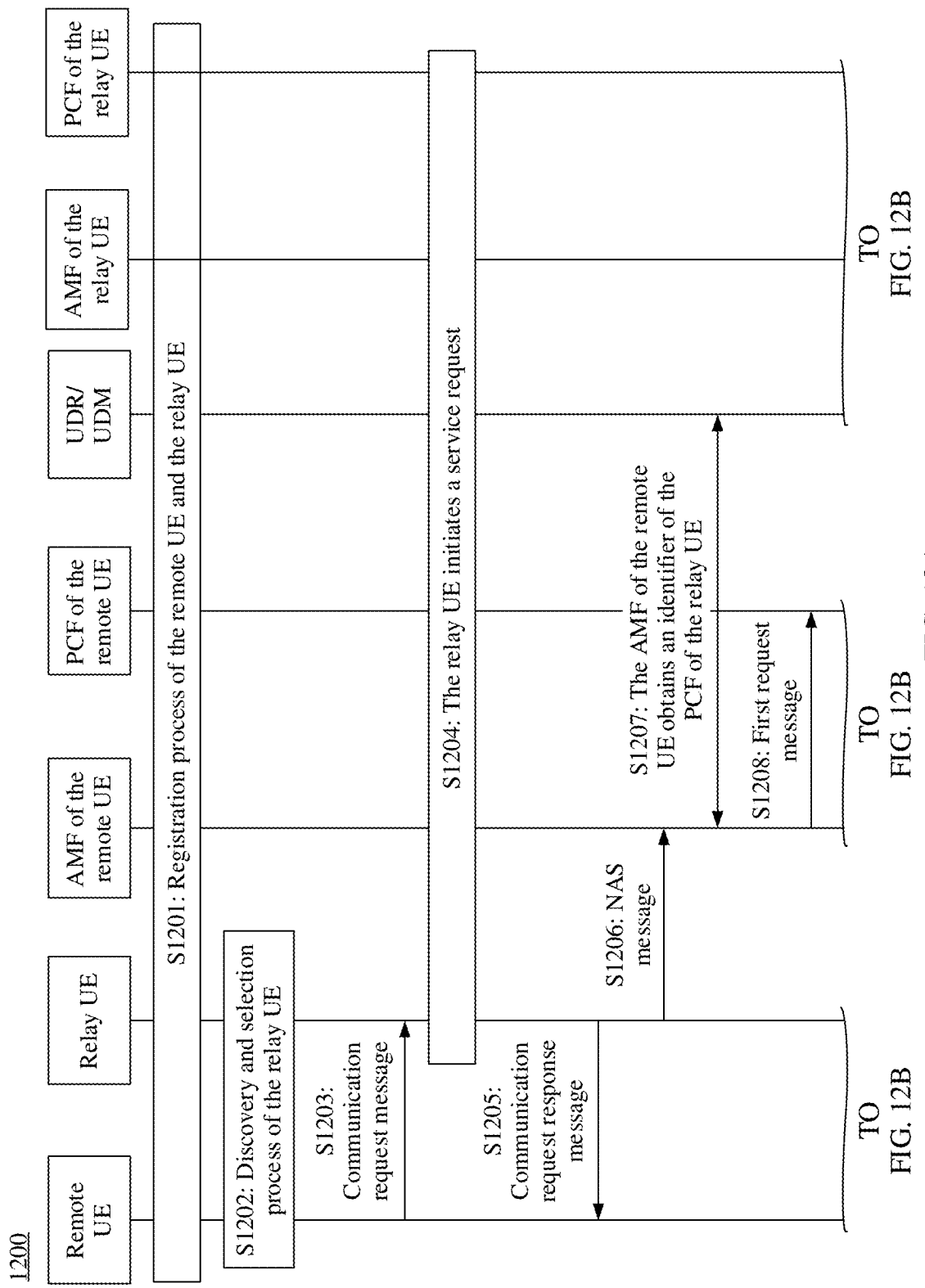
Figure 12B:
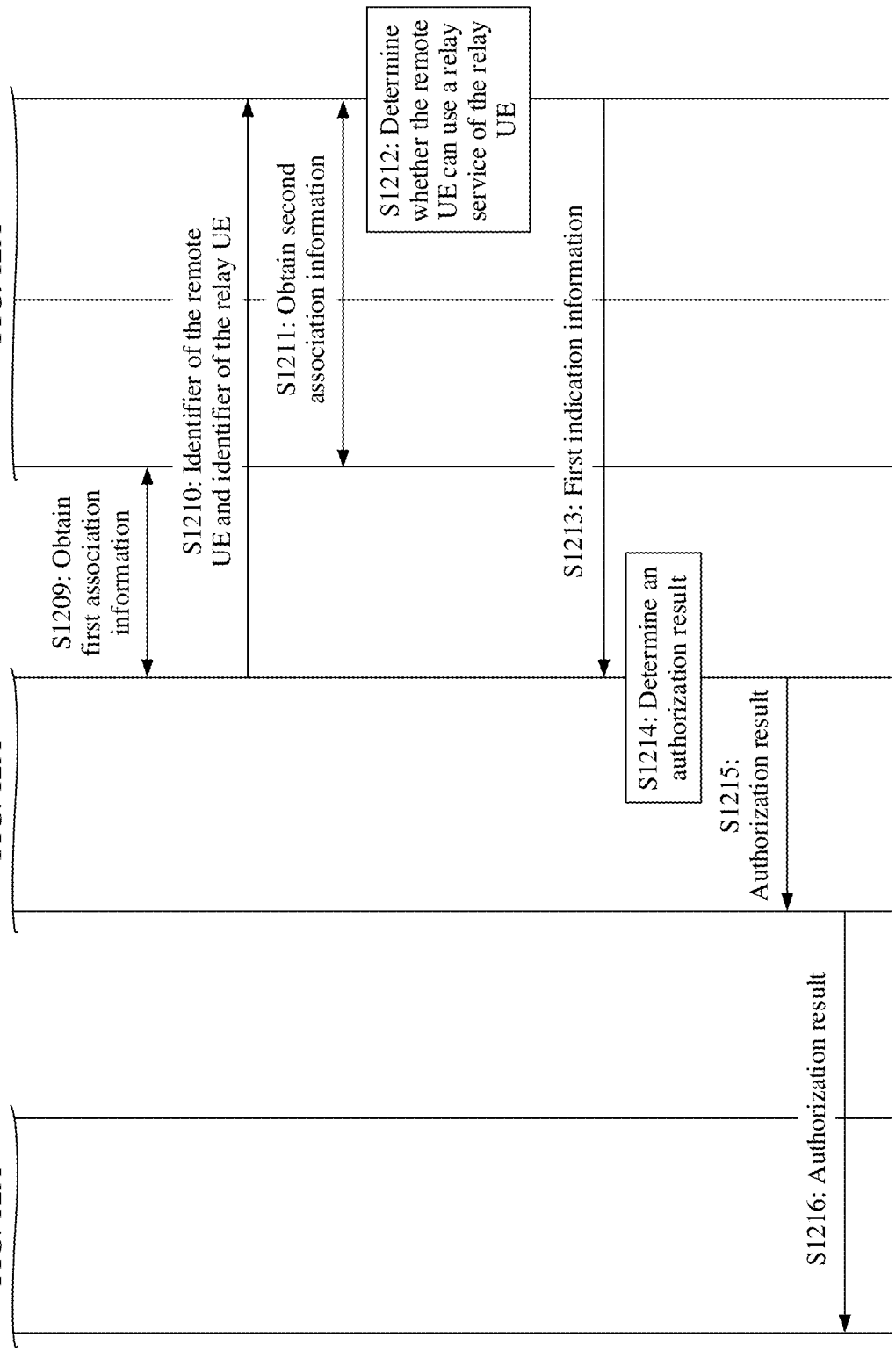

FIG. 12A and FIG. 12B show an authorization method according to this application. The method 1200 is a specific embodiment of the method 900. The method 1200 may correspond to manner 2 in step S905. Different from the method 1100, in the method 1100, the AMF of the remote UE obtains the identifier of the PCF of the relay UE from the AMF of the relay UE, but in the method 1200, the AMF of the remote UE obtains the identifier of the PCF of the relay UE from a UDR or a UDM. The following describes steps in the method 1200.

S1201: A registration process of the UE.

This step is similar to S1101. A difference lies in that in S1101, the correspondence between the identifier of the PCF of the relay UE and the identifier of the relay UE (the IMSI or the GPSI of the relay UE) may be stored in the AMF of the relay UE. However, in S1201, after the UE #2 is authorized as the relay UE, the PCF of the UE #2 may register a correspondence between an identifier of the UE #2 (an IMSI or a GPSI) and an identifier of the PCF of the UE #2 with the UDR or the UDM. It should be understood that the UDR corresponds to the unified database in the method 900, and the UDM corresponds to the unified data management device in the method 900.

S1202 to S1205 are the same as S1002 to S1005. Refer to S1002 to S1005.

S1206: The remote UE sends a NAS message to the AMF of the remote UE.

The NAS message is the same as the NAS message in S902.

A first identifier in the NAS message may be the IMSI, the 5G-GUTI, or the GPSI of the remote UE, and a second identifier may be an IMSI, a 5G-GUTI, or a GPSI of the relay UE.

S1207: The AMF of the remote UE obtains an identifier of the PCF of the relay UE from the UDR or the UDM.

If the second identifier is the 5G-GUTI of the relay UE, the AMF of the remote UE first obtains the IMSI or the GPSI of the relay UE from the AMF of the relay UE. For a specific process, refer to the foregoing corresponding description. If the second identifier is the IMSI or the GPSI of the relay UE, a process of obtaining the IMSI or the GPSI of the relay UE from the AMF of the relay UE does not need to be performed. The AMF of the remote UE sends the IMSI or the GPSI of the relay UE to the UDR or the UDM, and the UDR or the UDM returns the identifier of the PCF of the relay UE to the AMF of the remote UE based on the stored correspondence between the IMSI or the GPSI of the relay UE and the identifier of the PCF of the relay UE.

S1208 to S1216: A process in which the PCF of the remote UE determines an authorization result and returns the authorization result. For details, refer to S1108 to S1116.

According to the authorization method provided in this application, the PCF (namely, the PCF of the remote UE in this specification) may determine whether one UE may be used as the remote UE. When the UE may be used as the remote UE, if the remote UE requests to access the network by using the relay UE, the remote UE may request the PCF of the remote UE to determine whether to authorize the relay UE and the remote UE to establish a relay service relationship. After receiving the request of the remote UE, the PCF of the remote UE determines whether the remote UE can use the relay service of the relay UE, and requests the PCF of the relay UE to determine whether the relay UE can provide the relay service for the remote UE. If both determining results are yes, the PCF of the remote UE determines to authorize the relay UE and the remote UE to establish the relay service relationship; or if at least one of these two determining results is no, determines not to authorize the relay UE and the remote UE to establish the relay service relationship. By using this method, centralization of authorization functions can be implemented.

Figure 13A:
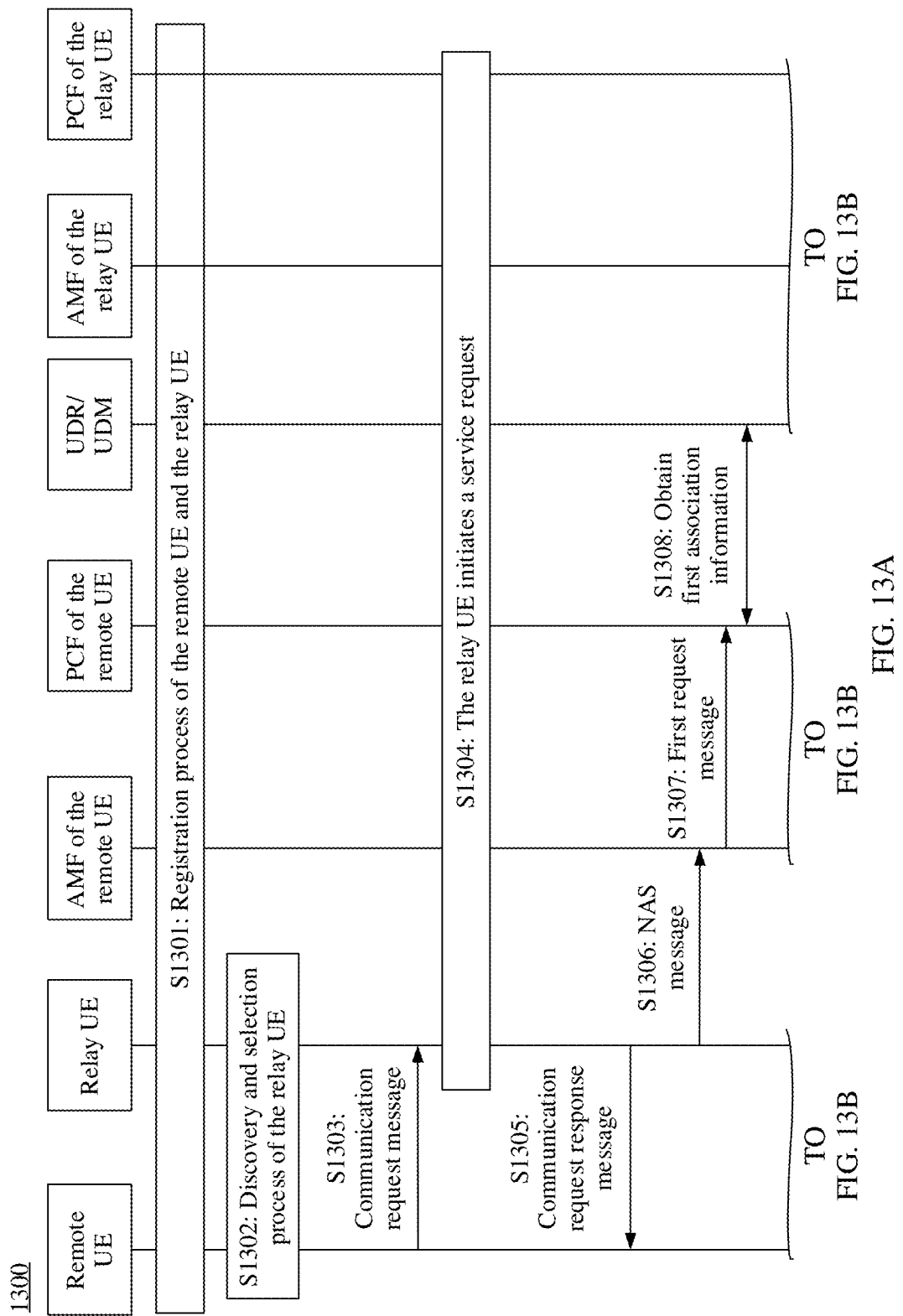

FIG. 13A and FIG. 13B show an authorization method according to this application. The method 1300 is a specific embodiment of the method 900. The method 1300 may correspond to manner 2 in step S905. Different from the methods 1100 and 1200, in the method 1100, the AMF of the remote UE obtains the identifier of the PCF of the relay UE from the AMF of the relay UE, in the method 1200, the AMF of the remote UE obtains the identifier of the PCF of the relay UE from the UDR or the UDM, but in the method 1300, the PCF of the remote UE obtains the identifier of the PCF of the relay UE from the UDR or the UDM. The following describes steps in the method 1300.

S1301 to S1306 are the same as S1201 to S1206. Refer to S1201 to S1206.

S1307: The AMF of the remote UE sends a first request message to the PCF of the remote UE.

It should be understood that the AMF of the remote UE first generates the first request message. For this process, refer to S903. Details are not described herein again.

S1308: The PCF of the remote UE obtains first association information from the UDR.

This step is the same as S1109. For details, refer to S1109.

Optionally, if the first association information indicates that the relay UE that can provide the relay service for the remote UE does not include the relay UE, S1308 to S1314 may alternatively not be performed. Instead, the PCF of the remote UE directly determines an authorization result indicating that the relay UE and the remote UE are not authorized to establish a relay service relationship.

S1309: The PCF of the remote UE obtains an identifier of the PCF of the relay UE from the UDR or the UDM.

The PCF of the remote UE sends the IMSI or the GPSI of the relay UE to the UDR or the UDM, and the UDR or the UDM returns the identifier of the PCF of the relay UE to the PCF of the remote UE based on the stored correspondence between the IMSI or the GPSI of the relay UE and the identifier of the PCF of the remote UE.

S1310 to S1316: A process in which the PCF of the remote UE determines an authorization result and returns the authorization result. For details, refer to S1110 to S1116.

According to the authorization method provided in this application, the PCF (namely, the PCF of the remote UE in this specification) may determine whether one UE may be used as the remote UE. When the UE may be used as the remote UE, if the remote UE requests to access the network by using the relay UE, the remote UE may request the PCF of the remote UE to determine whether to authorize the relay UE and the remote UE to establish a relay service relationship. After receiving the request of the remote UE, the PCF of the remote UE determines whether the remote UE can use the relay service of the relay UE, and requests the PCF of the relay UE to determine whether the relay UE can provide the relay service for the remote UE. If both determining results are yes, the PCF of the remote UE determines to authorize the relay UE and the remote UE to establish the relay service relationship; or if at least one of these two determining results is no, determines not to authorize the relay UE and the remote UE to establish the relay service relationship. By using this method, centralization of authorization functions can be implemented.

It should be understood that the solutions in embodiments of this application may be properly combined for use, and explanations or descriptions of the terms in embodiments may be mutually referenced or explained in embodiments. This is not limited.

It should be further understood that sequence numbers of the foregoing processes do not mean execution sequences in embodiments of this application. The execution sequences of the processes should be determined based on functions and internal logic of the processes. Numbers or sequence numbers in the foregoing processes are merely used for differentiation for ease of description, and should not constitute any limitation on an implementation process of embodiments of this application.

The methods provided in embodiments of this application are described above in detail with reference to FIG. 4 to FIG. 13A and FIG. 13B. Apparatuses provided in embodiments of this application are described below in detail with reference to FIG. 14 and FIG. 15.

Figure 14:
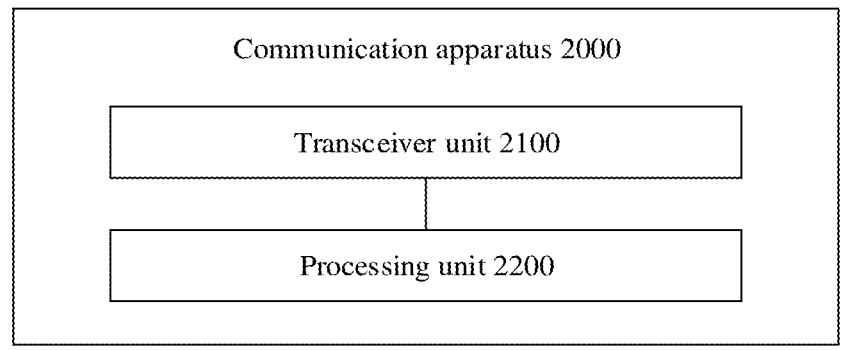
FIG. 14 is a schematic diagram of a communication apparatus according to this application.

FIG. 14 is a schematic block diagram of a communication apparatus according to an embodiment of this application.

As shown in FIG. 14, the communication apparatus 2000 may include a transceiver unit 2100 and a processing unit 2200.

The transceiver unit 2100 may be configured to: send information to another apparatus or device, for example, send a first request message. The processing unit 2200 may be configured to: perform internal processing of the apparatus, for example, determine an authorization result.

In an implementation, the communication apparatus 2000 corresponds to the network element configured to determine a function of an authorization result in this application. For example, in an implementation, the communication apparatus 2000 corresponds to the policy control function device in the foregoing method embodiments. The communication apparatus 2000 may be the policy control function device or a chip configured in the policy control function device, and may include units configured to perform operations performed by the policy control function device.

For another example, in an implementation, the policy control function device in the foregoing method embodiments may alternatively be replaced with a unified data management device. The communication apparatus 2000 may be the unified data management device or a chip configured in the unified data management device, and may include units configured to perform operations performed by the unified data management device.

In an example, the communication apparatus 2000 corresponds to the first policy control function device in the method 400 and the PCF of the relay UE in the methods 500 to 800, and units in the communication apparatus 2000 are separately configured to implement operations performed by the first policy control function device or the PCF of the relay UE in the corresponding methods.

It should be understood that the first policy control function device in the method 400 may be replaced with a unified data management device, and the PCF of the relay UE in the methods 500 to 800 may be replaced with a UDM.

A transceiver unit 2100 is configured to receive a first request message from a first access and mobility management function device, where the first request message includes an identifier of a remote terminal and an identifier of a relay terminal, and the first access and mobility management function device is an access and mobility management function device of the relay terminal. A processing unit 2200 is configured to determine an authorization result based on the identifier of the remote terminal and the identifier of the relay terminal, where the authorization result indicates whether the relay terminal and the remote terminal are authorized to establish a relay service relationship. The transceiver unit 2100 is further configured to send the authorization result to the first access and mobility management function device.

Optionally, the processing unit 2200 is configured to: obtain first association information based on the identifier of the relay terminal, where the first association information indicates at least one remote terminal for which the relay terminal can provide a relay service; and determine the authorization result based on the identifier of the remote terminal and the first association information.

Optionally, the processing unit 2200 is configured to: obtain first association information based on the identifier of the relay terminal, where the first association information indicates at least one remote terminal for which the relay terminal can provide a relay service; control the transceiver unit 2100 to send the identifier of the relay terminal and the identifier of the remote terminal to a second policy control function device, where the second policy control function device is a policy control function device of the remote terminal; control the transceiver unit 2100 to receive first indication information from the second policy control function device, where the first indication information indicates whether the remote terminal can use the relay service of the relay terminal; and determine the authorization result based on the identifier of the remote terminal, the first association information, and the first indication information.

Optionally, the transceiver unit 2100 is configured to: send the identifier of the relay terminal and the identifier of the remote terminal to the second policy control function device based on an identifier of the second policy control function device, where the identifier of the second policy control function device is carried in the first request message.

Optionally, the transceiver unit 2100 is configured to: send the identifier of the relay terminal and the identifier of the remote terminal to the second policy control function device based on an identifier of the second policy control function device, where the identifier of the second policy control function device is obtained by the processing unit from a unified database or a unified data management device based on the identifier of the remote terminal.

Optionally, the processing unit 2200 is configured to: obtain the first association information from the unified database based on the identifier of the relay terminal.

In another example, the communication apparatus 2000 corresponds to the second policy control function device in the method 400 and the PCF of the remote UE in the methods 600 to 800, and units in the communication apparatus 2000 are separately configured to implement operations performed by the second policy control function device or the PCF of the remote UE in the corresponding methods.

It should be understood that the second policy control function device in the method 400 may be replaced with a unified data management device, and the PCF of the remote UE in the methods 600 to 800 may be replaced with a UDM.

A transceiver unit 2100 is configured to receive an identifier of a relay terminal and an identifier of a remote terminal from a first policy control function device, where the first policy control function device is a policy control function device of the relay terminal. A processing unit 2200 is configured to determine, based on the identifier of the relay terminal and the identifier of the remote terminal, whether the remote terminal can use a relay service of the relay terminal. The transceiver unit 2100 is further configured to send first indication information to the first policy control function device, where the first indication information indicates whether the remote terminal can use the relay service of the relay terminal.

Optionally, the processing unit 2200 is configured to: obtain second association information based on the identifier of the remote terminal, where the second association information indicates at least one relay terminal that can provide the relay service for the remote terminal; and determine, based on the identifier of the relay terminal and the second association information, whether the relay terminal can provide the relay service for the remote terminal.

Optionally, the processing unit 2200 is configured to: control the transceiver unit 2100 to obtain the second authorization information from a unified database based on the identifier of the remote terminal.

Optionally, the processing unit 2200 is further configured to: store a correspondence between an identifier of the second policy control function device and the identifier of the remote terminal in a unified database or a unified data management device.

In still another example, the communication apparatus 2000 corresponds to the first policy control function device in the method 900 and the PCF of the remote UE in the methods 1000 to 1300, and units in the communication apparatus 2000 are separately configured to implement operations performed by the first policy control function device or the PCF of the remote UE in the corresponding methods.

It should be understood that the first policy control function device in the method 900 may be replaced with a unified data management device, and the PCF of the remote UE in the methods 1000 to 1300 may be replaced with a UDM.

A transceiver unit 2100 is configured to receive a first request message from a first access and mobility management function device, where the first request message includes an identifier of a remote terminal and an identifier of a relay terminal, the apparatus is a policy control function device of the remote terminal, and the first access and mobility management function device is an access and mobility management function device of the remote terminal. A processing unit 2200 is configured to determine an authorization result based on the identifier of the remote terminal and the identifier of the relay terminal, where the authorization result indicates whether the relay terminal and the remote terminal are authorized to establish a relay service relationship. The transceiver unit 2100 is further configured to send the authorization result to the first access and mobility management function device.

Optionally, the processing unit 2200 is configured to: obtain first association information based on the identifier of the remote terminal, where the first association information indicates at least one relay terminal that can provide a relay service for the remote terminal; and determine the authorization result based on the identifier of the relay terminal and the first association information.

Optionally, the processing unit 2200 is configured to: obtain first association information based on the identifier of the remote terminal, where the first association information indicates at least one relay terminal that can provide a relay service for the remote terminal; control the transceiver unit 2100 to send the identifier of the relay terminal and the identifier of the remote terminal to a second policy control function device, where the second policy control function device is a policy control function device of the relay terminal; control the transceiver unit 2100 to receive first indication information from the second policy control function device, where the first indication information indicates whether the relay terminal can provide a relay service for the remote terminal; and determine the authorization result based on the identifier of the relay terminal, the first association information, and the first indication information.

Optionally, the transceiver unit 2100 is configured to: send the identifier of the relay terminal and the identifier of the remote terminal to the second policy control function device based on an identifier of the second policy control function device, where the identifier of the second policy control function device is carried in the first request message.

Optionally, the transceiver unit 2100 is configured to: send the identifier of the relay terminal and the identifier of the remote terminal to the second policy control function device based on an identifier of the second policy control function device, where the identifier of the second policy control function device is obtained by the first policy control function device from a unified database or a unified data management device based on the identifier of the relay terminal.

Optionally, the processing unit 2200 is configured to: obtain the first association information from the unified database based on the identifier of the remote terminal.

In yet another example, the communication apparatus 2000 corresponds to the second policy control function device in the method 900 and the PCF of the relay UE in the methods 1100 to 1300, and units in the communication apparatus 2000 are separately configured to implement operations performed by the second policy control function device or the PCF of the relay UE in the corresponding methods.

It should be understood that the second policy control function device in the method 900 may be replaced with a unified data management device, and the PCF of the relay UE in the methods 1100 to 1300 may be replaced with a UDM.

A transceiver unit 2100 is configured to receive an identifier of a relay terminal and an identifier of a remote terminal from a first policy control function device, where the apparatus is a policy control function device of the relay terminal, and the first policy control function device is a policy control function device of the remote terminal. A processing unit 2200 is configured to determine, based on the identifier of the relay terminal and the identifier of the remote terminal, whether the relay terminal can provide a relay service for the remote terminal. The transceiver unit 2100 is further configured to send first indication information to the first policy control function device, where the first indication information indicates whether the relay terminal can provide the relay service for the remote terminal.

Optionally, the processing unit 2200 is configured to: obtain second association information based on the identifier of the relay terminal, where the second association information indicates at least one remote terminal for which the relay terminal can provide the relay service; and determine, based on the identifier of the relay terminal and the second association information, whether the relay terminal can provide the relay service for the remote terminal.

Optionally, the processing unit 2200 is configured to: obtain the second authorization information from a unified database based on the identifier of the relay terminal.

Optionally, the processing unit 2200 is further configured to: store a correspondence between the identifier of the remote terminal and the identifier of the relay terminal in a unified database or a unified data management device.

In another implementation, the communication apparatus 2000 corresponds to the access and mobility management function device in the foregoing method embodiments. The communication apparatus 2000 may be an access and mobility management device or a chip configured in the access and mobility management device, and may include units configured to perform operations performed by the access and mobility management device.

The access and mobility management function device in some of the foregoing method embodiments may alternatively be replaced with a session management function device. The communication apparatus 2000 may be the session management function device or a chip configured in the session management function device, and may include units configured to perform operations performed by the session management function device.

In an example, the communication apparatus 2000 corresponds to the first access and mobility management function device in the method 400 and the AMF of the relay UE in the methods 500 to 800, and units in the communication apparatus 2000 are separately configured to implement operations performed by the first access and mobility management device or the AMF of the relay UE in the corresponding method.

It should be understood that the first access and mobility management function device in the method 400 may be replaced with a first session management function device, and the AMF of the relay UE in the method 500 may be replaced with an SMF of the relay UE.

A transceiver unit 2100 is configured to send a first request message to a first policy control function device, where the first policy control function device is a policy control function device of a relay terminal, and the first request message includes an identifier of the relay terminal and an identifier of a remote terminal. The transceiver unit 2100 is further configured to receive an authorization result from the first policy control function device, where the authorization result indicates whether the relay terminal and the remote terminal are authorized to establish a relay service relationship. The transceiver unit 2100 is further configured to send the authorization result to the relay terminal.

Optionally, the transceiver unit 2100 is further configured to: receive the identifier of the relay terminal and the identifier of the remote terminal from the relay terminal.

Optionally, the first request message includes an identifier of a second policy control function device; and the processing unit 2200 is further configured to: obtain the identifier of the second policy control function device from a second access and mobility management function device, a unified data management device, or a unified database based on the identifier of the remote terminal, where the second access and mobility management function device is an access and mobility management function device of the remote terminal, and the second policy control function device is a policy control function device of the remote terminal.

In another example, the communication apparatus 2000 corresponds to the first access and mobility management function device in the method 900 and the AMF of the remote UE in the methods 1000 to 1300, and units in the communication apparatus 2000 are separately configured to implement operations performed by the first access and mobility management (or the AMF of the remote UE) in the corresponding methods.

A transceiver unit 2100 is configured to send a first request message to a first policy control function device, where the first policy control function device is a policy control function device of a remote terminal, and the first request message includes an identifier of a relay terminal and an identifier of the remote terminal. The transceiver unit 2100 is further configured to receive an authorization result from the first policy control function device, where the authorization result indicates whether the relay terminal and the remote terminal are authorized to establish a relay service relationship. The transceiver unit is further configured to send the authorization result to the remote terminal.

Optionally, the processing unit 2200 is configured to: control the transceiver unit 2100 to receive the identifier of the remote terminal and the identifier of the relay terminal from the remote terminal.

Optionally, the first request message includes an identifier of a second policy control function device; and the processing unit 2200 is further configured to: obtain the identifier of the second policy control function device from a second access and mobility management function device, a unified data management device, or a unified database based on the identifier of the remote terminal, where the second access and mobility management function device is an access and mobility management function device of the relay terminal, and the second policy control function device is a policy control function device of the relay terminal.

It should be understood that an obtaining operation performed by the processing unit 2200, for example, obtaining the identifier of the second policy control function device, may alternatively be performed by the transceiver unit 2100.

It should be understood that a specific process in which the units perform the foregoing corresponding steps is already described in detail in the foregoing method embodiments. For brevity, details are not described herein again.

It should be further understood that the communication apparatus 2000 may further correspond to devices such as the first remote terminal, the first relay terminal, the unified database, and the unified data management device in the foregoing method embodiments, and units in the communication apparatus 2000 are separately configured to implement operations performed by the corresponding devices in corresponding methods.

Figure 15:
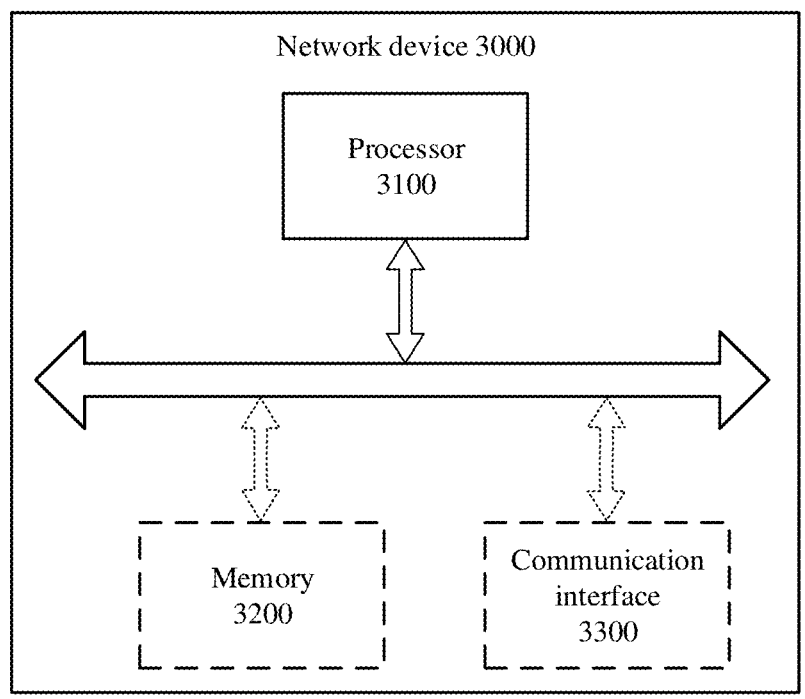
FIG. 15 is a schematic diagram of a structure of another communication apparatus according to this application.

It should be further understood that the transceiver unit 2100 in the communication apparatus 2000 may correspond to a communication interface 3300 in a communication apparatus 3000 shown in FIG. 15, and the processing unit 2200 in the communication apparatus 2000 may correspond to a processor 3100 in the communication apparatus 3000 shown in FIG. 15.

FIG. 15 is a schematic diagram of a structure of another communication apparatus according to an embodiment of this application. Any device in the foregoing method embodiments may be implemented by the communication apparatus 3000 shown in FIG. 15. It should be understood that the communication apparatus 3000 may be an entity device, or may be a component (for example, an integrated circuit or a chip) of an entity device.

As shown in FIG. 15, the communication apparatus 3000 includes one or more processors 3100. The processor 3100 may store executable instructions used to perform the methods in embodiments of this application. Optionally, the processor 3100 may invoke the communication interface 3300 to implement receiving and sending functions. The communication interface 3300 may be a logical interface or a physical interface. This is not limited. For example, the communication interface 3300 may be a transceiver circuit or an interface circuit. The transceiver circuit or the interface circuit configured to implement the receiving and sending functions may be separated or may be integrated together. The transceiver circuit or the interface circuit may be configured to read and write code/data, or the transceiver circuit or the interface circuit may be configured to transmit or transfer a signal.

Optionally, the communication interface 3300 may be implemented by using a communication transceiver.

Optionally, the communication interface 3300 may also be referred to as a transceiver unit, a transceiver machine, a transceiver circuit, a transceiver, or the like, and is configured to implement the receiving and sending functions.

Optionally, the communication apparatus 3000 may further include a memory 3200. A specific deployment location of the memory 3200 is not specifically limited in this embodiment of this application. The memory may be integrated into the processor, or may be independent of the processor. In a case in which a computer device does not include the memory, the computer device only needs to have a processing function, and the memory may be deployed at another position (for example, a cloud system).

The processor 3100, the memory 3200, and the communication interface 3300 communicate with one another through an internal connection channel, to transmit a control signal and/or a data signal.

It may be understood that although not shown, the communication apparatus 3000 may further include another module, for example, a battery.

Optionally, in some embodiments, the memory 3200 may store executable instructions used to perform the methods in embodiments of this application. The processor 3100 may execute the instructions stored in the memory 3200, and complete, in combination with other hardware (for example, the communication interface 3300), the steps performed in the foregoing shown methods. For a specific working process and beneficial effects, refer to the descriptions in the foregoing method embodiments.

The processor 3100 may be an integrated circuit chip and has a signal processing capability. During implementation, the steps in the methods may be performed by using a hardware integrated logical circuit in the processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by using a hardware decoding processor, or may be performed and completed by using a combination of hardware and software modules in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory, and the processor reads instructions in the memory and completes the steps in the foregoing methods in combination with hardware of the processor.

It may be understood that the memory 3200 may be a volatile memory or a nonvolatile memory, or may include both a volatile memory and a nonvolatile memory. The nonvolatile memory may be a read-only memory ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory RAM, used as an external cache. By way of example, and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these memories and any memory of another proper type.

The foregoing communication apparatus 3000 may be a general-purpose computer device or a special-purpose computer device. During specific implementation, the communication apparatus 3000 may be a desktop computer, a portable computer, a network server, a personal digital assistant (PDA), a mobile phone, a tablet computer, a wireless terminal device, a communication device, an embedded device, or a device having a structure similar to that in FIG. 15. A type of the communication apparatus 3000 is not limited in this embodiment of this application.

According to the method provided in embodiments of this application, this application further provides a computer program product. The computer program product includes computer program code, and when the computer program code is run on a computer, the computer is enabled to perform the method on a first policy control function device side, a second policy control function device side, a first access and mobility management function device side, or a second access and mobility management function device side in any one of the foregoing method embodiments.

According to the method provided in embodiments of this application, this application further provides a computer-readable medium. The computer-readable medium stores program code, and when the program code is run on a computer, the computer is enabled to perform the method on a first policy control function device side, a second policy control function device side, a first access and mobility management function device side, or a second access and mobility management function device side in the foregoing method embodiments.

According to the method provided in embodiments of this application, this application further provides a system. The system includes one or more devices in the foregoing method embodiments, for example, may include one or more of the following: a first policy control function device, a second policy control function device, a first access and mobility management function device, or a second access and mobility management function device. Optionally, the system may further include the first relay terminal and the first remote terminal in the foregoing method embodiments.

An embodiment of this application further provides a processing apparatus, including a processor and an interface. The processor is configured to perform the communication method in any one of the foregoing method embodiments.

It should be understood that the processing apparatus may be a chip. For example, the processing apparatus may be a field programmable gate array (FPGA), may be a general-purpose processor, a digital signal processor (DSP), an application-specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (network processor, NP), may be a digital signal processing circuit (digital signal processor, DSP), may be a microcontroller unit (MCU), or may be a programmable controller (programmable logic device, PLD) or another integrated chip. The processor may implement or perform the methods, the steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by using a hardware decoding processor, or may be performed and completed by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these memories and any memory of another proper type.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending or receiving step may be performed by the processing unit (the processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, or a computer. As shown in the figures, both a computing device and an application that runs on the computing device may be components. One or more components may reside within a process or a thread of execution, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, a distributed system, or a network such as the internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be understood that in embodiments of this application, numbers "first", "second", and the like are merely used to distinguish between different objects, for example, to distinguish between different network devices, and do not constitute a limitation on the scope of embodiments of this application. Embodiments of this application are not limited thereto.

It should be further understood that in this application, both "when" and "if" mean that a network element performs corresponding processing in an objective situation, but do not constitute a limitation on time, do not require that the network element have a determining action during implementation, and do not mean other limitations either.

It should be further understood that in this application, "at least one" means one or more, and "a plurality of" means two or more.

It should be further understood that in embodiments of this application, "B corresponding to A" indicates that B is associated with A, and B may be determined based on A. However, it should be further understood that determining B based on A does not mean that B is determined based only on A, and B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Unless otherwise specified, an expression in this application similar to an expression that "an item includes one or more of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that in embodiments of this application, the terminal device and/or the network device may perform some or all of the steps in embodiments of this application. These steps or operations are merely examples. In embodiments of this application, other operations or variations of various operations may be further performed. In addition, the steps may be performed in a sequence different from a sequence presented in embodiments of this application, and not all the operations in embodiments of this application may be necessarily to be performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units. The units may, for example, be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes: any medium that can store program code, such as a USB flash drive, a removable hard disk, a read-only memory ROM, a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An authorization method, comprising:
   receiving, by a policy control function device of a relay terminal, a request message from an access and mobility management function device of the relay terminal, wherein the request message comprises an identifier of a remote terminal and an identifier of the relay terminal;
   obtaining, by the policy control function device, association information from a unified database based on the identifier of the relay terminal, wherein the association information indicates the remote terminal for which the relay terminal can provide a relay service;
   determining, by the policy control function device, an authorization result based on the identifier of the remote terminal, the identifier of the relay terminal, and the association information, wherein the authorization result indicates whether the relay terminal and the remote terminal are authorized to establish a relay service relationship; and
   sending, by the policy control function device, the authorization result to the access and mobility management function device.

2. The authorization method according to claim 1, wherein the policy control function device is a first policy control function device, and determining, by the first policy control function device, the authorization result based on the identifier of the remote terminal and the identifier of the relay terminal further comprises:
   sending, by the first policy control function device, the identifier of the relay terminal and the identifier of the remote terminal to a second policy control function device of the remote terminal;
   receiving, by the first policy control function device, indication information from the second policy control function device, wherein the indication information indicates whether the remote terminal can use the relay service of the relay terminal; and
   determining, by the first policy control function device, the authorization result based on the identifier of the remote terminal, the identifier of the relay terminal, the association information, and the indication information.

3. The authorization method according to claim 2, wherein the sending, by the first policy control function device, the identifier of the relay terminal and the identifier of the remote terminal to the second policy control function device comprises:
   sending, by the first policy control function device, the identifier of the relay terminal and the identifier of the remote terminal to the second policy control function device based on an identifier of the second policy control function device, wherein the identifier of the second policy control function device is carried in the request message.

4. The authorization method according to claim 2, wherein the sending, by the first policy control function device, the identifier of the relay terminal and the identifier of the remote terminal to the second policy control function device comprises:
   sending, by the first policy control function device, the identifier of the relay terminal and the identifier of the remote terminal to the second policy control function device based on an identifier of the second policy control function device, wherein the identifier of the second policy control function device is obtained by the first policy control function device from the unified database based on the identifier of the remote terminal.

5. An authorization method, comprising:
   obtaining, by a first access and mobility management function device of a relay terminal, an identifier of a second policy control function device of a remote terminal from a unified database based on an identifier of the remote terminal;
   sending, by the access and mobility management function device of the relay terminal, a request message to a first policy control function device of the relay terminal, to cause the first policy control function device of the relay terminal to obtain association information from the unified database, wherein the request message comprises an identifier of the relay terminal and the identifier of the remote terminal, and the association information indicates the remote terminal for which the relay terminal can provide a relay service;
   receiving, by the first access and mobility management function device, an authorization result from the first policy control function device, wherein the authorization result is based on the identifier of the remote terminal, the identifier of the relay terminal, and the association information, and the authorization result indicates whether the relay terminal and the remote terminal are authorized to establish a relay service relationship; and
   sending, by first the access and mobility management function device, the authorization result to the relay terminal.

6. The authorization method according to claim 5, wherein before the sending, by first the access and mobility management function device, the request message to the first policy control function device, the method further comprises:

receiving, by the first access and mobility management function device, the identifier of the relay terminal and the identifier of the remote terminal from the relay terminal.

7. A communication apparatus, comprising:
at least one processor; and
a memory having instructions stored thereon that, when executed by the at least one processor, cause the communication apparatus to:
receive a request message from an access and mobility management function device of a relay terminal, wherein the request message comprises an identifier of a remote terminal and an identifier of the relay terminal;
obtaining association information from a unified database based on the identifier of the relay terminal, wherein the association information indicates the remote terminal for which the relay terminal can provide a relay service;
determine an authorization result based on the identifier of the remote terminal and terminal, the identifier of the relay terminal, and the association information, wherein the authorization result indicates whether the relay terminal and the remote terminal are authorized to establish a relay service relationship; and
send the authorization result to the access and mobility management function device.

8. The communication apparatus according to claim 7, wherein the communication apparatus is a first policy control function device of the relay terminal, and the communication apparatus is caused to determine the authorization result based on the identifier of the remote terminal and the identifier of the relay terminal by:
sending the identifier of the relay terminal and the identifier of the remote terminal to a second policy control function device of the remote terminal;
receiving indication information from the second policy control function device, wherein the indication information indicates whether the remote terminal can use the relay service of the relay terminal; and
determining the authorization result based on the identifier of the remote terminal, the association information, the identifier of the relay terminal, and the indication information.

9. The communication apparatus according to claim 8, wherein the communication apparatus is caused to send the identifier of the relay terminal and the identifier of the remote terminal to the second policy control function device by:
sending the identifier of the relay terminal and the identifier of the remote terminal to the second policy control function device based on an identifier of the second policy control function device, wherein the identifier of the second policy control function device is carried in the request message.

10. The communication apparatus according to claim 8, wherein the communication apparatus is caused to send the identifier of the relay terminal and the identifier of the remote terminal to the second policy control function device by:
sending the identifier of the relay terminal and the identifier of the remote terminal to the second policy control function device based on an identifier of the second policy control function device, wherein the identifier of the second policy control function device is obtained from a-from the unified database based on the identifier of the remote terminal.

11. A communication system, comprising:
a first access and mobility management function device of a relay terminal;
a first policy control function device of the relay terminal; and
a second policy control function device of a remote terminal, wherein
the first access and mobility management function device is configured to obtain an identifier of the second policy control function device from a unified database based on an identifier of the remote terminal,
the first access and mobility management function device is configured to send a request message to the first policy control function device, to cause the first policy control function device to obtain association information from the unified database, wherein the request message comprises an identifier of the relay terminal and the identifier of the remote terminal, and the association information indicates the remote terminal for which the relay terminal can provide a relay service,
the first policy control function device is configured to receive the request message, obtain association information from the unified database, determine an authorization result based on the identifier of the remote terminal, the identifier of the relay terminal, and the association information, and send the authorization result to the first access and mobility management function device, wherein the authorization result indicates whether the relay terminal and the remote terminal are authorized to establish a relay service relationship, and
the first access and mobility management function device is further configured to receive the authorization result and send the authorization result to the relay terminal.

12. The communication system according to claim 11, wherein the first access and mobility management function device is further configured to receive the identifier of the relay terminal and the identifier of the remote terminal from the relay terminal.

13. The communication system according to claim 11, wherein
the first policy control function device is further configured to:
send the identifier of the relay terminal and the identifier of the remote terminal to the second policy control function device,
the second policy control function device is configured to:
receive the identifier of the relay terminal and the identifier of the remote terminal; and
send indication information to the first policy control function device, wherein the indication information indicates whether the remote terminal can use the relay service of the relay terminal, and
the first policy control function device is further configured to:
receive the indication information; and
determine the authorization result based on the identifier of the remote terminal, the identifier of the relay terminal, the association information, and the indication information.

* * * * *